(12) United States Patent
Jalon et al.

(10) Patent No.: US 8,516,038 B2
(45) Date of Patent: Aug. 20, 2013

(54) BROWSING OR SEARCHING USER INTERFACES AND OTHER ASPECTS

(75) Inventors: Julien Jalon, Paris (FR); Julien Gricourt, Mountain View, CA (US); Yan Arrouye, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 710 days.

(21) Appl. No.: 12/189,673

(22) Filed: Aug. 11, 2008

(65) Prior Publication Data

US 2009/0307306 A1  Dec. 10, 2009

Related U.S. Application Data

(60) Provisional application No. 61/059,586, filed on Jun. 6, 2008.

(51) Int. Cl.
*G06F 15/16* (2006.01)

(52) U.S. Cl.
USPC ........... 709/203; 709/200; 709/231; 715/744; 715/762; 715/763; 715/838

(58) Field of Classification Search
USPC ................ 709/200, 203, 231; 715/764, 744, 715/762, 763, 838
See application file for complete search history.

(56) References Cited

U.S. PATENT DOCUMENTS

| | | | |
|---|---|---|---|
| 5,303,388 A | 4/1994 | Kreitman et al. | |
| 5,404,316 A * | 4/1995 | Klingler et al. | 715/723 |
| 5,586,237 A | 12/1996 | Baecker | |
| 5,793,368 A * | 8/1998 | Beer | 715/747 |
| 5,796,945 A * | 8/1998 | Tarabella | 709/219 |
| 5,831,617 A | 11/1998 | Bhukhanwala | |
| 6,006,227 A | 12/1999 | Freeman et al. | |
| 6,006,241 A * | 12/1999 | Purnaveja et al. | 715/205 |
| 6,011,537 A * | 1/2000 | Slotznick | 715/733 |
| 6,031,532 A | 2/2000 | Gourdol et al. | |
| 6,184,898 B1 * | 2/2001 | Rice et al. | 345/440 |
| 6,262,732 B1 | 7/2001 | Coleman et al. | |
| 6,337,699 B1 | 1/2002 | Nielsen | |

(Continued)

FOREIGN PATENT DOCUMENTS

WO  99/49496  9/1999

OTHER PUBLICATIONS

Ording, Bas, et al.,"Methods and Apparatuses for Operating a Data Processing System", U.S. Appl. No. 10/873,661, filed Jun. 21, 2004 (92 pp.).

(Continued)

*Primary Examiner* — Anthony Mejia
(74) *Attorney, Agent, or Firm* — Schwegman Lundberg & Woessner, P.A.

(57) ABSTRACT

User interfaces for browsing and/or searching are described. According to some aspects of the invention, a server in the system initiates an instance of a preview generator for each client machine in the system. The instance sends at least one of a preview and a thumbnail of a file to the client machine responsive to a request for the file from the client machine to allow the client machine to present the preview. The instance may generate an icon representing the file and execute a plug-in associated with a creator application of the file to present the preview within the icon so that the creator application does not have to be launched. Other embodiments are also described, and computer readable media and apparatuses are also described.

16 Claims, 67 Drawing Sheets

(56) References Cited

U.S. PATENT DOCUMENTS

| | | | |
|---|---|---|---|
| 6,374,260 B1 * | 4/2002 | Hoffert et al. | 1/1 |
| 6,459,441 B1 | 10/2002 | Perroux et al. | |
| 6,519,568 B1 * | 2/2003 | Harvey et al. | 705/1.1 |
| 6,613,101 B2 | 9/2003 | Mander et al. | |
| 6,638,313 B1 | 10/2003 | Freeman et al. | |
| 6,711,622 B1 * | 3/2004 | Fuller et al. | 709/231 |
| 6,725,427 B2 | 4/2004 | Freeman et al. | |
| 6,768,999 B2 | 7/2004 | Prageri et al. | |
| 7,047,502 B2 * | 5/2006 | Petropoulos et al. | 715/781 |
| 7,086,011 B2 | 8/2006 | Budrys et al. | |
| 7,107,548 B2 * | 9/2006 | Shafron | 715/826 |
| 7,117,440 B2 * | 10/2006 | Gordon et al. | 715/721 |
| 7,146,388 B2 * | 12/2006 | Stakutis et al. | 1/1 |
| 7,171,626 B2 | 1/2007 | Sheldon et al. | |
| 7,234,114 B2 * | 6/2007 | Kurtz et al. | 715/746 |
| 7,266,768 B2 | 9/2007 | Ferlitsch et al. | |
| 7,287,227 B2 * | 10/2007 | Ries et al. | 715/741 |
| 7,293,268 B2 | 11/2007 | Masuda et al. | |
| 7,298,851 B1 * | 11/2007 | Hendricks et al. | 380/282 |
| 7,318,047 B1 * | 1/2008 | Foth et al. | 705/39 |
| 7,409,644 B2 * | 8/2008 | Moore et al. | 715/774 |
| 7,409,645 B2 | 8/2008 | Sheldon et al. | |
| 7,437,358 B2 | 10/2008 | Arroyue et al. | |
| 7,587,680 B2 * | 9/2009 | Wada | 715/804 |
| 7,596,766 B1 * | 9/2009 | Sharma et al. | 715/854 |
| 7,689,933 B1 | 3/2010 | Parsons et al. | |
| 7,694,236 B2 | 4/2010 | Gusmorino et al. | |
| 7,730,047 B2 | 6/2010 | Hugill et al. | |
| 7,779,069 B2 * | 8/2010 | Frid-Nielsen et al. | 709/203 |
| 7,814,425 B1 * | 10/2010 | O'Shaugnessy et al. | 715/752 |
| 7,844,918 B1 | 11/2010 | Ashe | |
| 7,908,562 B2 * | 3/2011 | McKee et al. | 715/764 |
| 8,261,191 B2 * | 9/2012 | Ording | 715/719 |
| 2001/0028363 A1 | 10/2001 | Nomoto et al. | |
| 2002/0033848 A1 | 3/2002 | Sciammarella et al. | |
| 2003/0076322 A1 | 4/2003 | Ouzts et al. | |
| 2003/0088831 A1 * | 5/2003 | Bauer et al. | 715/516 |
| 2003/0093572 A1 | 5/2003 | Laux et al. | |
| 2003/0128242 A1 | 7/2003 | Gordon | |
| 2003/0146939 A1 * | 8/2003 | Petropoulos et al. | 345/810 |
| 2003/0156140 A1 * | 8/2003 | Watanabe | 345/810 |
| 2003/0189602 A1 | 10/2003 | Dalton et al. | |
| 2004/0090458 A1 * | 5/2004 | Yu et al. | 345/760 |
| 2004/0095396 A1 | 5/2004 | Stavely et al. | |
| 2004/0205633 A1 * | 10/2004 | Martinez et al. | 715/526 |
| 2004/0221308 A1 * | 11/2004 | Cuttner et al. | 725/46 |
| 2004/0230599 A1 | 11/2004 | Moore et al. | |
| 2005/0010860 A1 | 1/2005 | Weiss et al. | |
| 2005/0102373 A1 * | 5/2005 | Grinberg | 709/217 |
| 2005/0157218 A1 * | 7/2005 | Honma | 348/744 |
| 2005/0210393 A1 * | 9/2005 | Maeng | 715/751 |
| 2005/0223329 A1 * | 10/2005 | Schwartz et al. | 715/711 |
| 2005/0240878 A1 | 10/2005 | Anthony et al. | |
| 2005/0251758 A1 | 11/2005 | Cummins et al. | |
| 2005/0278389 A1 * | 12/2005 | Maze et al. | 707/200 |
| 2006/0020899 A1 | 1/2006 | Gusmorino et al. | |
| 2006/0107207 A1 * | 5/2006 | Wada | 715/526 |
| 2006/0174214 A1 | 8/2006 | McKee et al. | |
| 2006/0195790 A1 | 8/2006 | Beaupre et al. | |
| 2006/0238835 A1 * | 10/2006 | Nishida et al. | 358/537 |
| 2006/0268100 A1 * | 11/2006 | Karukka et al. | 348/14.01 |
| 2006/0280437 A1 * | 12/2006 | Logan et al. | 386/94 |
| 2007/0011258 A1 * | 1/2007 | Khoo | 709/206 |
| 2007/0038642 A1 | 2/2007 | Durgin et al. | |
| 2007/0058597 A1 * | 3/2007 | Frid-Nielsen et al. | 370/338 |
| 2007/0061745 A1 | 3/2007 | Anthony et al. | |
| 2007/0070066 A1 | 3/2007 | Bakhash | |
| 2007/0136750 A1 * | 6/2007 | Abanami et al. | 725/44 |
| 2007/0143493 A1 * | 6/2007 | Mullig et al. | 709/232 |
| 2007/0143791 A1 * | 6/2007 | Sammarco | 725/38 |
| 2007/0157129 A1 * | 7/2007 | Facemire et al. | 715/968 |
| 2007/0189708 A1 * | 8/2007 | Lerman et al. | 386/52 |
| 2007/0264982 A1 * | 11/2007 | Nguyen et al. | 455/414.1 |
| 2007/0266411 A1 | 11/2007 | Yamamoto et al. | |
| 2008/0034306 A1 * | 2/2008 | Ording | 715/764 |
| 2008/0034325 A1 | 2/2008 | Ording | |
| 2008/0034381 A1 | 2/2008 | Jalon et al. | |
| 2008/0062141 A1 | 3/2008 | Chandri | |
| 2008/0115182 A1 * | 5/2008 | van Willigenburg | 725/110 |
| 2008/0127289 A1 * | 5/2008 | Julia et al. | 725/109 |
| 2008/0134028 A1 * | 6/2008 | Whitmyer | 715/700 |
| 2008/0183578 A1 * | 7/2008 | Lipscomb | 705/14 |
| 2008/0225167 A1 * | 9/2008 | Beermann | 348/554 |
| 2008/0270978 A1 * | 10/2008 | Leung | 717/106 |
| 2008/0307343 A1 * | 12/2008 | Robert et al. | 715/765 |
| 2008/0307350 A1 * | 12/2008 | Sabatelli et al. | 715/779 |
| 2008/0307363 A1 | 12/2008 | Jalon et al. | |
| 2009/0007198 A1 * | 1/2009 | Lavender et al. | 725/91 |
| 2009/0106674 A1 * | 4/2009 | Bray et al. | 715/762 |
| 2009/0112719 A1 * | 4/2009 | Bhave et al. | 705/14 |
| 2009/0125842 A1 | 5/2009 | Nakayama | |
| 2009/0144642 A1 * | 6/2009 | Crystal | 715/764 |
| 2009/0150769 A1 * | 6/2009 | Konnola et al. | 715/251 |
| 2009/0150784 A1 * | 6/2009 | Denney et al. | 715/722 |
| 2009/0150792 A1 * | 6/2009 | Laakso et al. | 715/738 |
| 2009/0192919 A1 * | 7/2009 | Hess et al. | 705/27 |
| 2009/0199132 A1 * | 8/2009 | Chong et al. | 715/810 |
| 2009/0204895 A1 * | 8/2009 | Bhatt et al. | 715/273 |
| 2009/0210641 A1 * | 8/2009 | Osborne et al. | 711/162 |
| 2009/0300540 A1 * | 12/2009 | Russell | 715/783 |
| 2009/0307615 A1 * | 12/2009 | Jalon et al. | 715/763 |
| 2009/0307626 A1 * | 12/2009 | Jalon et al. | 715/771 |
| 2009/0313586 A1 * | 12/2009 | Sharma et al. | 715/853 |
| 2011/0055673 A1 * | 3/2011 | Teng et al. | 715/200 |
| 2011/0055677 A1 * | 3/2011 | Lima et al. | 715/201 |
| 2011/0113346 A1 * | 5/2011 | O'Shaugnessy et al. | 715/752 |
| 2011/0320488 A1 * | 12/2011 | Rechis et al. | 707/770 |
| 2012/0011210 A1 * | 1/2012 | Cole et al. | 709/206 |
| 2012/0117468 A1 * | 5/2012 | Ragan | 715/273 |

OTHER PUBLICATIONS

Office Action dated Dec. 8, 2010 for U.S. Appl. No. 12/189,668, titled "Browsing or Searching User Interfaces and Other Aspects", filed Aug. 11, 2008, 21 pages.

Office Action dated Jul. 8, 2010 for U.S. Appl. No. 11/760,761, titled "Browsing or Searching User Interfaces and Other Aspects", filed Jun. 9, 2007, 14 pages.

Enright, Andrew Coulter, The Fliptych Interface, The Treehouse + The Cave, Aug. 6, 2006, 2 pages.

Apples iTunes 7 CNET Editors' Review, Sep. 15, 2006, 6 pages.

Windows Media Player 11—The OTHER Album Art Aware App!, May 11, 2006, 4 pages.

Engst, Adam C., iPhoto 6 for Mac OS X: Visual QuickStart Guide, Peachpit Press, Jun. 20, 2006, pp. 9, 45, 50, 100, 105, 122, and 144-146.

Office Action dated Jan. 6, 2010 for U.S. Appl. No. 11/760,761, titled "Browsing or Searching User Interfaces and Other Aspects", filed Jun. 9, 2007, 12 pages.

Microsoft Corporation, "How to modify your folder view settings or to do a custom folder", Apr. 27, 2004, 5 pages.

Ricadela, Aaron, "New Windows Era", InformationWeek, Aug. 1, 2005, 3 pages.

Microsoft Corporation, "Creating Windows XP Icons", Jul. 2001, 12 pages.

Apple Tiger vs Windows Vista, Jun. 25, 2006, 3 pages.

PCT International Search Report and Written Opinion for PCT International Application No. PCT/US2008/005900 mailed Aug. 1, 2008, 14 pages.

U.S. Appl. No. 60/843,832, filed Sep. 11, 2006, titled "Techniques and Systems for Browsing Media Content", by inventors Thomas Dowdy, David Heller, and Anne Jones, 68 pages.

U.S. Appl. No. 60/878,746, filed Jan. 5, 2007, titled "Electronic Device with Image Based Browsers", by inventors Thomas Dowdy, David Heller, and Anne Jones, 98 pages.

Enright, Andrew Coulter, "Dissatisfaction Sows Innovation", The Treehouse + The Cave, http://thetreehouseandthecave.blogspot.com/2004/12/dissatisfaction-sows-innovation.html, Dec. 29, 2004, 6 pages.

Enright, Andrew Coulter, "Dissatisfaction Sows Innovation", The Treehouse + The Cave, http://thetreehouseandthecave.blogspot.com/2004/12/dissatisfaction-sows-innovation.html, Jun. 15, 2006, 18 pages.

Hinze, Cody, "CoverFlow—A beautiful way to browse your MP3s", NOISE blog, http://noise.typepad.com/noise_blog/2006/02/cover_flow_the.html, Feb. 5, 2006, 2 pages.

PCT International Search Report and Written Opinion for PCT International Application No. PCT/US2007/017424, mailed Feb. 4, 2008, 9 pages.

Chandri, Imran, U.S. Appl. No. 60/937,986, filed Jun. 29, 2007, 72 pages.

Office Action dated Dec. 3, 2010 for U.S. Appl. No. 11/760,760, titled "Browsing or Searching User Interfaces and Other Aspects", 19 pages.

Office Action dated May 28, 2005 for European Patent Application No. 07836525.1, titled "Browsing or Searching User Interfaces and Other Aspects", 4 pages.

* cited by examiner

| Name | Parent | Date Modified ▼ | Kind |
|---|---|---|---|
| Today | | | |
| 📁 FindBrowse | Finder | 2/11/04 | Folder |
| 🎬 findBrowse sequence2 | FindBrowse | 2/4/04 | Macromedia Director Movie |
| Yesterday | | | |
| 🎬 findBrowse multi 3.dir | FindBrowse | 2/2/04 | Macromedia Director Movie |
| 🎬 FindBrowse.dir | Find Starting Point | 2/2/04 | Macromedia Director Movie |
| 🎬 findBrowse.sequence | FindBrowse | 2/2/04 | Macromedia Director Movie |
| 📄 browse by date5 header5 copy.tif | assets | 2/2/04 | Adobe Photoshop TIFF file |
| 📁 findBrowse sequ assets | FindBrowse | 2/2/04 | Folder |
| before Yesterday | | | |
| 📁 findBrowse assets | FindBrowse | 2/2/04 | Folder |
| 🎬 find Browse multi 2.dir | FindBrowse | 2/2/04 | Macromedia Director Movie |
| 🎬 find Browse multi 1.dir | FindBrowse | 2/2/04 | Macromedia Director Movie |
| 📄 browse by keyword map + SB2.psd | Finder | 1/12/04 | Adobe Photoshop file |
| 📄 browse by keyword map + SB.psd | Finder | 1/9/04 | Adobe Photoshop file |
| over a Week ago | | | |
| 📄 Browse by keyword map.psd | Finder | 12/17/03 | Adobe Photoshop file |
| 📄 Browse by date5 + info2.psd | Finder | 12/15/03 | Adobe Photoshop file |
| 📄 Browse by folder + info.psd | Finder | 12/15/03 | Adobe Photoshop file |
| 📄 Browse by date5 + info.psd | Finder | 12/15/03 | Adobe Photoshop file |
| 📄 Browse by date5 + actions2.psd | Finder | 12/12/03 | Adobe Photoshop file |
| 📄 Browse by date5 + actions.psd | Finder | 12/11/03 | Adobe Photoshop file |
| 📄 Browse by date5 header5.psd | Finder | 12/10/03 | Adobe Photoshop file |
| 📄 Browse by date5 header4.psd | Finder | 12/10/03 | Adobe Photoshop file |
| 📄 Browse by date5 header3.psd | Finder | 12/10/03 | Adobe Photoshop file |
| 📄 Browse by date5 header2.psd | Finder | 12/10/03 | Adobe Photoshop file |
| 📄 Browse by date5 header.psd | Finder | 12/10/03 | Adobe Photoshop file |
| 📄 Browse by date5.psd | Finder | 12/10/03 | Adobe Photoshop file |
| 📄 Browse by day4.psd | Finder | 12/10/03 | Adobe Photoshop file |
| 📄 Browse by day3.psd | Finder | 12/9/03 | Adobe Photoshop file |
| 📄 Browse by day2.psd | Finder | 12/9/03 | Adobe Photoshop file |
| 📄 Browse by day.psd | Finder | 12/9/03 | Adobe Photoshop file |

FIG. 8A

| Name | Parent | Date Modified | Kind |
|---|---|---|---|
| Adobe Photoshop file | | | |
| browse by date5 + actions.psd | Finder | 12/12/03 | Adobe Photoshop file |
| browse by date5 + actions2.psd | Finder | 12/12/03 | Adobe Photoshop file |
| browse by date5 + info.psd | Finder | 12/15/03 | Adobe Photoshop file |
| browse by date5 + info2.psd | Finder | 12/15/03 | Adobe Photoshop file |
| browse by date5 + header.psd | Finder | 12/10/03 | Adobe Photoshop file |
| browse by date5 + header2.psd | Finder | 12/10/03 | Adobe Photoshop file |
| browse by date5 + header3.psd | Finder | 12/10/03 | Adobe Photoshop file |
| browse by date5 + header4.psd | Finder | 12/11/03 | Adobe Photoshop file |
| browse by date5 + header5.psd | Finder | 12/10/03 | Adobe Photoshop file |
| browse by date5.psd | Finder | 12/9/03 | Adobe Photoshop file |
| browse by day2.psd | Finder | 12/9/03 | Adobe Photoshop file |
| browse by day3.psd | Finder | 12/10/03 | Adobe Photoshop file |
| browse by day4.psd | Finder | 12/10/03 | Adobe Photoshop file |
| browse by folder + info.psd | Finder | 12/15/03 | Adobe Photoshop file |
| browse by keyword map + SB.psd | Finder | 12/9/04 | Adobe Photoshop file |
| browse by keyword map + SB2.psd | Finder | 12/12/04 | Adobe Photoshop file |
| browse by keyword map.psd | Finder | 12/17/03 | Adobe Photoshop file |
| Adobe Photoshop TIFF file | | | |
| browse by date5 header5 copy.tif | assets | 2/2/04 | Adobe Photoshop TIFF file |
| Folder | | | |
| FindBrowse | Finder | 2/11/04 | Folder |
| findBrowse assets | FindBrowse | 2/2/04 | Folder |
| findBrowse sequ asets | FindBrowse | 2/2/04 | Folder |
| Macromedia Director Movie | | | |
| find browse multi 1.dir | FindBrowse | 2/2/04 | Macromedia Director Movie |
| find browse multi 2.dir | FindBrowse | 2/2/04 | Macromedia Director Movie |
| find browse multi 3.dir | FindBrowse | 2/4/04 | Macromedia Director Movie |
| findBrowse sequence | FindBrowse | 2/2/04 | Macromedia Director Movie |
| findBrowse sequence2 | FindBrowse | 2/4/04 | Macromedia Director Movie |
| FindBrowse.dir | Find Starting Point | 2/2/04 | Macromedia Director Movie |

FIG. 8B

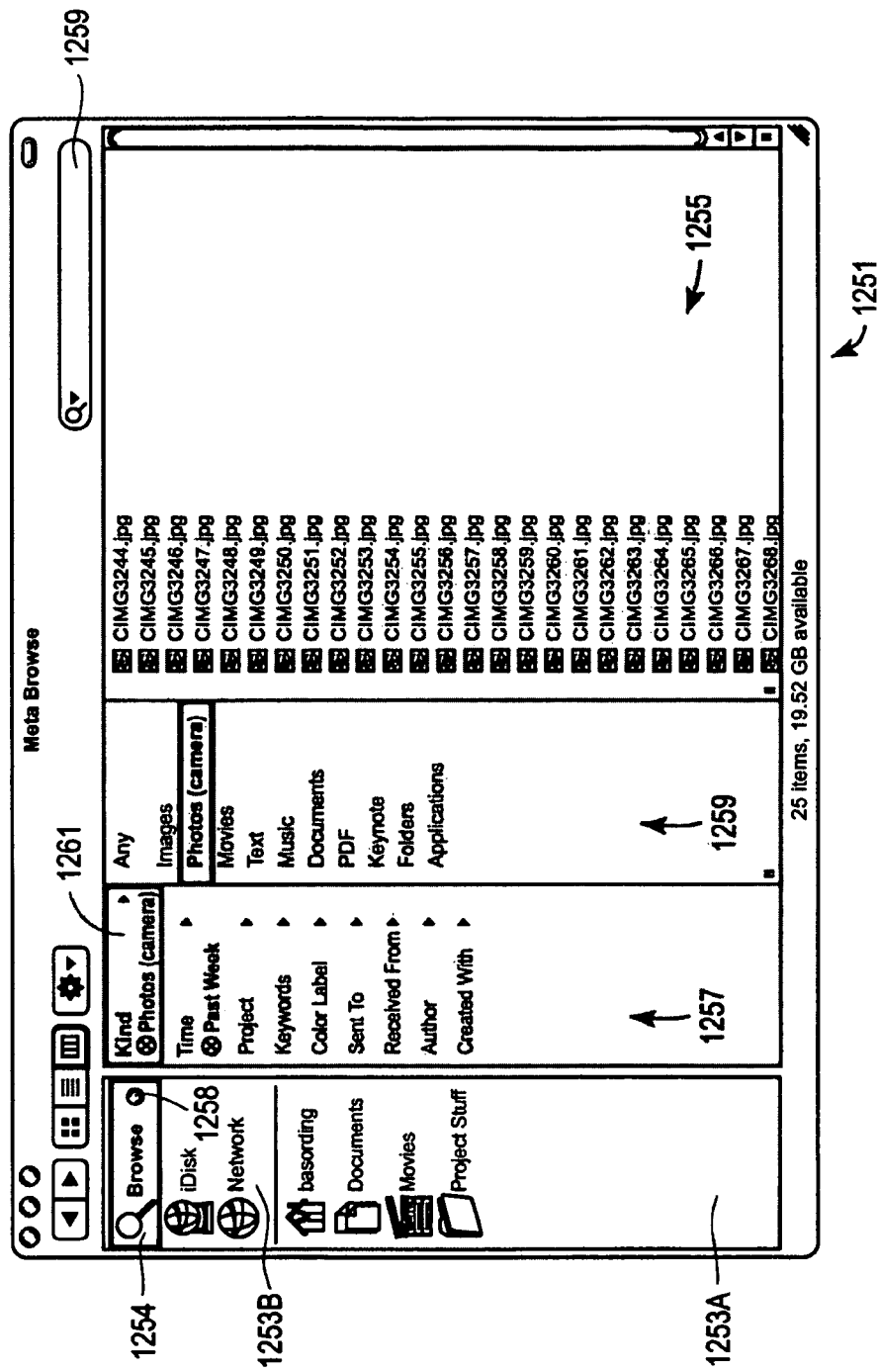

FIG. 13A

| | | | |
|---|---|---|---|
| ○ ○ ○ | Spotlight: forstall | | |
| | | 524 Results | forstall |
| ▼ Contacts | | | Group By: |
| 👤 Freya Forstall | Today | 3:30 pm | Category |
| 👤 Molly Forstall | Today | 2:57 pm | Kind |
| 👤 Nils Forstall | Yesterday | 4:30 pm | Date |
| 👤 Scott Forstall | Tuesday | 2:23 pm | People |
| 👤 Olaf Forstall | June 15 | 1:47 pm | Flat List |
| ▼ Documents | | | Sort Within Group by: |
| 📄 The Forstall Report | Today | 8:07 am | Name |
| 📄 Scott Forstall Speech Transcript | Today | 8:05 am | Date |
| 📄 Budget 2004 | Today | 8:03 am | Kind |
| 📄 Meeting Notes | Yesterday | 3:55 pm | People |
| 📄 Product Rollout 2004 | Yesterday | 2:34 pm | Popularity |
| 102 more... | | | When: |
| ▼ iCal Events | | | Any Date |
| 📅 Rock Climbing Competition | Today | 8:00 am | Today |
| 📅 Freya Forstall's Birthday | Monday | 3:30 pm | Since Yesterday |
| 📅 User Experience meeting | June 1 | 2:56 pm | This Week |
| 📅 SF Film Festival (Finding Forstall) | April 24 | 7:00 pm | This Month |
| 📅 Nils Forstall Graduation | April 23 | 4:00 pm | This Year |
| 344 more... | | | Where: |
| ▼ Mail Messages | | | Everywhere |
| ✉ Scott Forstall Ready for the conference? | Today | 9:30 am | Home |
| ✉ Olaf Forstall Madonna tickets on sale! | Today | 9:25 am | My Hard Drive |
| ✉ Molly Forstall Next week's Dinner Party | Yesterday | 2:13 pm | Firewire Hard Drive |
| ✉ Scott Forstall You've got to see this... | Yesterday | 5:56 pm | iPod |
| ✉ Jimmie Page Playing Forstall's house tonight | June 24 | 11:07 pm | |
| 56 more... | | | |

FIG. 19E

BROWSING OR SEARCHING USER INTERFACES AND OTHER ASPECTS

This application claims the benefit of U.S. Provisional Patent Application No. 61/059,586, filed on Jun. 6, 2008.

BACKGROUND OF THE INVENTION

Modern data processing systems, such as general purpose computer systems, allow the users of such systems to create a variety of different types of data files. For example, a typical user of a data processing system may create text files with a word processing program such as MICROSOFT WORD or may create an image file with an image processing program such as ADOBE's PHOTOSHOP. Numerous other types of files are capable of being created or modified, edited, and otherwise used by one or more users for a typical data processing system. The large number of the different types of files that can be created or modified can present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching for the file's name, or the date of creation, or the date of modification, or the type of file. An example of such a file management system is the FINDER program which operates on MACINTOSH computers from Apple Inc. of Cupertino, Calif. Another example of a file management system program is the WINDOWS EXPLORER program which operates on the WINDOWS operating system from Microsoft Corporation of Redmond, Wash. Both the Finder program and the WINDOWS EXPLORER program include a find command which allows a user to search for files by various criteria including a file name or a date of creation or a date of modification or the type of file. However, this search capability searches through information which is the same for each file, regardless of the type of file. Thus, for example, the searchable data for a MICROSOFT WORD file is the same as the searchable data for an ADOBE PHOTOSHOP file, and this data typically includes the file name, the type of file, the date of creation, the date of last modification, the size of the file and certain other parameters which may be maintained for the file by the file management system.

Certain presently existing application programs allow a user to maintain data about a particular file. This data about a particular file may be considered metadata because it is data about other data. This metadata for a particular file may include information about the author of a file, a summary of the document, and various other types of information. A program such as MICROSOFT WORD may automatically create some of this data when a user creates a file and the user may add additional data or edit the data by selecting the "property sheet" from a menu selection in MICROSOFT WORD. The property sheets in MICROSOFT WORD allow a user to create metadata for a particular file or document. However, in existing systems, a user is not able to search for metadata across a variety of different applications using one search request from the user. Furthermore, existing systems can perform one search for data files, but this search does not also include searching through metadata for those files.

SUMMARY OF THE DESCRIPTION

Methods for managing data in a data processing system and systems for managing data are described herein.

A method of managing data in one exemplary embodiment includes displaying an icon representing a file in a graphical user interface (GUI), where the icon includes one or more predefined decorations. The decorations may be chosen based on the file type, such as slide decorations for presentations, a foldover for documents, etc. This may also be referred to as type conformance. A preview of the content of the file is presented within the icon without launching an application which has created the file (also referred to as the creator application). The pre-defined decorations on the icon may be maintained on the icon while the preview of the content of the file is presented. The format of the icon (e.g., shape of the icon, size of the icon, etc.) may be maintained as well during presentation of the preview.

In some embodiments, various user interface control are provided to allow users to manipulate the presentation of the preview within the icon. Thus, such preview is also referred to as interactive preview and the icon displaying the interactive preview are referred to as a dynamic icon. For example, if the file is a document, buttons may be provided to allow users to page through pages of the document within the icon as if one was turning the pages sequentially. Alternatively, a button may be provided to allow users to zoom into a portion of the document within the icon. Alternatively, a scroll bar may be provided to allow users to scroll up and down the document within the icon. If the file is a video, then a play button may be provided to allow users to initiate playing a preview of the video within the icon. Furthermore, a stop button may be provided to allow users to stop playing the video. In some embodiments, a status indicator, such as a ring, a bar, etc., may be provided to indicate the portion of the preview of the video played. If the file is a still image, then a thumbnail of the image may be displayed as a preview and one or more buttons may be provided to allow users to zoom in or out of the thumbnail of the image.

According to some aspects of the invention, the GUI in which the icon is displayed is associated with a client application, such as a file management application of a hierarchical file system (HFS), such as FINDER from Apple, Inc. of Cupertino, Calif., and WINDOW EXPLORER from Microsoft Corp. of Redmond, Wash. Via the GUI, users may manage files in the HFS. Alternatively, the GUI in which the icon is displayed is associated with a file searching application, such as SPOTLIGHT from Apple, Inc. The GUI may include a result window of the file searching application. Icons of files found by the file searching application may be displayed in the result window and previews of contents of the files, if available, are presented within the icons inside the result window. No additional window may be generated to present the preview.

In some embodiments, the metadata of the file includes a field having an indicator to indicate whether a preview of the content of the file is available. If the preview is available, then a plug-in associated with the creator application of the file is executed to present the preview within the icon. Furthermore, if the preview is interactive according to the metadata, then various user interface control may be generated to allow users to manipulate the presentation of the preview.

According to some aspects of the invention, a background process (also referred to as a daemon) may request icon data of an icon from the plug-in in response to a request from the client application. As mentioned above, the plug-in is associated with a creator application of the file. The icon data includes decorations of the icon (which may be chosen based on the file type) and metadata of the file. As mentioned above, the metadata may include a field having an indicator to indicate whether a preview of the content of the file is available.

After the background process receives the icon data from the plug-in, the background process forwards the icon data to the client application. In some embodiments, the client application analyzes the metadata to determine if a preview of the content of the file is available, and if so, whether the preview is interactive. If the preview is available and is interactive, then the client application may generate an icon usable to present the preview and execute the plug-in to present the preview within the icon. User interface control appropriate for the type of content may be provided to allow users to manipulate the presentation of the preview within the icon.

In at least certain embodiments, the icon data from the plug-in further includes badge data and an image (such as a thumbnail). The badge data includes additional information on the file, the creator application of the file, and/or a third party vendor of the creator application. For example, the badge data may include the version of the creator application. Using the badge data, a badge may be generated and displayed on the icon. For example, a badge containing a graphic image to identify a creator application (e.g., a logo of the creator application) and/or the third party vendor (e.g., a trademark of the third party vendor) may be displayed on an icon of a file created by the creator application. Such a badge may be referred to as an image badge. Alternatively, a badge containing text of the name of the creator application may be displayed on the icon. Such a badge may be referred to as a text badge.

According to some aspects of the invention, icons representing folders may be badged as well. When an icon is created for a folder, it is determined if all files within the folder is produced by applications from a single third party vendor using badge data in icon data of icons representing the files within the folder. If so, a badge indicative of the single third party vendor is generated. Then the badge is displayed on the icon of the folder. The badge may include text, a graphic image, or a combination of both. The icon of the folder may further include decorations for folders, such as a binder.

In some embodiments, the above operations to create icons, to present previews within the icons, and to create badges for the icons are performed by a single computing machine, such as a personal computer. Alternatively, the above operations to create icons, to present previews within the icons, and to create badges for the icons are performed by various computing machines within a system. According to some aspects of the invention, a server in the system initiates an instance of a preview generator for each client machine in the system. The instance sends at least one of a preview and a thumbnail of a file to the client machine responsive to a request for the file from the client machine to allow the client machine to present the preview. The instance may generate an icon representing the file and execute a plug-in associated with a creator application of the file to present the preview within the icon so that the creator application does not have to be launched. Furthermore, the icon may be cached on the server so that other instances of the preview generator may use the same icon.

Other aspects of the present inventions include various data processing systems which perform these methods and machine readable media which cause a data processing system to perform various methods described herein.

BRIEF DESCRIPTION OF THE DRAWINGS

The present invention is illustrated by way of example and not limitation in the figures of the accompanying drawings in which like references indicate similar elements.

FIGS. 8A and 8B show two examples of formats for displaying search results according to one exemplary embodiment of the invention.

FIGS. 12A-12D show alternative embodiments of user interfaces according to the present invention.

FIGS. 13A and 13B show further alternative embodiments of user interfaces according to the present invention.

FIGS. 19A, 19B, 19C, 19D, and 19E show further illustrative embodiments of user interfaces according to the present invention.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc. 2008.

Figure 1:
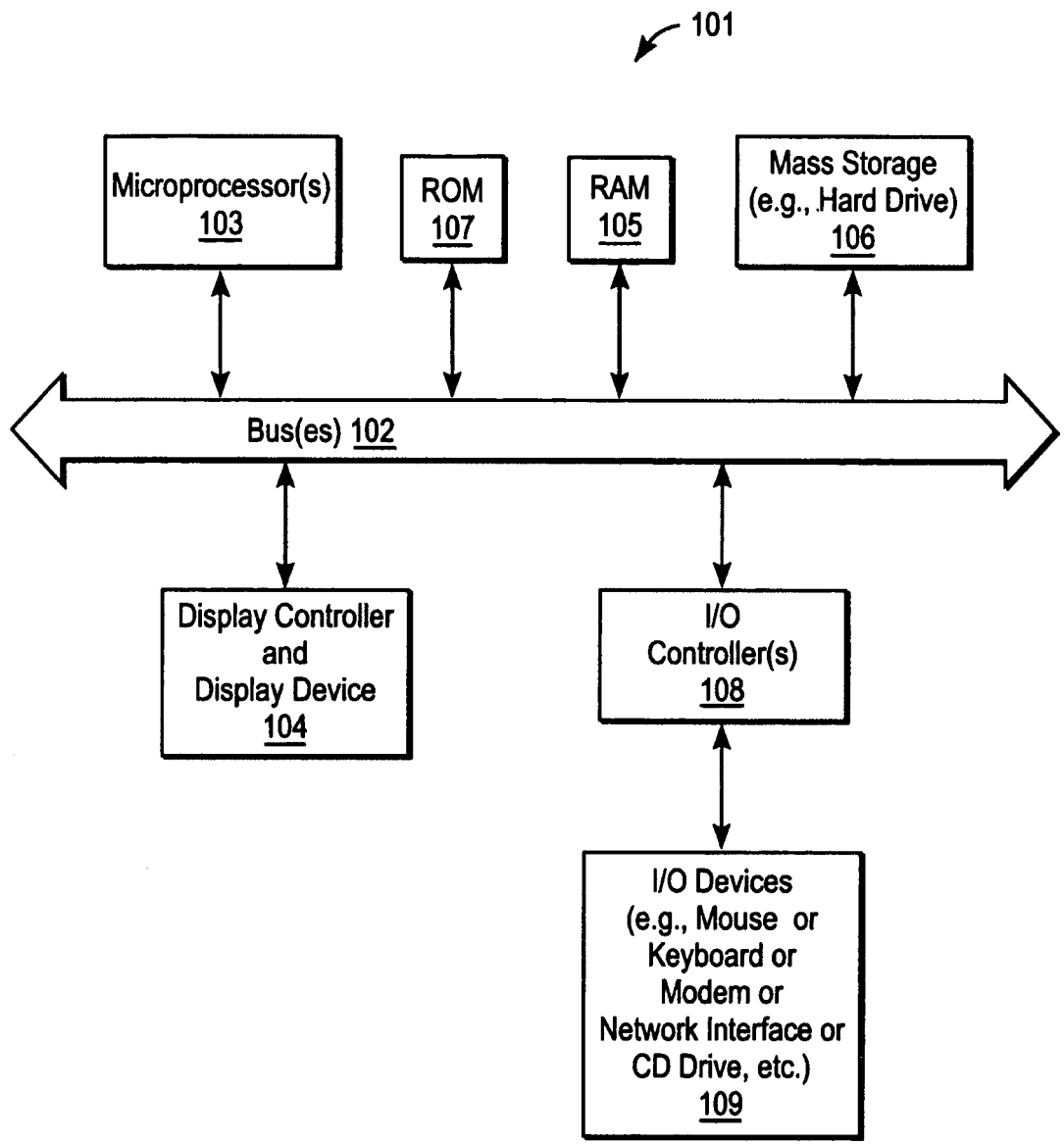
FIG. 1 shows an exemplary embodiment of a data processing system, which may be a general-purpose computer system and which may operate in any of the various methods described herein.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that personal digital assistants (PDAs), cellular telephones, media players (e.g. an iPod), devices which combine aspects or functions of these devices (e.g. a media player combined with a PDA and a cellular telephone in one device), an embedded processing device within another device, network computers, a consumer electronic device, and other data processing systems which have fewer components or perhaps more components may also be used with or to implement one or more embodiments of the present invention. The computer system of FIG. 1 may, for example, be a Macintosh computer from Apple Inc.

As shown in FIG. 1, the computer system 101, which is a form of a data processing system, includes a bus 102 which is coupled to a microprocessor(s) 103 and a ROM (Read Only Memory) 107 and volatile RAM 105 and a non-volatile memory 106. The microprocessor 103 may be a microprocessor from Intel or a G3 or G4 microprocessor from Motorola, Inc. or one or more G5 microprocessors from IBM. The bus 102 interconnects these various components together and also interconnects these components 103, 107, 105, and 106 to a display controller and display device 104 and to peripheral devices such as input/output (I/O) devices which may be mice, keyboards, modems, network interfaces, printers and other devices which are well known in the art. Typically, the input/output devices 109 are coupled to the system through input/output controllers 108. The volatile RAM (Random Access Memory) 105 is typically implemented as dynamic RAM (DRAM) which requires power continually in order to refresh or maintain the data in the memory. The mass storage 106 is typically a magnetic hard drive or a magnetic optical drive or an optical drive or a DVD RAM or other types of memory systems which maintain data (e.g. large amounts of data) even after power is removed from the system. Typically, the mass storage 106 will also be a random access memory although this is not required. While FIG. 1 shows that the mass storage 106 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 108 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, also referred to as a computer readable medium, such as ROM 107, RAM 105, mass storage 106 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Capturing and Use of Metadata Across a Variety of Application Programs

Figure 2:
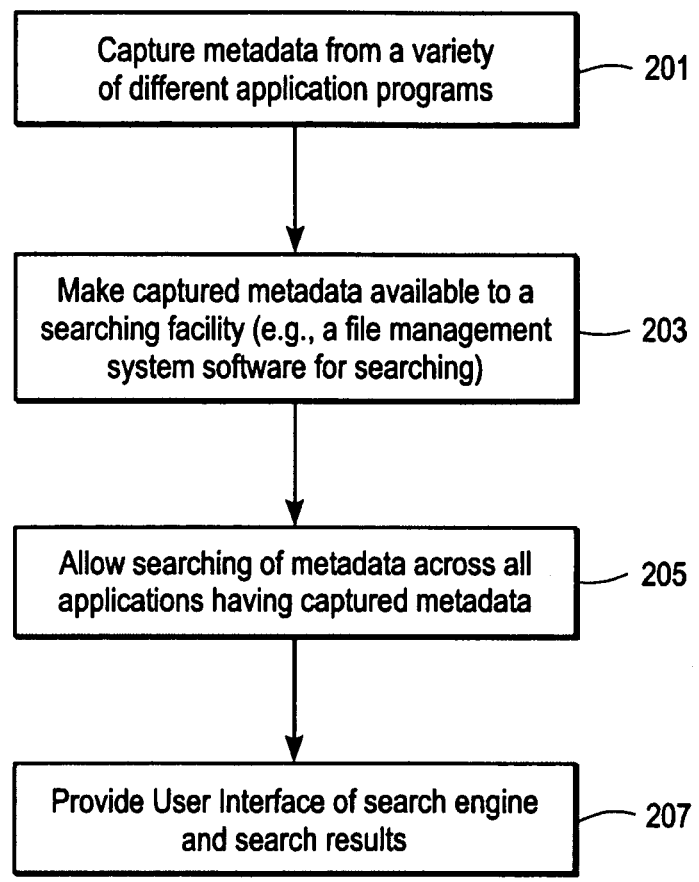
FIG. 2 shows a general example of one exemplary method of one aspect of the invention.
Figure 5:
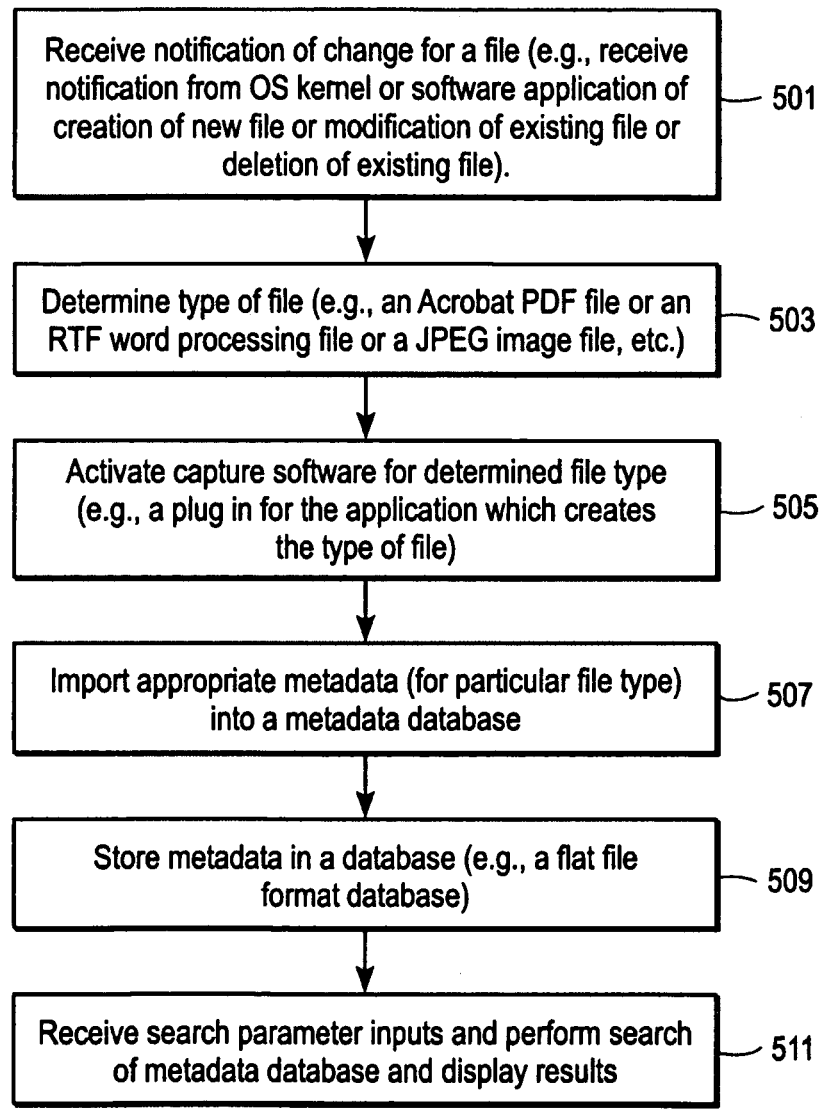
FIG. 5 is a flow chart showing another exemplary method of the present invention.

FIG. 2 shows a generalized example of one embodiment of the present invention. In this example, captured metadata is made available to a searching facility, such as a component of the operating system which allows concurrent searching of all metadata for all applications having captured metadata (and optionally for all non-metadata of the data files). The method of FIG. 2 may begin in operation 201 in which metadata is captured from a variety of different application programs. This captured metadata is then made available in operation 203 to a searching facility, such as a file management system software for searching. This searching facility allows, in operation 205, the searching of metadata across all applications having captured metadata. The method also provides, in operation 207, a user interface of a search engine and the search results which are obtained by the search engine. There are numerous possible implementations of the method of FIG. 2. For example, FIG. 5 shows a specific implementation of one exemplary embodiment of the method of FIG. 2. Alternative implementations may also be used. For example, in an alternative implementation, the metadata may be provided by each application program to a central source which stores the metadata for use by searching facilities and which is managed by an operating system component, which may be, for example, the metadata processing software. The user interface provided in operation 207 may take a variety of different formats, including some of the examples described below as well as user interfaces which are conventional, prior art user interfaces. The metadata may be stored in a database which may be any of a variety of formats including a B tree format or, as described below, in a flat file format according to one embodiment of the invention.

The method of FIG. 2 may be implemented for programs which do not store or provide metadata. In this circumstance, a portion of the operating system provides for the capture of the metadata from the variety of different programs even though the programs have not been designed to provide or capture metadata. For those programs which do allow a user to create metadata for a particular document, certain embodiments of the present invention may allow the exporting back of captured metadata back into data files for applications which maintain metadata about their data files.

Figure 4:
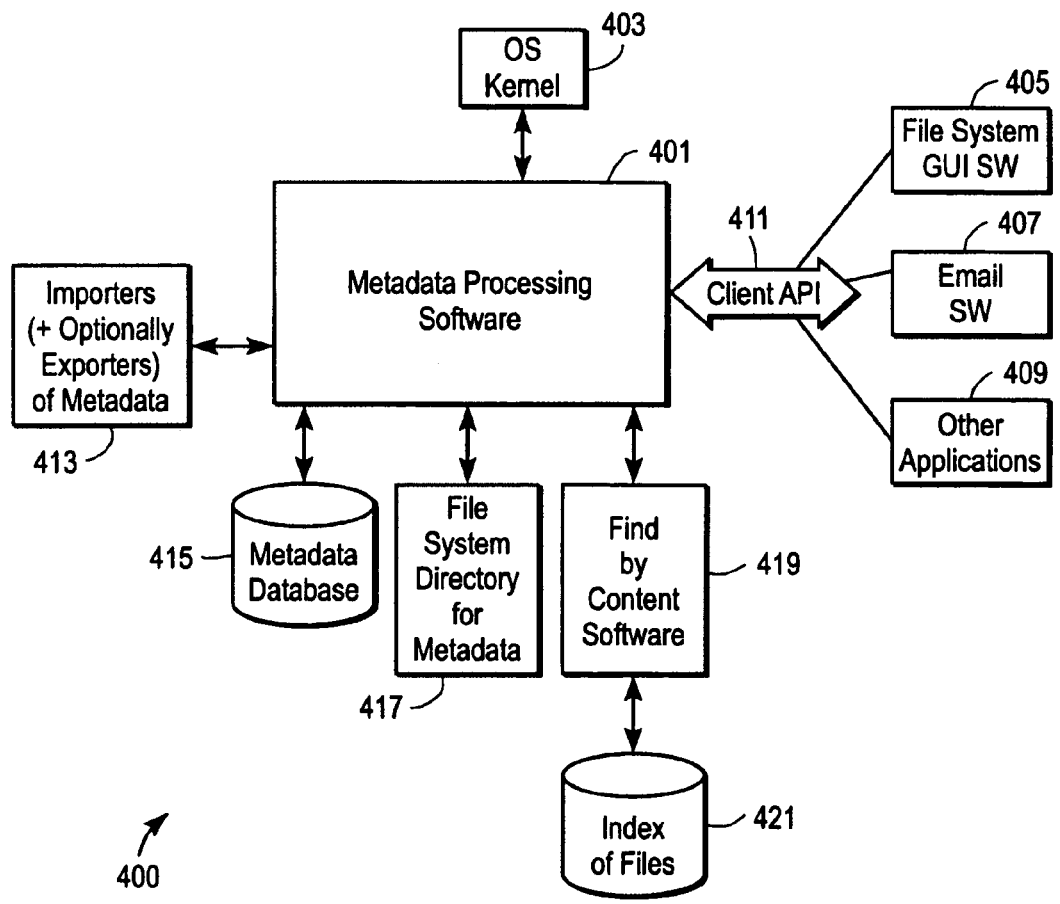
FIG. 4 shows an example of an architecture for managing metadata according to one exemplary embodiment of the invention.

The method of FIG. 2 allows information about a variety of different files created by a variety of different application programs to be accessible by a system wide searching facility, which is similar to the way in which prior art versions of the FINDER or WINDOWS EXPLORER can search for file names, dates of creation, etc. across a variety of different application programs. Thus, the metadata for a variety of different files created by a variety of different application programs can be accessed through an extension of an operating system, and an example of such an extension is shown in FIG. 4 as a metadata processing software which interacts with other components of the system and will be described further below.

Figure 3A:
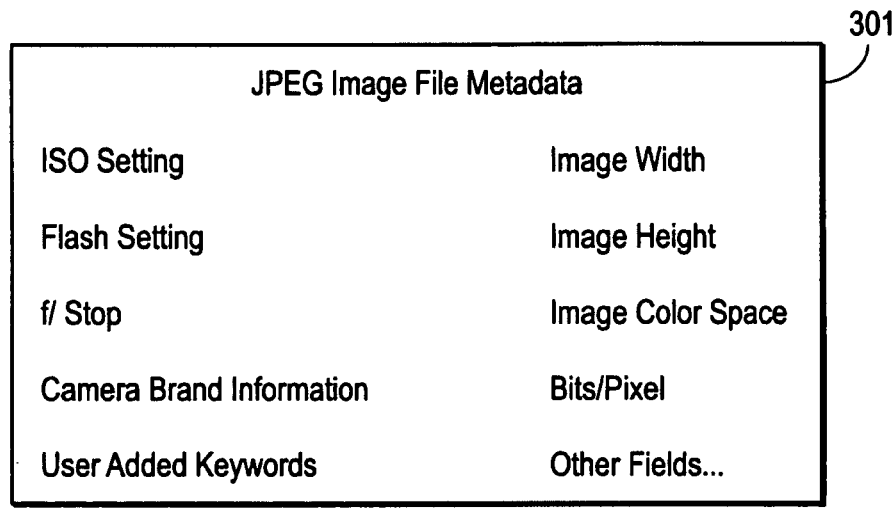
FIG. 3A shows an example of the content of the particular type of metadata for a particular type of file.
Figure 3B:
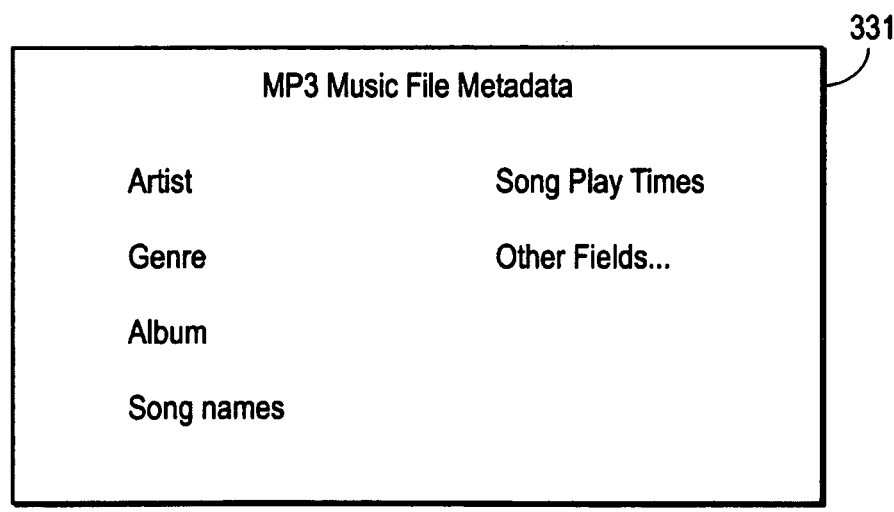
FIG. 3B shows another example of a particular type of metadata for another particular type of file.

FIGS. 3A and 3B show two different metadata formats for two different types of data files. Note that there may be no overlap in any of the fields; in other words, no field in one type of metadata is the same as any field in the other type of metadata. Metadata format 301 may be used for an image file such as a JPEG image file. This metadata may include information such as the image's width, the image's height, the image's color space, the number of bits per pixel, the ISO setting, the flash setting, the F/stop of the camera, the brand name of the camera which took the image, user-added keywords and other fields, such as a field which uniquely identifies the particular file, which identification is persistent through modifications of the file. Metadata format 331 shown in FIG. 3B may be used for a music file such as an MP3 music file. The data in this metadata format may include an identification of the artist, the genre of the music, the name of the album, song names in the album or the song name of the particular file, song play times or the song play time of a particular song and other fields, such as a persistent file ID number which identifies the particular MP3 file from which the metadata was captured. Other types of fields may also be used. The following chart shows examples of the various fields which may be used in metadata for various types of files.

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| Item | n/a | Authors | Who created or contributed to the contents of this item | CFString | Yes | No | Yes | Yes | Yes | Address Book |
| | | Comment | A free form text comment | CFString | No | No | Yes | Yes | Yes | |
| | | ContentType | This is the type that is determined by UTI | CFString | No | ? | No | Yes | Yes | |
| | | ContentTypes | This is the inheritance of the UTI system | CFString | Yes | ? | No | Yes | Yes | |
| | | CreatedDate | When was this item created | CFDate | No | No | No | Yes | Yes | |
| | | DisplayName | The name of the item as the user would like to read it. Very well may be the file name, but it may also be the subject of an e-mail message or the full name of a person, for example. | CFString | No | Yes | Yes | Yes | Yes | Finder (or Launch Services) |
| | | Keywords | This is a list words set by the user to identify arbitrary sets of organization. The scope is determined by the user and can be flexibly used for any kind of organization. For example, Family, Hawaii, Project X, etc. | CFString | Yes | System-provided keywords (if any) | Yes | Yes | Ask | |
| | | Contact Keywords | A list of contacts that are associated with this document, beyond what is captured as Author. This may be a person who's in the picture or a document about a person or contact (performance review, contract) | CFString | Yes | No | Yes | Yes | Ask | Address Book |

-continued

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| | | ModifiedDate | When this item was last modified | CFDate | No | No | No | Yes | | |
| | | Rating | A relative rating (0 to 5 value) on how important a particular item is to you, whether it's a person, file or message | CFNumber | No | n/a | Yes | Yes | | |
| | | RelatedTos | A list of other items that are arbitrarily grouped together. | CFString | Yes | No | Yes | Yes | | |
| | | TextContent | An indexed version of any content text | CFString | No | No | No | Yes | | |
| | | UsedDates | Which days was the document opened/viewed/played | CFDate | Yes | No | No | Yes | | |
| Content/Data | Item | Copyright | Specifies the owner of this content, i.e. Copyright Apple Inc. | CFString | No | No | Yes | Yes | | |
| | | CreatorApp | Keeps track of the application that was used to create this document (if it's known). | CFString | No | ? | No | Yes | | |
| | | Languages | The languages that this document is composed in (for either text or audio-based media) | CFString | Yes | Yes | Yes | Yes | | |
| | | ParentalControl | A field that is used to determine whether this is kid-friendly content or not | CFString | No | ? | Yes | Yes | | |
| | | Publishers | The name or a person or organization that published this content. | CFString | Yes | No | Yes | Yes | | Address Book |
| | | PublishedDate | The original date that this content was published (if it was), independent of created date. | CFDate | No | No | Yes | Yes | | |
| | | Reviewers | A list of contacts who have reviewed the contents of this file. This would have to be set explicitly by an application. | CFString | Yes | No | Yes | Yes | | Address Book |
| Image | Data | ReviewStatus | Free form text that used to specify where the document is in any arbitrary review process | CFString | No | ? | Yes | Yes | | |
| | | TimeEdited | Total time spent editing document | CFDate | No | No | No | Yes | | |
| | | WhereTos | Where did this go to, eg. CD, printed, backedup | CFString | Yes | System-provided words only (if any) | ? | Yes | | |
| | | WhereFroms | Where did this come from, e.g. camera, email, web download, CD | CFString | Yes | System-provided words only (if any) | ? | Yes | | |
| | | BitsPerSample | What is the bit depth of the image (8-bit, 16-bit, etc.) | CFNumber | No | | | Yes | | |
| | | ColorSpace | What color space model is this document following | CFString | No | | | Yes | | ColorSync Utility? |
| | | ImageHeight | The height of the image in pixels | CFNumber | No | | | Yes | | |
| | | ImageWidth | The width of the image in pixels | CFNumber | No | | | Yes | | |
| | | ProfileName | The name of the color profile used with for image | CFString | No | | | Yes | | ColorSync Utility? |
| | | ResolutionWidth | Resolution width of this image (i.e. dpi from a scanner) | CFNumber | No | | | Yes | | |
| | | ResolutionHeight | Resolution height of this image (i.e. dpi from a scanner) | CFNumber | No | | | Yes | | |

-continued

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| | | LayerNames | For image formats that contain "named" layers (e.g. Photoshop files) | CFString | Yes | | | Yes | | |
| | | Aperture | The f-stop rating of the camera when the image was taken | CFNumber | No | | | Yes | | |
| | | CameraMake | The make of the camera that was used to acquire this image (e.g. Nikon) | CFString | No | Yes | | Yes | | |
| | | CameraModel | The model of the camera used to acquire this image (Coolpix 5700) | CFString | No | Yes | | Yes | | |
| | | DateTimeOriginal | Date/time the picture was taken | CFDate | No | | | Yes | | |
| | | ExposureMode | Mode that was used for the exposure | CFString | No | | | Yes | | |
| | | ExposureTime | Time that the lens was exposed while taking the picture | CFDate | No | | | Yes | | |
| | | Flash | This attribute is overloaded with information about red-eye reduction. This is not a binary value | CFNumber | No | | | Yes | | |
| | | GPS | Raw value received from GPS device associated with photo acquisition. It hasn't necessarily been translated to a user-understandable location. | CFString | No | | | Yes | | |
| | | ISOSpeed | The ISO speed the camera was set to when the image was acquired | CFNumber | No | | | Yes | | |
| | | Orientation | The orientation of the camera when the image was acquired | CFString | No | | | Yes | | |
| | | WhiteBalance | The white balance setting of the camera when the picture was taken | CFNumber | No | | | Yes | | |
| | | EXIFversion | The version of EXIF that was used to generate the metadata for the image | CFString | No | | | Yes | | |
| Time-based | Data | AcquisitionSources | The name or type of device that used to acquire the media | CFString | Yes | | | Yes | | |
| | | Codecs | The codecs used to encode/decode the media | CFString | Yes | | | Yes | | |
| | | DeliveryType | FastStart or RTSP | CFString | No | | | Yes | | |
| | | Duration | The length of time that the media lasts | CFNumber | No | | | Yes | | |
| | | Streamable | Whether the content is prepared for purposes of streaming | CFBoolean | No | | | Yes | | |
| | | TotalBitRate | The total bit rate (audio & video combined) of the media. | CFNumber | No | | | Yes | | |
| | | AudioBitRate | The audio bit rate of the media | CFNumber | No | | | Yes | | |
| | | AspectRatio | The aspect ratio of the video of the media | CFString | No | | | Yes | | |
| | | ColorSpace | The color space model used for the video aspect of the media | CFString | No | | | Yes | | |
| | | FrameHeight | The frame height in pixels of the video in the media | CFNumber | No | | | Yes | | |
| | | FrameWidth | The frame width in pixels of the video in the media | CFNumber | No | | | Yes | | |
| | | ProfileName | The name of the color profile used on the video portion of the media | CFString | No | | | Yes | | |

-continued

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| | | VideoBitRate | The bit rate of the video aspect of the media | CFNumber | No | | | Yes | | |
| Text | Data | Subject | The subject of the text. This could be metadata that's supplied with the text or something automatically generated with technologies like VTWIN | CFString | No | | | Yes | | |
| | | PageCount | The number of printable pages of the document | CFNumber | No | | | Yes | | |
| | | LineCount | The number of lines in the document | CFNumber | No | | | Yes | | |
| | | WordCount | The number of words in the document | CFNumber | No | | | Yes | | |
| | | URL | The URL that will get you to this document (or at least did at one time). Relevant for saved HTML documents, bookmarks, RSS feeds, etc. | CFString | No | | | Yes | | |
| | | PageTitle | The title of a web page. Relevant to HTML or bookmark documents | CFString | No | | | Yes | | |
| | | Google Hierarchy | Structure of where this page can be found in the Google hierarchy. Relevant to HTML or bookmark documents | CFString | No | | | Yes | | |
| Compound document | Data | <Abstract> | There are no specific attributes assigned to this item. This is to catch all app-specific file formats that fall within Data, but don't fit into any of the other types. Typically these documents have multiple types of media embedded within them. (e.g. P | n/a | n/a | n/a | n/a | n/a | n/a | n/a |
| PDF | Compound document | NumberOfPages | The number of printable pages in the document | CFNumber | No | | | Yes | | |
| | | PageSize | The size of the page stored as points | CFNumber | No | | No | Yes | | |
| | | PDFTitle | PDF-specific title metadata for the document | CFString | No | | ? | Yes | | |
| | | PDFAuthor | PDF-specific author metadata for the document | CFString | No | | ? | Yes | | Address Book |
| | | PDFSubject | PDF-specific subject metadata for the document | CFString | No | | ? | Yes | | |
| | | PDFKeywords | PDF-specific keywords metadata for the document | CFString | Yes | | ? | Yes | | |
| | | PDFCreated | PDF-specific created metadata for the document | CFDate | No | | ? | Yes | | |
| | | PDFModified | PDF-specific modified metadata for the document | CFDate | No | | ? | Yes | | |
| | | PDFVersion | PDF-specific version metadata for the document | CFString | No | | ? | Yes | | |
| | | SecurityMethod | Method by which this document is kept secure | CFString | No | | | Yes | | |
| Presentation (Keynote) | Compound document | SlideTitles | A collection of the titles on slides | CFString | Yes | | | Yes | | |
| | | SlideCount | The number of slides | CFString | No | | | Yes | | |
| | | SpeakerNotesContent | The content of all the speaker notes from all of the slides together | CFString | ? | | | Yes | | |

-continued

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| Application | Item | Categories | The kind of application this is: productivity, games, utility, graphics, etc. A set list that | CFString | Yes | | | Yes | | |
| Message | Item | Recipients | Maps to To and Cc: addresses in a mail message. | CFString | Yes | | | Yes | | Address Book |
| | | Priority | The priority of the message as set by the sender | CFString | No | | | Yes | | |
| | | AttachmentNames | The list of filenames that represent attachments in a particular message (should be actionable within the Finder) | CFString | Yes | | | Yes | | |
| | | Authors | maps to From address in mail message | CFString | Yes | No | Yes | Yes | Yes | Address Book |
| | | Comment | Not applicable to Mail right now (should we consider?) | CFString | No | No | Yes | Yes | Yes | |
| | | ContentType | | CFString | No | | No | Yes | Yes | |
| | | ContentTypes | | CFString | Yes | | No | Yes | Yes | |
| | | CreatedDate | When was this message was sent or received | CFDate | No | No | No | Yes | Yes | |
| | | DisplayName | Subject of the message | CFString | No | Yes | Yes | Yes | Yes | |
| | | Keywords | There will be a way to set keywords within Mail | CFString | Yes | System-provided keywords (if any) | Yes | Yes | Ask | |
| | | Contact Keywords | Could be where recipients are held | CFString | Yes | No | Yes | Yes | Ask | Address Book |
| | | ModifiedDate | Not applicable | CFDate | No | No | No | Yes | | |
| | | Rating | A relative rating (0 to 5 stars) on how important a particular message is to you (separate from a message's Priority) | CFNumber | No | n/a | Yes | Yes | | |
| | | RelatedTos | Potentially threaded messages could be put into this category | CFString | Yes | No | Yes | Yes | | |
| | | TextContent | An indexed version of the mail message | CFString | No | No | No | Yes | | |
| | | UsedDates | The day/time in which the mail message was viewed/read | CFDate | Yes | No | No | Yes | | |
| Contact | Item | Company | The company that this contact is an employee of | CFString | No | | | Yes | | Address Book |
| | | E-mails | A list of e-mail addresses that this contact has | CFString | Yes | | | Yes | | Mail |
| | | IMs | A list of instant message handles this contact has | CFString | Yes | | | Yes | | iChat |
| | | Phones | A list of phone numbers that relate to this contact | CFString | Yes | | | | | |
| | | Addresses | A list of physical addresses that relate to this person | CFString | Yes | | | | | |
| | | Authors | the name of the owner of the Address Book (current user name) | CFString | Yes | No | Yes | Yes | Yes | Address Book |
| | | Comment | | CFString | No | No | Yes | Yes | Yes | |
| | | ContentType | | CFString | No | | No | Yes | Yes | |
| | | ContentTypes | | CFString | Yes | | No | Yes | Yes | |
| | | CreatedDate | date the user entered this into his AddressBook (either through import or direct entry) | CFDate | No | No | No | Yes | Yes | |
| | | DisplayName | Composite name of contact (First Name, Last Name) | CFString | No | Yes | Yes | Yes | Yes | |
| | | Keywords | There will be a way to set keywords within Address Book | CFString | Yes | System-provided keywords (if any) | Yes | Yes | Ask | |

| Item name | Parent in hierarchy | Attribute name | Description/Notes | CFType | Multi-value | Localized | User settable | Gettable | Copied with copy | App viewable |
|---|---|---|---|---|---|---|---|---|---|---|
| | | Contact Keywords | | CFString | Yes | No | Yes | Yes | Ask | Address Book |
| | | ModifiedDate | Last time this contact entry was modified | CFDate | No | No | No | Yes | | |
| | | Rating | A relative rating (0 to 5 stars) on how important a particular contact is to you (separate from a message's Priority) | CFNumber | No | n/a | Yes | Yes | | |
| | | RelatedTos | (potentially could be used to associate people from the same company or family) | CFString | Yes | No | Yes | Yes | | |
| | | TextContent | An indexed version of the Notes section | CFString | No | No | No | Yes | | |
| | | UsedDates | The day/time in which the contact entry was viewed in Address Book | CFDate | Yes | No | No | Yes | | |
| Meeting (TBD) | Item | Body | text, rich text or document that represents the full content of the event | CFString | No | | | Yes | | |
| | | Description | text describing the event | CFString | No | | | Yes | | |
| | | EventTimes | time/date the event starts | CFDate | Yes | | | Yes | | |
| | | Duration | The length of time that the meeting lasts | CFNumber | No | | | Yes | | |
| | | Invitees | The list of people who are invited to the meeting | CFString | Yes | | | Yes | | Address Book |
| | | Location | The name of the location where the meeting is taking place | CFString | No | | | Yes | | |

One particular field which may be useful in the various metadata formats would be a field which includes an identifier of a plug-in or other software element which may be used to capture metadata from a data file and/or export metadata back to the creator application. Another field which may be useful in the various metadata formats would be a field which includes an indicator on whether a preview of the content of a file is available. In some embodiments, the field may further include another indicator to tell whether the preview, if available, is interactive.

Various different software architectures may be used to implement the functions and operations described herein. The following discussion provides one example of such an architecture, but it will be understood that alternative architectures may also be employed to achieve the same or similar results. The software architecture shown in FIG. 4 is an example which is based upon the MACINTOSH operating system. The architecture 400 includes a metadata processing software 401 and an operating system (OS) kernel 403 which is operatively coupled to the metadata processing software 401 for a notification mechanism which is described below. The metadata processing software 401 is also coupled to other software programs such as a file system graphical user interface software 405 (which may be the FINDER), an email software 407, and other applications 409. These applications are coupled to the metadata processing software 401 through client application program interface 411 which provide a method for transferring data and commands between the metadata processing software 401 and the software 405, 407, and 409. These commands and data may include search parameters specified by a user as well as commands to perform searches from the user, which parameters and commands are passed to the metadata processing software 401 through the interface 411. The metadata processing software 401 is also coupled to a collection of importers 413 which extract data from various applications. In particular, in one exemplary embodiment, a text importer is used to extract text and other information from word processing or text processing files created by word processing programs such as MICROSOFT WORD, etc. This extracted information is the metadata for a particular file. Other types of importers extract metadata from other types of files, such as image files or music files. In this particular embodiment, a particular importer is selected based upon the type of file which has been created and modified by an application program. For example, if the data file was created by PHOTOSHOP, then an image importer for PHOTOSHOP may be used to input the metadata from a PHOTOSHOP data file into the metadata database 415 through the metadata processing software 401. On the other hand, if the data file is a word processing document, then an importer designed to extract metadata from a word processing document is called upon to extract the metadata from the word processing data file and place it into the metadata database 415 through the metadata processing software 401. Typically, a plurality of different importers may be required in order to handle the plurality of different application programs which are used in a typical computer system. The importers 413 may optionally include a plurality of exporters which are capable of exporting the extracted metadata for particular types of data files back to property sheets or other data components maintained by certain application programs. For example, certain application programs may maintain some metadata for each data file created by the program, but this metadata is only a subset of the metadata extracted by an importer from this type of data file. In this instance, the exporter may export back additional metadata or may simply insert metadata into blank fields of metadata maintained by the application program.

The software architecture 400 also includes a file system directory 417 for the metadata. This file system directory keeps track of the relationship between the data files and their metadata and keeps track of the location of the metadata object (e.g. a metadata file which corresponds to the data file from which it was extracted) created by each importer. In one exemplary embodiment, the metadata database is maintained as a flat file format as described below, and the file system directory 417 maintains this flat file format. One advantage of a flat file format is that the data is laid out on a storage device as a string of data without references between fields from one metadata file (corresponding to a particular data file) to another metadata file (corresponding to another data file). This arrangement of data will often result in faster retrieval of information from the metadata database 415.

The software architecture 400 of FIG. 4 also includes find by content software 419 which is operatively coupled to a database 421 which includes an index of files. The index of files represents at least a subset of the data files in a storage device and may include all of the data files in a particular storage device (or several storage devices), such as the main hard drive of a computer system. The index of files may be a conventional indexed representation of the content of each document. The find by content software 419 searches for words in that content by searching through the database 421 to see if a particular word exists in any of the data files which have been indexed. The find by content software functionality is available through the metadata processing software 401 which provides the advantage to the user that the user can search concurrently both the index of files in the database 421 (for the content within a file) as well as the metadata for the various data files being searched. The software architecture shown in FIG. 4 may be used to perform the method shown in FIG. 5 or alternative architectures may be used to perform the method of FIG. 5.

The method of FIG. 5 may begin in operation 501 in which a notification of a change for a file is received. This notification may come from the OS kernel 403 which notifies the metadata processing software 401 that a file has been changed. This notification may come from sniffer software elements which detect new or modified files and deletion of files. This change may be the creation of a new file or the modification of an existing file or the deletion of an existing file. The deletion of an existing file causes a special case of the processing method of FIG. 5 and is not shown in FIG. 5. In the case of a deletion, the metadata processing software 401, through the use of the file system directory 417, deletes the metadata file in the metadata database 415 which corresponds to the deleted file. The other types of operations, such as the creation of a new file or the modification of an existing file, causes the processing to proceed from operation 501 to operation 503 in which the type of file which is the subject of the notification is determined. The file may be an Acrobat PDF file or an RTF word processing file or a JPEG image file, etc. In any case, the type of the file is determined in operation 503. This may be performed by receiving from the OS kernel 403 the type of file along with the notification or the metadata processing software 401 may request an identification of the type of file from the file system graphical user interface software 405 or similar software which maintains information about the data file, such as the creator application or parent application of the data file. It will be understood that in one exemplary embodiment, the file system graphical user interface software 405 is the Finder program which operates on the MACINTOSH operating system. In alternative embodiments, the file system graphical user interface system may be WINDOWS EXPLORER which operates on MICROSOFT's WINDOWS operating system. After the type of file has been determined in operation 503, the appropriate capture software (e.g. one of the importers 413) is activated for the determined file type. The importers may be a plug-in for the particular application which created the type of file about which notification is received in operation 501. Once activated, the importer or capture software imports the appropriate metadata (for the particular file type) into the metadata database, such as metadata database 415 as shown in operation 507. Then in operation 509, the metadata is stored in the database. In one exemplary embodiment, it may be stored in a flat file format. Then in operation 511, the metadata processing software 401 receives search parameter inputs and performs a search of the metadata database (and optionally also causes a search of non-metadata sources such as the index of files 421) and causes the results of the search to be displayed in a user interface. This may be performed by exchanging information between one of the applications, such as the software 405 or the software 407 or the other applications 409 and the metadata processing software 401 through the interface 411. For example, the file system software 405 may present a graphical user interface, allowing a user to input search parameters and allowing the user to cause a search to be performed. This information is conveyed through the interface 411 to the metadata processing software 401 which causes a search through the metadata database 415 and also may cause a search through the database 421 of the indexed files in order to search for content within each data file which has been indexed. The results from these searches are provided by the metadata processing software 401 to the requesting application which, in the example given here, was the software 405, but it will be appreciated that other components of software, such as the email software 407, may be used to receive the search inputs and to provide a display of the search results. Various examples of the user interface for inputting search requests and for displaying search results are described herein and shown in the accompanying drawings.

It will be appreciated that the notification, if done through the OS kernel, is a global, system wide notification process such that changes to any file will cause a notification to be sent to the metadata processing software. It will also be appreciated that in alternative embodiments, each application program may itself generate the necessary metadata and provide the metadata directly to a metadata database without the requirement of a notification from an operating system kernel or from the intervention of importers, such as the importers 413. Alternatively, rather than using OS kernel notifications, an embodiment may use software calls from each application to a metadata processing software which receives these calls and then imports the metadata from each file in response to the call.

Figure 6:
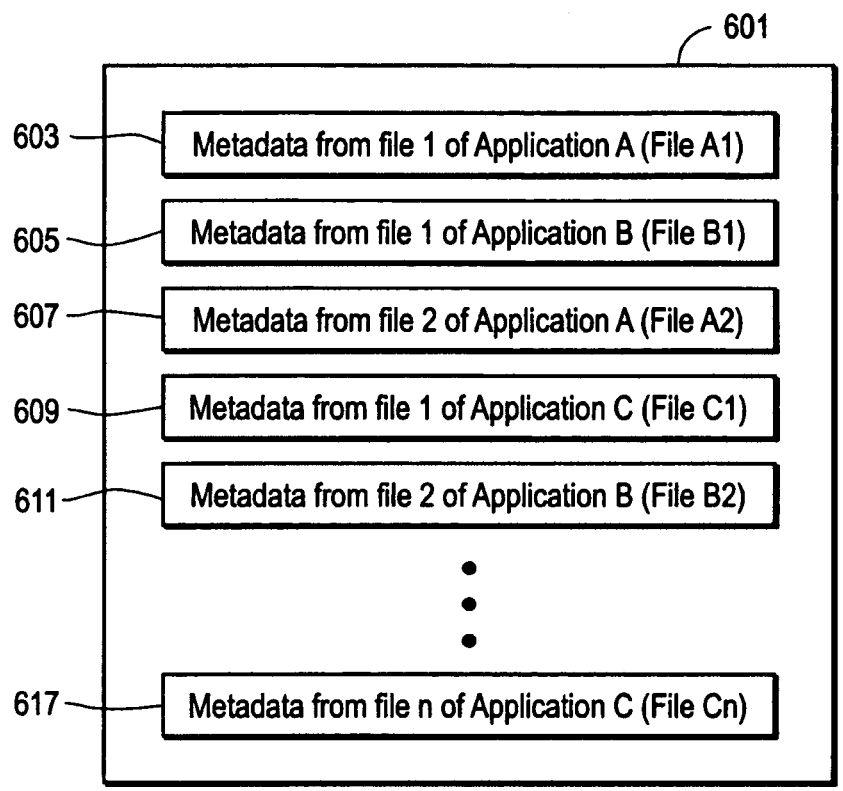
FIG. 6 shows an example of a storage format, which utilizes a flat file format for metadata according to one exemplary embodiment of the invention.

As noted above, the metadata database 415 may be stored in a flat file format in order to improve the speed of retrieval of information in most circumstances. The flat file format may be considered to be a non-B tree, non-hash tree format in which data is not attempted to be organized but is rather stored as a stream of data. Each metadata object or metadata file will itself contain fields, such as the fields shown in the examples of FIGS. 3A and 3B. However, there will typically be no relationship or reference or pointer from one field in one metadata file to the corresponding field (or another field) in the next metadata file or in another metadata file of the same file type. FIG. 6 shows an example of the layout in a flat file format of metadata. The format 601 includes a plurality of metadata files for a corresponding plurality of data files. As shown in FIG. 6, metadata file 603 is metadata from file 1 of application A and may be referred to as metadata file A1.

Similarly, metadata file 605 is metadata from file 1 of application B and may be referred to as metadata file B1. Each of these metadata files typically would include fields which are not linked to other fields and which do not contain references or pointers to other fields in other metadata files. It can be seen from FIG. 6 that the metadata database of FIG. 6 includes metadata files from a plurality of different applications (applications A, B, and C) and different files created by each of those applications. Metadata files 607, 609, 611, and 617 are additional metadata files created by applications A, B, and C as shown in FIG. 6.

A flexible query language may be used to search the metadata database in the same way that such query languages are used to search other databases. The data within each metadata file may be packed or even compressed if desirable. As noted above, each metadata file, in certain embodiments, will include a persistent identifier which uniquely identifies its corresponding data file. This identifier remains the same even if the name of the file is changed or the file is modified. This allows for the persistent association between the particular data file and its metadata.

User Interface Aspects

Various different examples of user interfaces for inputting search parameters and for displaying search results are provided herein. It will be understood that some features from certain embodiments may be mixed with other embodiments such that hybrid embodiments may result from these combinations. It will be appreciated that certain features may be removed from each of these embodiments and still provide adequate functionality in many instances.

Figure 7A:
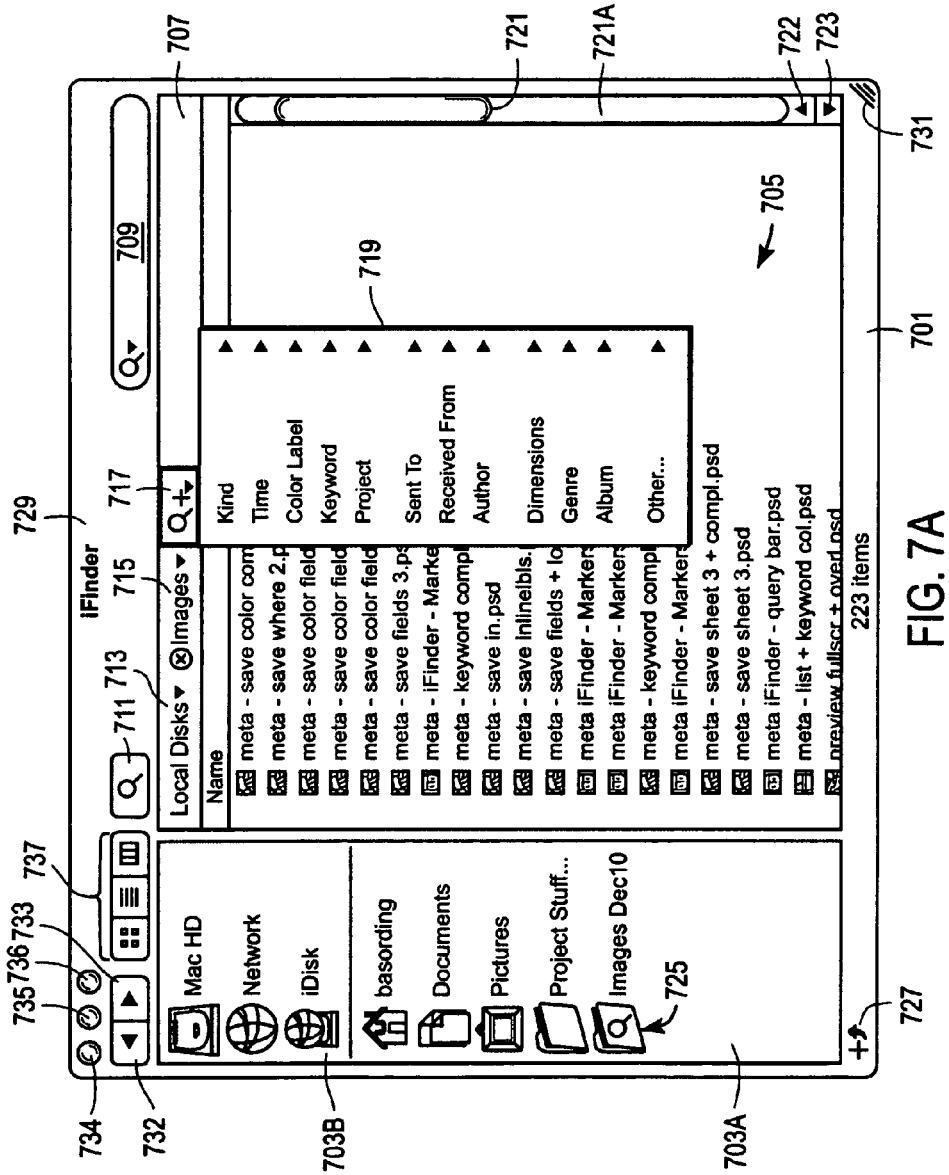
FIGS. 7A-7E show a sequence of graphical user interfaces provided by one exemplary embodiment in order to allow searching of metadata and/or other data in a data processing system.

FIG. 7A shows a graphical user interface which is a window which may be displayed on a display device which is coupled to a data processing system such as a computer system. The window 701 includes a side bar having two regions 703A, which is a user-configurable region, and 703B, which is a region which is specified by the data processing system. Further details in connection with these side bar regions may be found in co-pending U.S. patent application Ser. No. 10/873,661 filed Jun. 21, 2004, and entitled "Methods and Apparatuses for Operating a Data Processing System," by inventors Donald Lindsay and Bas Ording. The window 701 also includes a display region 705 which in this case displays the results of searches requested by the user. The window 701 also includes a search parameter menu bar 707 which includes configurable pull down menus 713, 715, and 717. The window 701 also includes a text entry region 709 which allows a user to enter text as part of the search query or search parameters. The button 711 may be a start search button which a user activates in order to start a search based upon the selected search parameters. Alternatively, the system may perform a search as soon as it receives any search parameter inputs or search queries from the user rather than waiting for a command to begin the search. The window 701 also includes a title bar 729 which may be used in conjunction with a cursor control device to move, in a conventional manner, the window around a desktop which is displayed on a display device. The window 701 also includes a close button 734, a minimize button 735, and a resize button 736 which may be used to close or minimize or resize, respectively, the window. The window 701 also includes a resizing control 731 which allows a user to modify the size of the window on a display device. The window 701 further includes a back button 732 and a forward button 733 which function in a manner which is similar to the back and forward buttons on a web browser, such as Internet Explorer or Safari. The window 701 also includes view controls which include three buttons for selecting three different types of views of the content within the display region 705. When the contents found in a search exceed the available display area of a display region 705, scroll controls, such as scroll controls 721, 722, and 723, appear within the window 701. These may be used in a conventional manner, for example, by dragging the scroll bar 721 within the scroll region 721A using conventional graphical user interface techniques.

The combination of text entry region 709 and the search parameter menu bar allow a user to specify a search query or search parameters. Each of the configurable pull down menus presents a user with a list of options to select from when the user activates the pull down menu. As shown in FIG. 7A, the user has already made a selection from the configurable pull down menu 713 to specify the location of the search, which in this case specifies that the search will occur on the local disks of the computer systems. Configurable pull down menu 715 has also been used by the user to specify the kind of document which is to be searched for, which in this case is an image document as indicated by the configurable pull down menu 715 which indicates "images" as the selected configuration of this menu and hence the search parameter which it specifies. The configurable pull down menu 717, as shown in FIG. 7A, represents an add search parameter pull down menu. This add search parameter pull down menu allows the user to add additional criteria to the search query to further limit the search results. In the embodiment shown in FIG. 7A, each of the search parameters is logically ANDed in a Boolean manner. Thus the current search parameter specified by the user in the state shown in FIG. 7A searches all local disks for all images, and the user is in the middle of the process of selecting another search criteria by having selected the add search criteria pull down menu 717, resulting in the display of the pull down menu 719, which has a plurality of options which may be selected by the user.

Figure 7B:
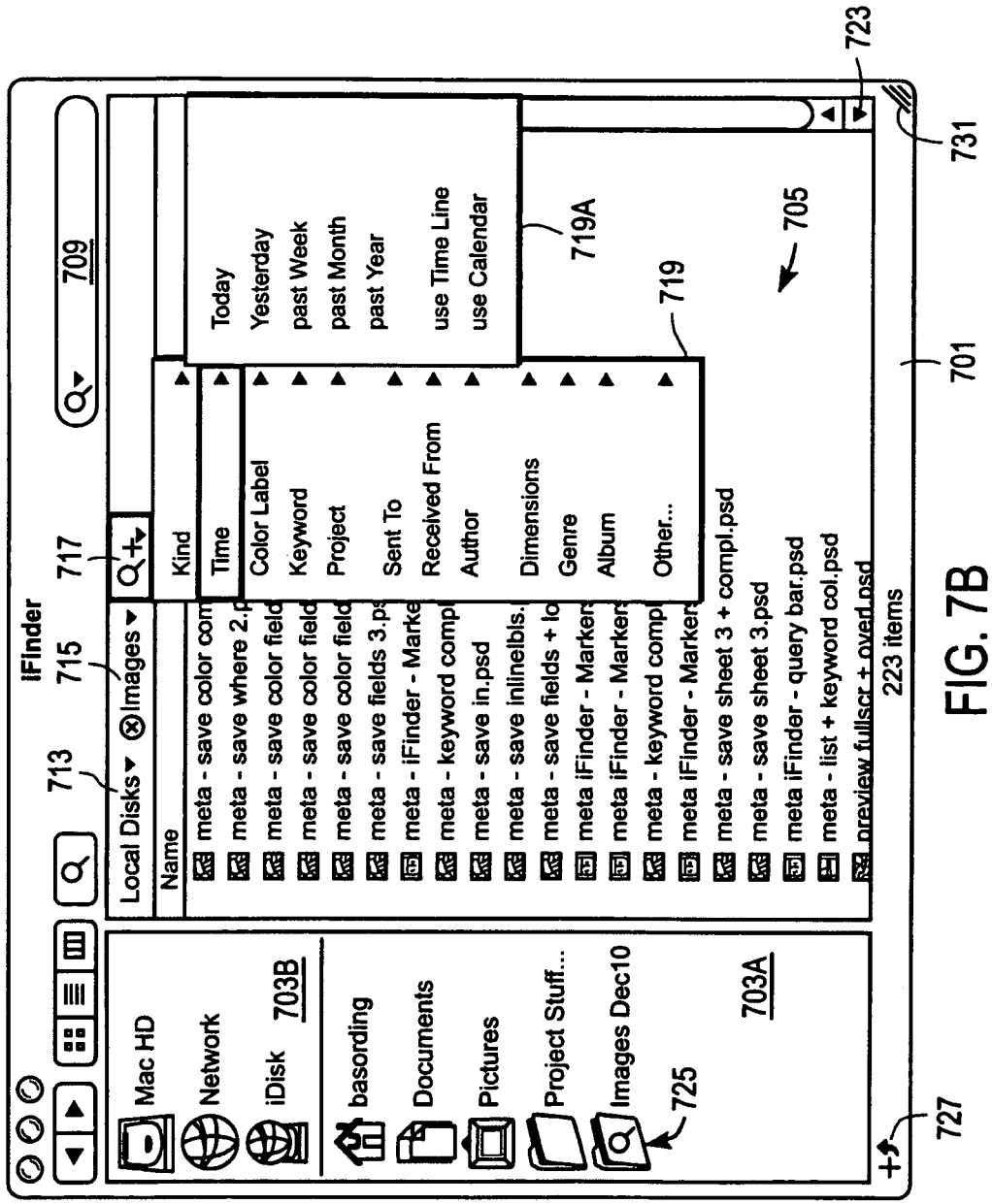

FIG. 7B shows the window 701 after the user has caused the selection of the time option within pull down menu 719, thereby causing the display of a submenu 719A which includes a list of possible times which the user may select from. Thus it appears that the user wants to limit the search to all images on all local disks within a certain period of time which is to be specified by making a selection within the submenu 719A.

Figure 7C:
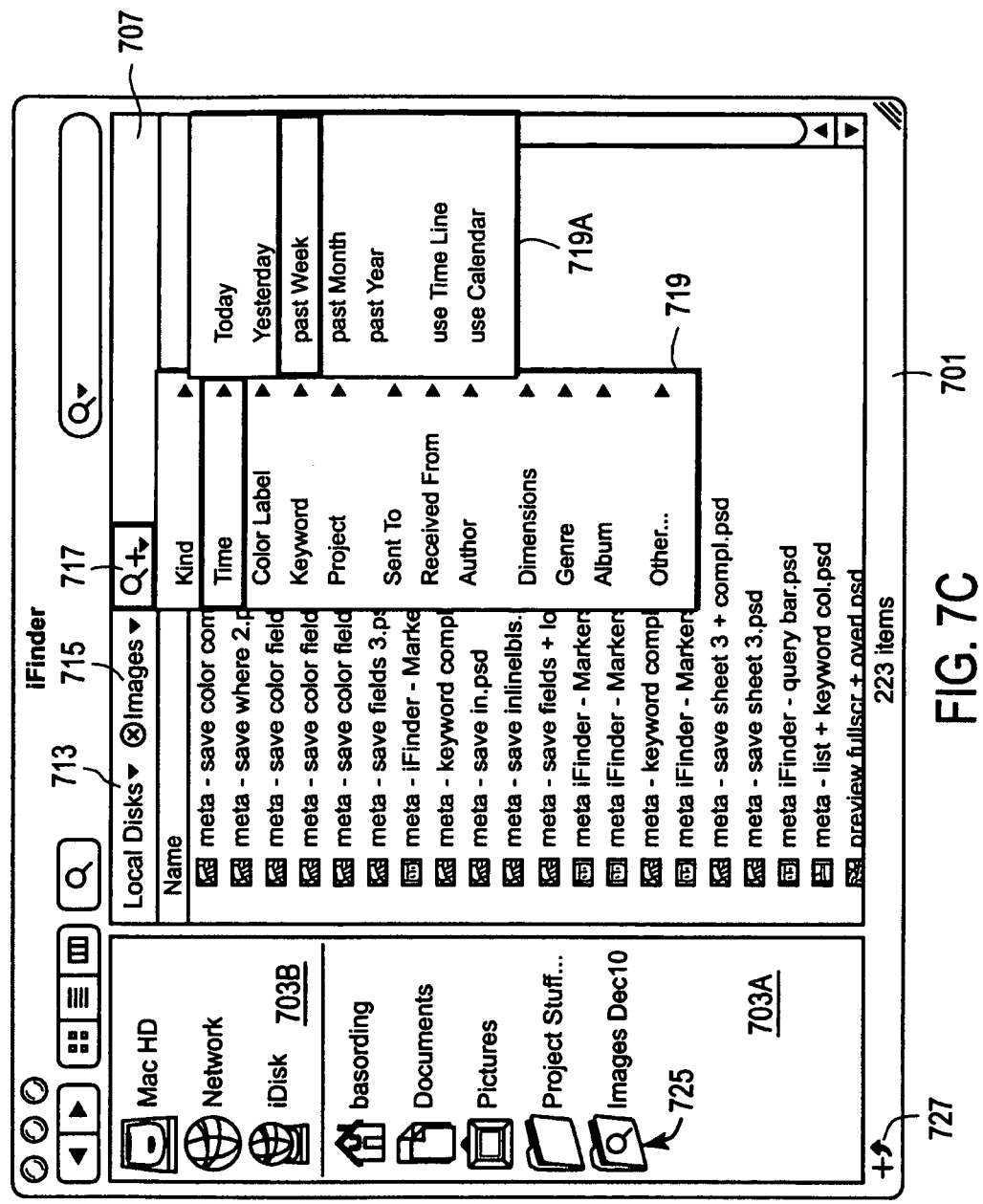
Figure 7D:
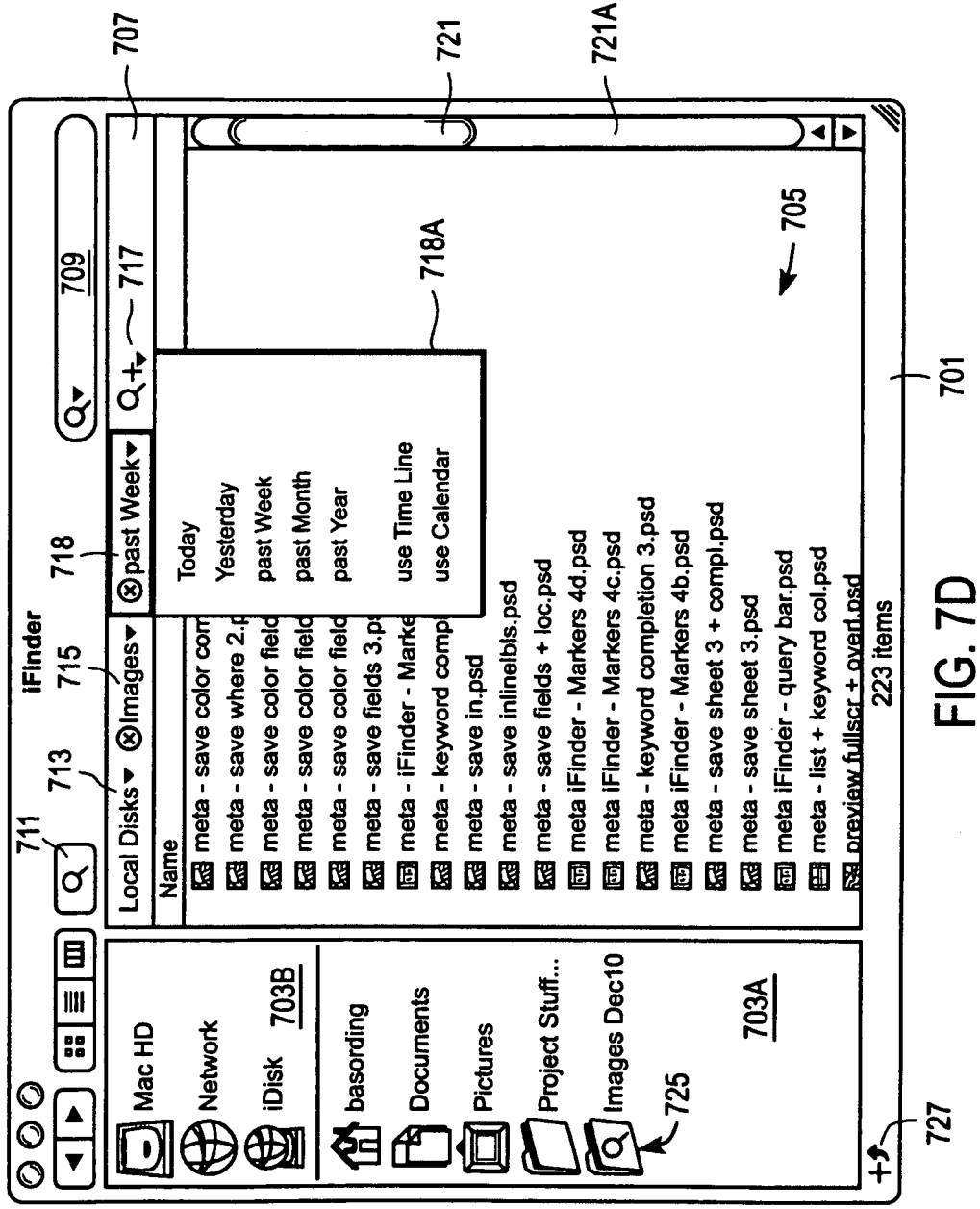
Figure 7E:
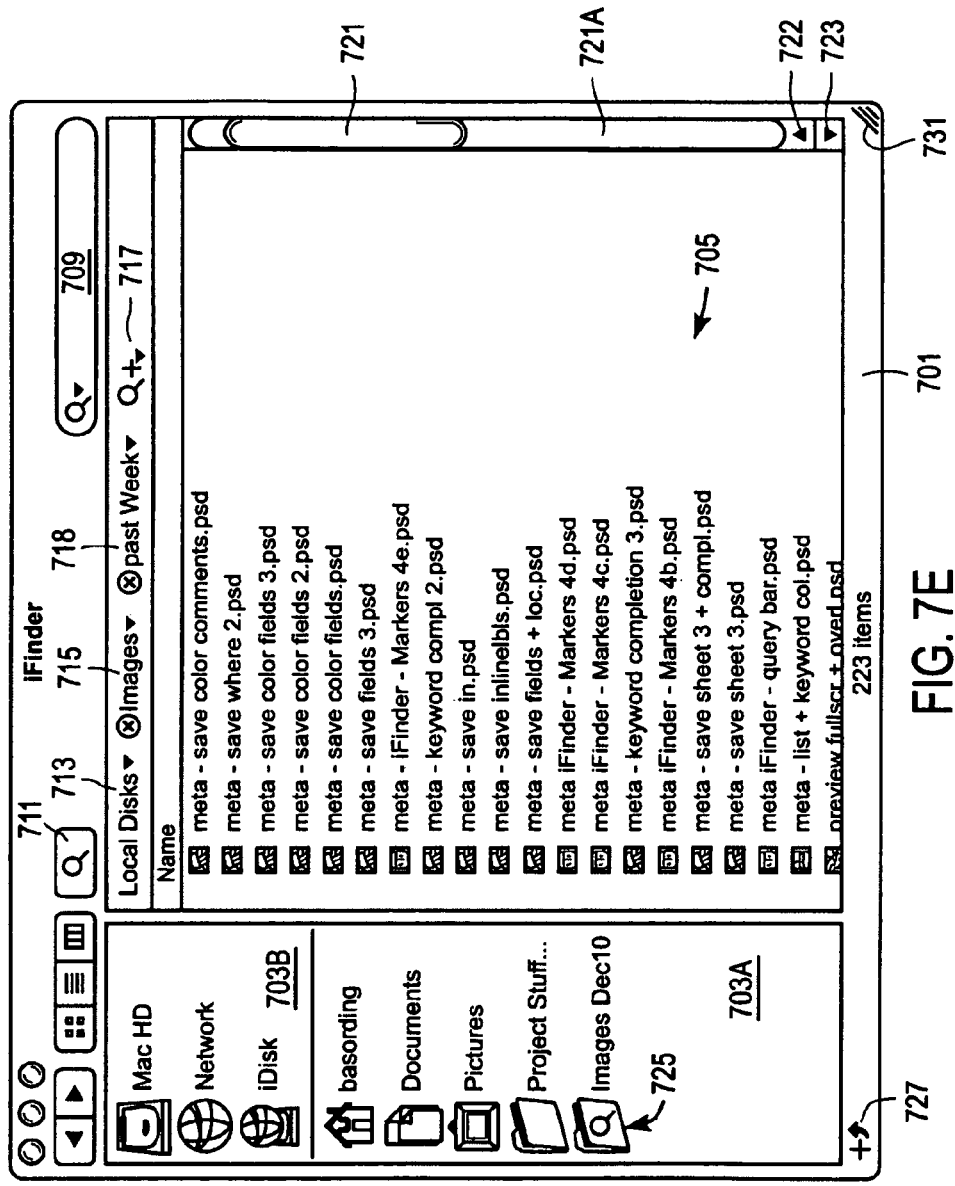

FIG. 7C shows the window 701 on the display of a data processing system after the user has selected a particular option (in this case "past week") from the submenu 719A. If the user accepts this selection, then the display shown in FIG. 7D results in which the configurable pull down menu 718 is displayed showing that the user has selected as part of the search criteria files that have been created or modified in the past week. It can be seen from FIG. 7D that the user can change the particular time selected from this pull down menu 718 by selecting another time period within the pull down menu 718A shown in FIG. 7D. Note that the configurable pull down menu 717, which represents an add search parameter menu, has now moved to the right of the configurable pull down menu 718. The user may add further search parameters by pressing or otherwise activating the configurable pull down menu 717 from the search parameter menu bar 707. If the user decides that the past week is the proper search criteria in the time category, then the user may release the pull down menu 718A from being displayed in a variety of different ways (e.g. the user may release the mouse button which was being depressed to keep the pull down menu 718A on the display). Upon releasing or otherwise dismissing the pull down menu 718A, the resulting window 701 shown in FIG. 7E then appears. There are several aspects of this user interface shown in FIG. 7A-7E which are worthy of being noted.

The search parameters or search query is specified within the same window as the display of the search results. This allows the user to look at a single location or window to understand the search parameters and how they affected the displayed search results, and may make it easier for a user to alter or improve the search parameters in order to find one or more files. The configurable pull down menus, such as the add search parameter pull down menu, includes hierarchical pull down menus. An example of this is shown in FIG. 7B in which the selection of the time criteria from the pull down menu 717 results in the display of another menu, in this case a submenu 719A which may be selected from by the user. This allows for a compact presentation of the various search parameters while keeping the initial complexity (e.g. without submenus being displayed) at a lower level. Another useful aspect of the user interface shown in FIG. 7A-7E is the ability to reconfigure pull down menus which have previously been configured. Thus, for example, the configurable pull down menu 713 currently specifies the location of the search (in this case, all local disks), however, this may be modified by selecting the pull down region associated with the configurable pull down menu 713, causing the display of a menu of options indicating alternative locations which may be selected by the user. This can also be seen in FIG. 7D in which the past week option has been selected by the user (as indicated by "past week" being in the search parameter menu bar 707), but a menu of options shown in the pull down menu 718A allows the user to change the selected time from the "past week" to some other time criteria. Another useful aspect of this user interface is the ability to continue adding various search criteria by using the add search criteria pull down menu 717 and selecting a new criteria.

It will also be appreciated that the various options in the pull down menus may depend upon the fields within a particular type of metadata file. For example, the selection of "images" to be searched may cause the various fields present in the metadata for an image type file to appear in one or more pull down menus, allowing the user to search within one or more of those fields for that particular type of file. Other fields which do not apply to "images" types of files may not appear in these menus in order reduce the complexity of the menus and to prevent user confusion.

Another feature of the present invention is shown in FIGS. 7A-7E. In particular, the side bar region 703A, which is the user-configurable portion of the side bar, includes a representation of a folder 725 which represents the search results obtained from a particular search, which search results may be static or they may be dynamic in that, in certain instances, the search can be performed again to obtain results based on the current files in the system. The folder 725 in the example shown in FIGS. 7A-7E represents a search on a local disk for all images done on December 10$^{th}$. By selecting this folder in the side bar region 703A, the user may cause the display in the display region 705 of the results of that search. In this way, a user may retrieve a search result automatically by saving the search result into the side bar region 703A. One mechanism for causing a search result or a search query to be saved into the side bar region 703A is to select the add folder button 727 which appears in the bottom portion of the window 701. By selecting this button, the current search result or search query is saved as a list of files and other objects retrieved in the current search result. In the case where the search query is saved for later use rather than the saving of a search result, then the current search query is saved for re-use at a later time in order to find files which match the search query at that later time. The user may select between these two functionalities (saving a search result or saving a search query) by the selection of a command which is not shown.

FIGS. 8A and 8B show another aspect of a user interface feature which may be used with certain embodiments of the present invention. The window 801 of FIG. 8A represents a display of the search results which may be obtained as a result of using one of the various different embodiments of the present invention. The search results are separated into categories which are separated by headers 805, 807, 809, and 811 which in this case represent periods of time. This particular segmentation with headers was selected by the user's selecting the heading "date modified" using the date modified button 803 at the top of the window 801. An alternative selection of the kind category by selecting the button 802 at the top of the window 801A shown in FIG. 8B results in a different formatting of the search results which are now categorized by headers which indicate the types of files which were retrieved in the search and are separated by the headings 815, 817, 819, and 821 as shown in FIG. 8B. The use of these headings in the search results display allows the user to quickly scan through the search results in order to find the file.

Figure 9:
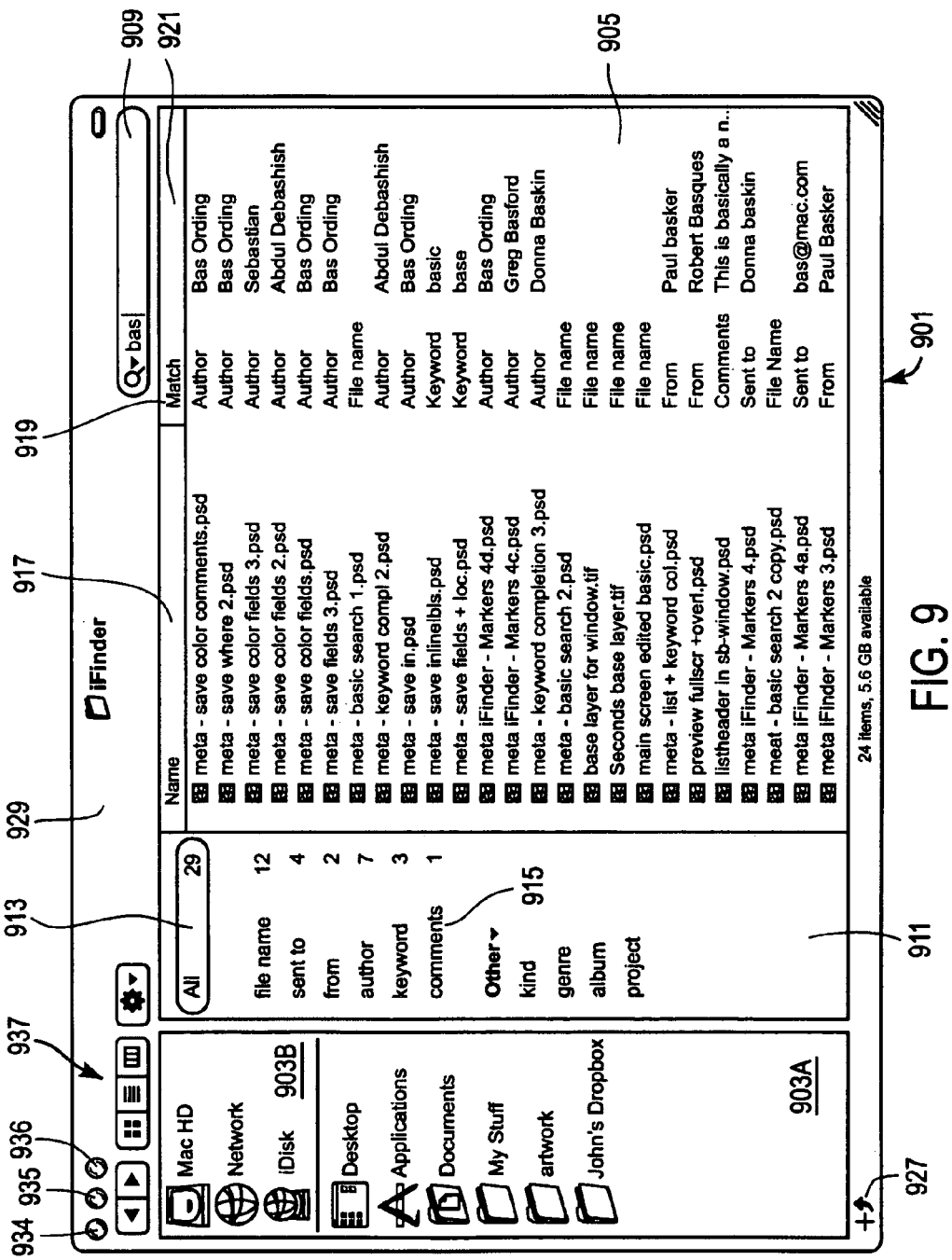
FIG. 9 shows another exemplary user interface of the present invention.

FIG. 9 shows another aspect of the present invention that is illustrated as part of the window 901 shown in FIG. 9. This window includes a display region 905 which shows the results of the search and the window also includes two side bar regions 903A and 903B, where the side bar region 903A is the user-configurable portion and the side bar region 903B is the system controlled portion. A folder add button 927 may be selected by the user to cause the addition of a search result or a search query to be added to the user-configurable portion of the side bar. The window 901 also includes conventional window controls such as a title bar or region 929 which may be used to move the window around a display and view select buttons 937 and maximize, minimize and resize buttons 934, 935, and 936 respectively. The window 901 shows a particular manner in which the results of a text-based search may be displayed. A text entry region 909 is used to enter text for searching. This text may be used to search through the metadata files or the indexed files or a combination of both. The display region 905 shows the results of a search for text and includes at least two columns, 917 and 919, which provide the name of the file that was found and the basis for the match. As shown in column 919, the basis for the match may be the author field or a file name or a key word or comments or other data fields contained in metadata that was searched. The column 921 shows the text that was found which matches the search parameter typed into the text entry field 909. Another column 911 provides additional information with respect to the search results. In particular, this column includes the number of matches for each particular type of category or field as well as the total number of matches indicated in the entry 913. Thus, for example, the total number of matches found for the comments field is only 1, while other fields have a higher number of matches.

Figure 10:
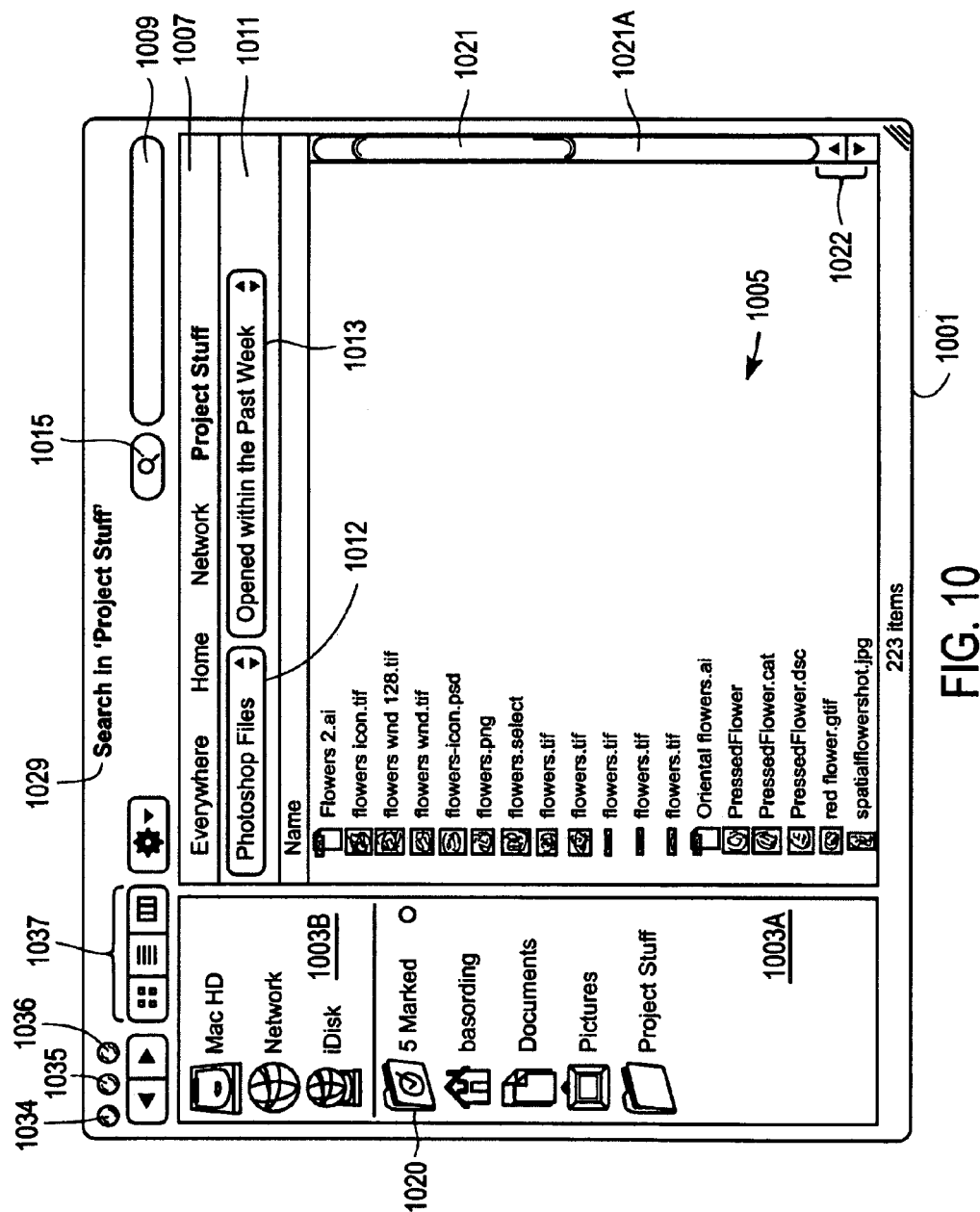
FIG. 10 shows another exemplary user interface of the present invention.

FIG. 10 shows certain other aspects of some embodiments of the present invention. Window 1001 is another search result window which includes various fields and menus for a user to select various search parameters or form a search query. The window 1001 includes a display region 1005 which may be used to display the results of a search and a user-configurable side bar portion 1003A and a system specified side bar portion 1003B. In addition, the window 1001 includes conventional scrolling controls such as controls 1021 and 1022 and 1021A. The window further includes conventional controls such as a title bar 1029 which may be used to move the window and view control buttons 1037 and maximize, minimize, and resize buttons 1034, 1035, and 1036. A start search button 1015 is near a text entry region 1009. A first search parameter menu bar 1007 is displayed adjacent to a second search parameter bar 1011. The first search parameter search bar 1007 allows a user to specify the location for a particular search while two menu pull down controls in the second search parameter menu bar 1011 allow the user to specify the type of file using the pull down menu 1012 and the time the file was created or last modified using the menu 1013.

The window 1001 includes an additional feature which may be very useful while analyzing a search result. A user may select individual files from within the display region 1005 and associate them together as one collection. Each file may be individually marked using a specific command (e.g. pressing the right button on a mouse and selecting a command from a menu which appears on the screen, which command may be "add selection to current group") or similar such commands. By individually selecting such files or by selecting a group of files at once, the user may associate this group of files into a selected group or a "marked" group and this association may be used to perform a common action on all of the files in the group (e.g. print each file or view each file in a viewer window or move each file to a new or existing folder, etc.). A representation of this marked group appears as a folder in the user-configurable portion 1003A. An example of such a folder is the folder 1020 shown in the user-configurable portion 1003A. By selecting this folder (e.g. by positioning a cursor over the folder 1020 and pressing and releasing a mouse button or by pressing another button) the user, as a result of this selection, will cause the display within the display region 1005 of the files which have been grouped together or marked. Alternatively, a separate window may appear showing only the items which have been marked or grouped. This association or grouping may be merely temporary or it may be made permanent by retaining a list of all the files which have been grouped and by keeping a folder 1020 or other representations of the grouping within the user-configurable side bar, such as the side bar 1003A. Certain embodiments may allow multiple, different groupings to exist at the same time, and each of these groupings or associations may be merely temporary (e.g. they exist only while the search results window is displayed), or they may be made permanent by retaining a list of all the files which have been grouped within each separate group. It will be appreciated that the files within each group may have been created from different applications. As noted above, one of the groupings may be selected and then a user may select a command which performs a common action (e.g. print or view or move or delete) on all of the files within the selected group.

Figure 11A:
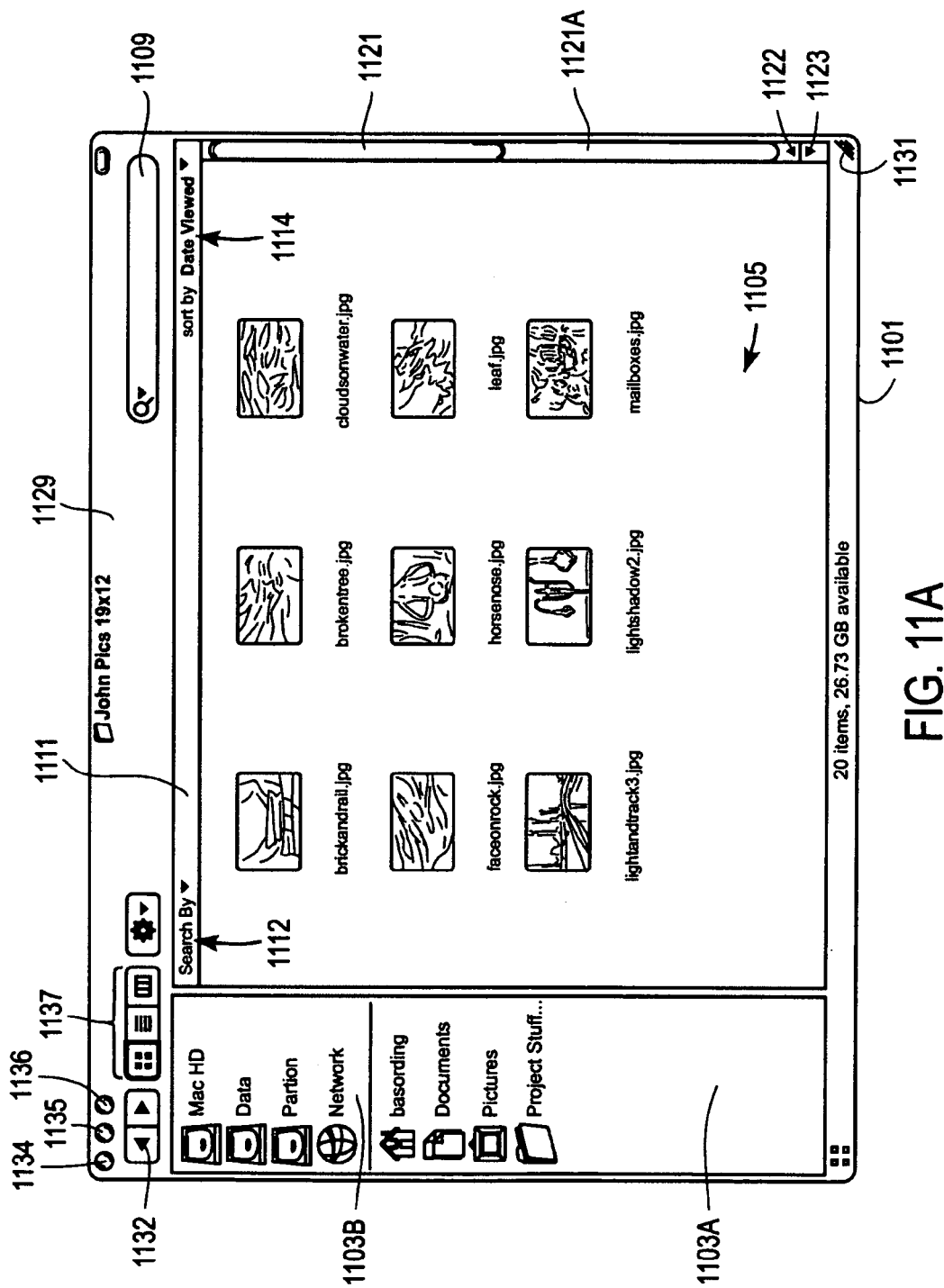
FIGS. 11A-11D show, in sequence, another exemplary user interface according to the present invention.
Figure 11B:
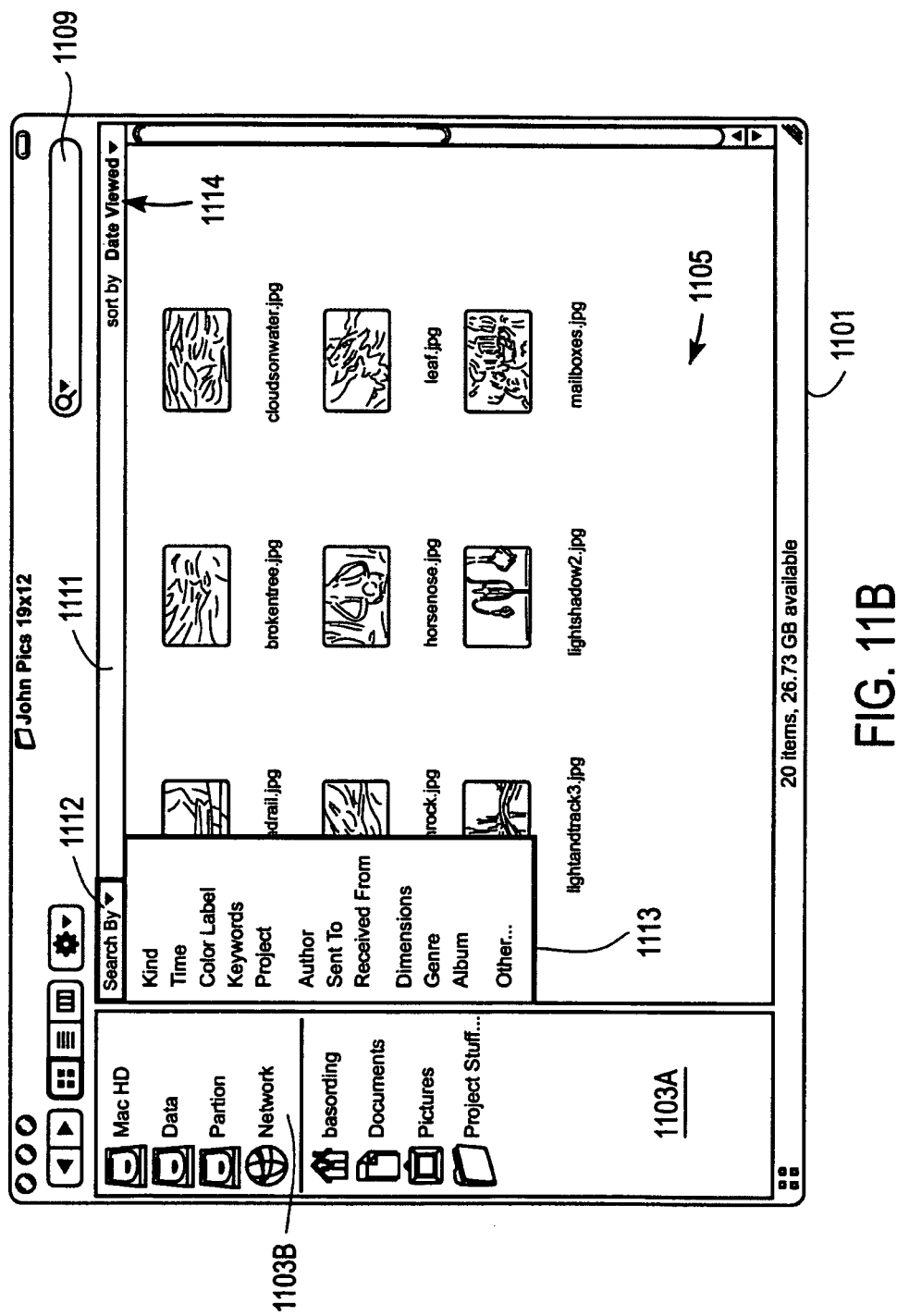

FIGS. 11A, 11B, 11C, and 11D show an alternative user interface for allowing a user to input search queries or search parameters. The user interface shown in these figures appears within the window 1101 which includes a user-configurable side bar region 1103A and a system specified side bar region 1103B. The window 1101 also includes traditional window controls such as a window resizing control 1131 which may be dragged in a conventional graphical user interface manner to resize the window, and the window further includes scrolling controls such as controls 1121, 1122, and 1123. The scrolling control 1121 may, for example, be dragged within the scrolling region 1121A or a scroll wheel on a mouse or other input device may be used to cause scrolling within a display region 1105. Further, traditional window controls include the title bar 1129 which may be used to move the window around a desktop which is displayed on a display device of a computer system and the window also includes view buttons 1137 as well as close, minimize, and resize buttons 1134, 1135 and 1136. A back and forward button, such as the back button 1132, are also provided to allow the user to move back and forth in a manner which is similar to the back and forth commands in a web browser. The window 1101 includes a search parameter menu bar 1111 which includes a "search by" pull down menu 1112 and a "sort by" pull down menu 1114. The "search by" pull down menu 1112 allows a user to specify the particular search parameter by selecting from the options which appear in the pull down menu once it is activated as shown in FIG. 11B. In particular, the pull down menu 1113 shows one example of a pull down menu when the "search by" pull down menu 1112 has been activated. The "sort by" pull down menu 1114 allows a user to specify how the search results are displayed within a display region 1105. In the example shown in FIGS. 11A-11D a user has used the "sort by" pull down menu 1114 to select the "date viewed" criteria to sort the search results by. It should also be noted that the user may change the type of view of the search results by selecting one of the three view buttons 1137. For example, a user may select an icon view, which is the currently selected button among the view buttons 1137, or the user may select a list view or a column view.

Figure 11C:
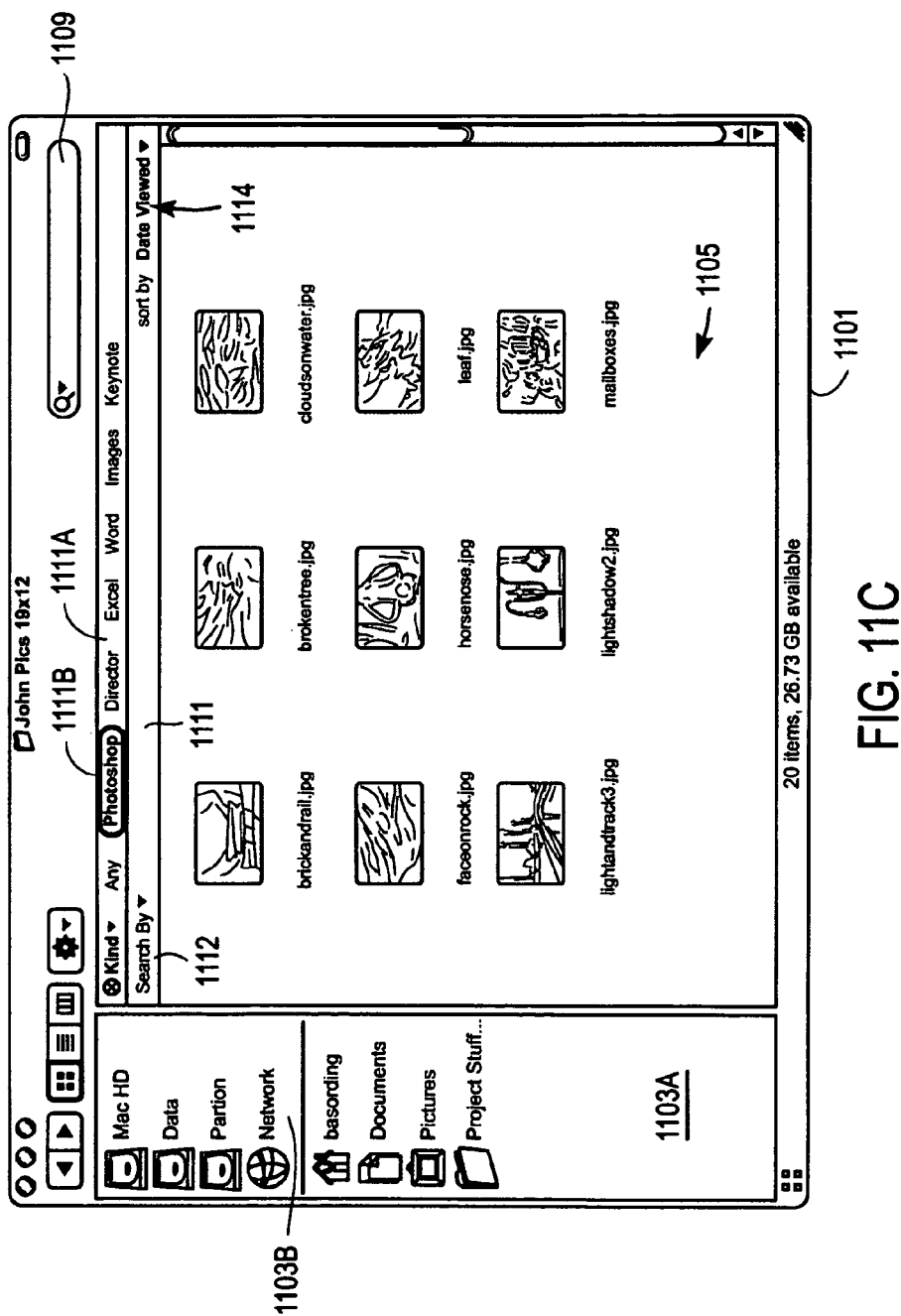
Figure 11D:
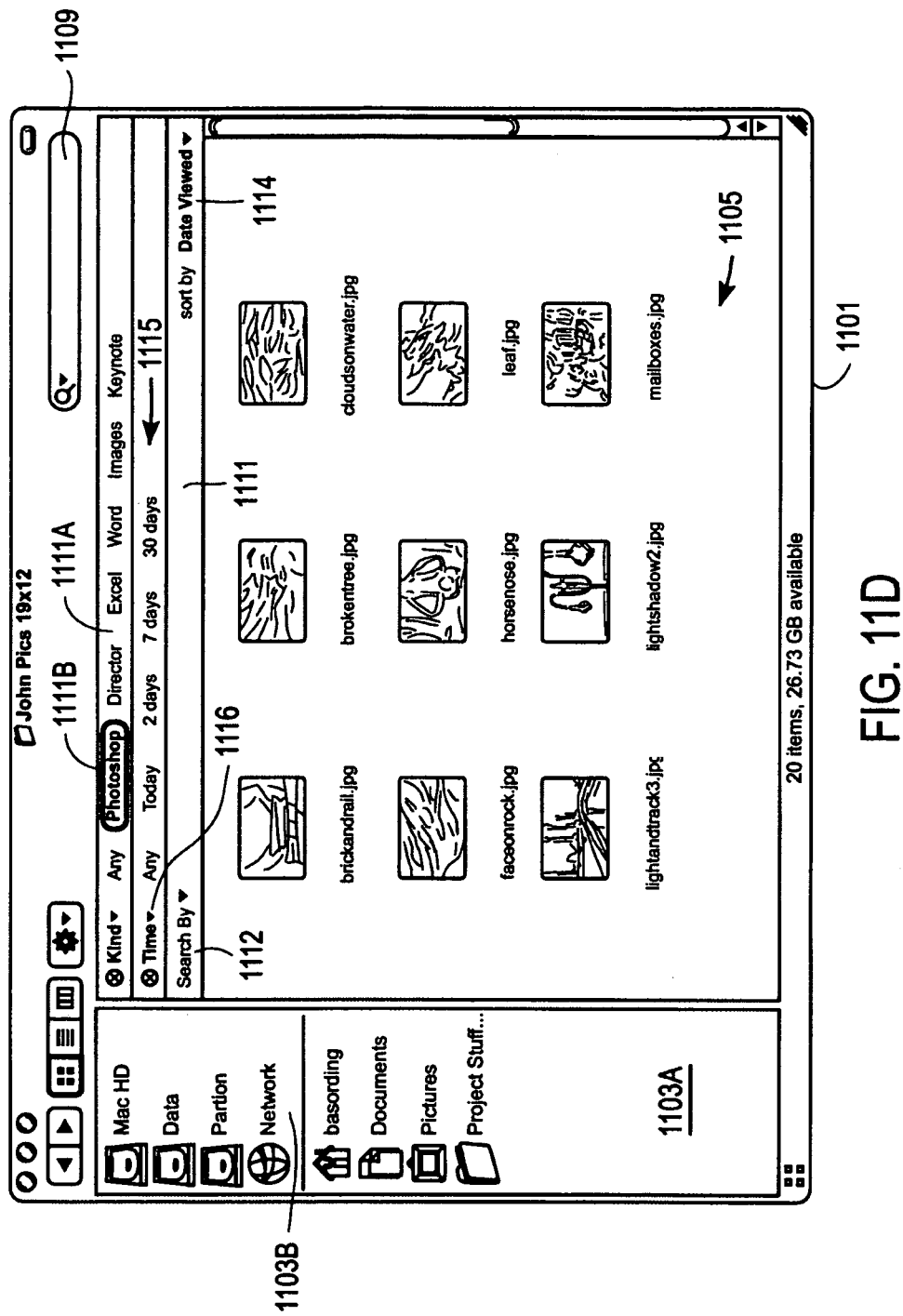

FIG. 11B shows the result of the user's activation of a "search by" pull down menu 1112 which causes the display of the menu 1113 which includes a plurality of options from which the user may choose to perform a search by. It will be appreciated that there are a number of different ways for a user to activate the "search by" pull down menu 1112. One way includes the use of a cursor, such as a pointer on a display which is controlled by a cursor control device, such as a mouse. The cursor is positioned over the region associated with the "search by" menu title (which is the portion within the search parameter menu bar 1111 which contains the words "search by") and then the user indicates the selection of the menu title by pressing a button, such as a mouse's button, to cause the pull down menu to appear, which in this case is the menu 1113 shown in FIG. 11B. At this point, the user may continue to move the cursor to point to a particular option within the menu, such as the "time" option. This may result in the display of a submenu to the left or to the right of the menu 1113. This submenu may be similar to the submenu 719A or to the menu 1214 shown in FIG. 12A. If the "kind" option is selected in the menu 1113, the submenu may include a generic list of the different kinds of documents, such as images, photos, movies, text, music, PDF documents, email documents, etc. or the list may include references to specific program names such as PhotoShop, Director, Excel, Word, etc. or it may include a combination of generic names and specific names. FIG. 11C shows the result of the user having selected PhotoShop type of documents from a submenu of the "kind" option shown in menu 1113. This results in the display of the search parameter menu bar 1111A shown in FIG. 11C which includes a highlighted selection 1111B which indicates that the PhotoShop type of documents will be searched for. The search parameter menu bar 1111 appears below the search parameter menu bar 1111A as shown in FIG. 11C. The user may then specify additional search parameters by again using the "search by" pull down menu 1112 or by typing text into the text entry field 1109. For example, from the state of the window 1101 shown in FIG. 11C, the user may select the "search by" pull down menu 1112 causing the display of a menu containing a plurality of options, such as the options shown within the menu 1113 or alternative options such as those which relate to PhotoShop documents (e.g. the various fields in the metadata for PhotoShop type of documents). A combination of such fields contained within metadata for PhotoShop type documents and other generic fields (e.g.

time, file size, and other parameters) may appear in a menu, such as the menu 1113 which is activated by selecting the "search by" pull down menu. The user may then select another criteria such as the time criteria. In this case, the window 1101 displays a new search parameter menu bar 1115 which allows a user to specify a particular time. The user may select one of the times on the menu bar 1115 or may activate a pull down menu by selecting the menu title "time," which is shown as the menu title 1116. The state of the window 1101 shown in FIG. 11D would then search for all PhotoShop documents created in the last 30 days or 7 days or 2 days or today or at any time, depending on the particular time period selected by the user.

FIGS. 12A, 12B, 12C and 12D show another example of a user interface for allowing the creation of search queries for searching metadata and other data and for displaying the results of the search performed using a search query. The different implementation shown in FIGS. 12A-12D shows a user interface presentation in a column mode; this can be seen by noting the selection of the column button, which is the rightmost button in the view buttons 1237 shown in FIG. 12A. The window 1201 has two columns 1211 and the display region 1205, while the window 1251 of FIG. 12C has three columns which are columns 1257, 1259, and the display region 1255, and the window 1271 has three columns which are columns 1277, 1279, and the display region 1275.

Figure 12A:
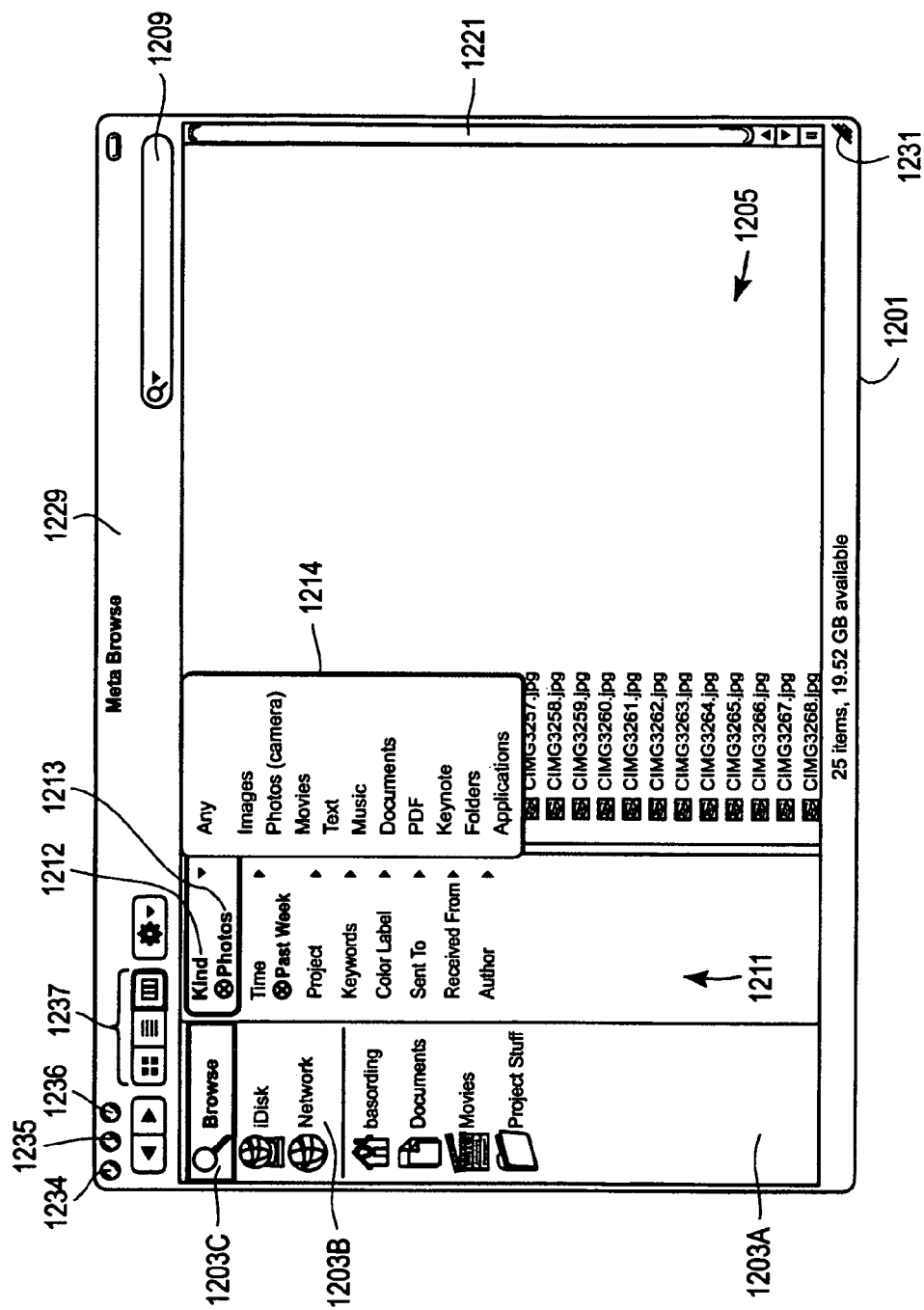
Figure 12B:
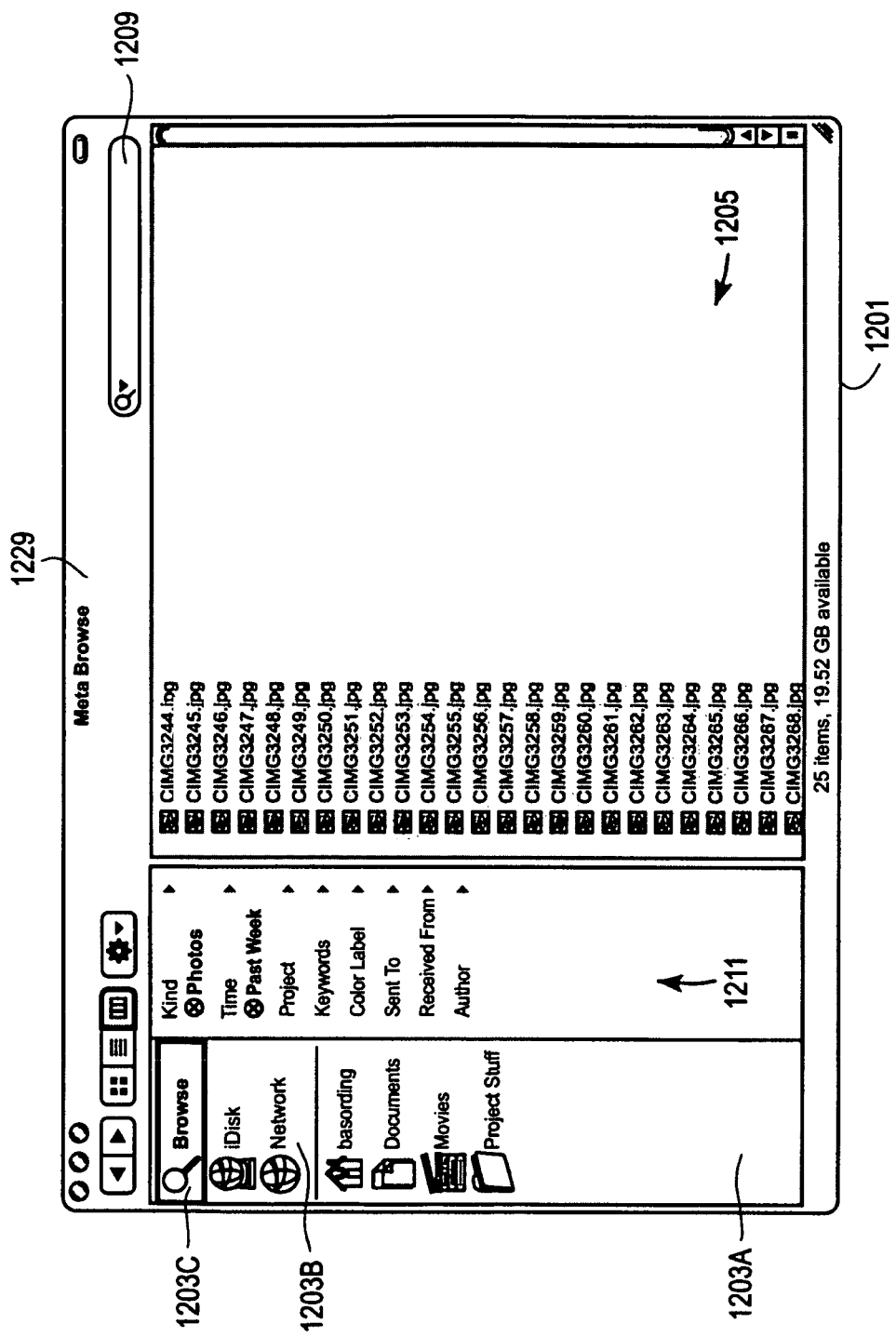

The window 1201 shown in FIGS. 12A and 12B includes a display region 1205 which shows the results of a search; these results may be shown dynamically as the user enters search parameters or the results may be shown only after the user has instructed the system to perform the search (e.g. by selecting a "perform search" command). The window 1201 includes conventional window controls, such as a resizing control 1231, a scrolling control 1221, a title bar 1229 which may be used to move the window, a window close button, a window minimize button, and a window resize button 1234, 1235, and 1236, respectively. The window 1201 also includes a user-configurable side bar region 1203A and a system specified side bar region 1203B. It can be seen from FIG. 12A that a browse mode has been selected as indicated by the highlighted "browse" icon 1203C in the system specified side bar region 1203B. The window 1201 also includes a text entry region 1209, which a user may use to enter text for a search, and the window 1201 also includes view selector buttons 1237.

A column 1211 of window 1201 allows a user to select various search parameters by selecting one of the options which in turn causes the display of a submenu that corresponds to the selected option. In the case of FIG. 12A, the user has selected the "kind" option 1212 and then has used the submenu 1214 to select the "photos" option from the submenu, resulting in an indicator 1213 (photos) to appear in the column 1211 under the "kind" option as shown in FIG. 12A. It can also be seen that the user has previously selected the "time" option in the column 1211 and has selected from a submenu brought up when the "time" option was selected the "past week" search parameter. When the user has finished making selections of the various options and suboptions from both the column 1112 and any of the corresponding submenus which appear, then the display showed in FIG. 12B appears. Note that the submenus are no longer present and that the user has completed the selection of the various options and suboptions which specify the search parameters. Column 1211 in FIG. 12B provides feedback to the user indicating the exact nature of the search query (in this case a search for all photos dated in the past week), and the results which match the search query are shown in the display region 1205.

Figure 12D:
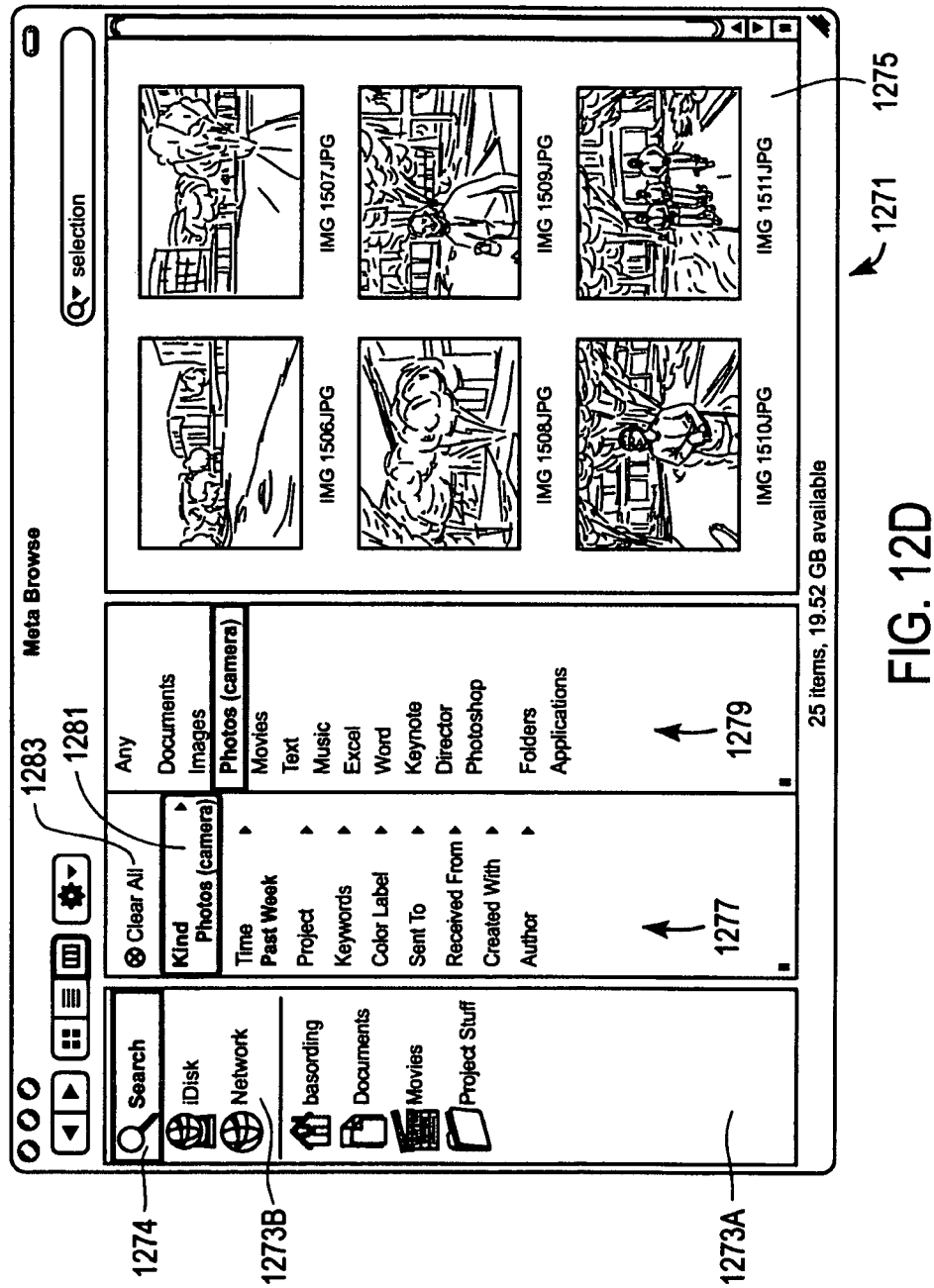

FIGS. 12C and 12D show an alternative embodiment in which the submenus which appear on a temporary basis in the embodiment of FIGS. 12A and 12B are replaced by an additional column which does not disappear after a selection is made. In particular, the column 1259 of the window 1251 functions in the same manner as the submenu 1214 except that it remains within the window 1251 after a selection is made (wherein the submenu 1214 is removed from the window after the user makes the selection from the submenu). The column 1279 of window 1271 of FIG. 12D is similar to the column 1259. The window 1251 includes a side bar which has a user-configurable side bar region 1253A and a system defined side bar region 1253B. The system specified side bar region 1253B includes a "browse" selection region 1254 which has a clear button 1258 which the user may select to clear the current search query. The window 1271 of FIG. 12D provides an alternative interface for clearing the search query. The window 1271 also includes a user configurable side bar region 1273A and a system specified side bar region 1273B, but the clear button, rather than being with the "search" region 1274 is at the top of the column 1277. The user may clear the current search parameter by selecting the button 1283 as shown in FIG. 12D.

Figure 13A:
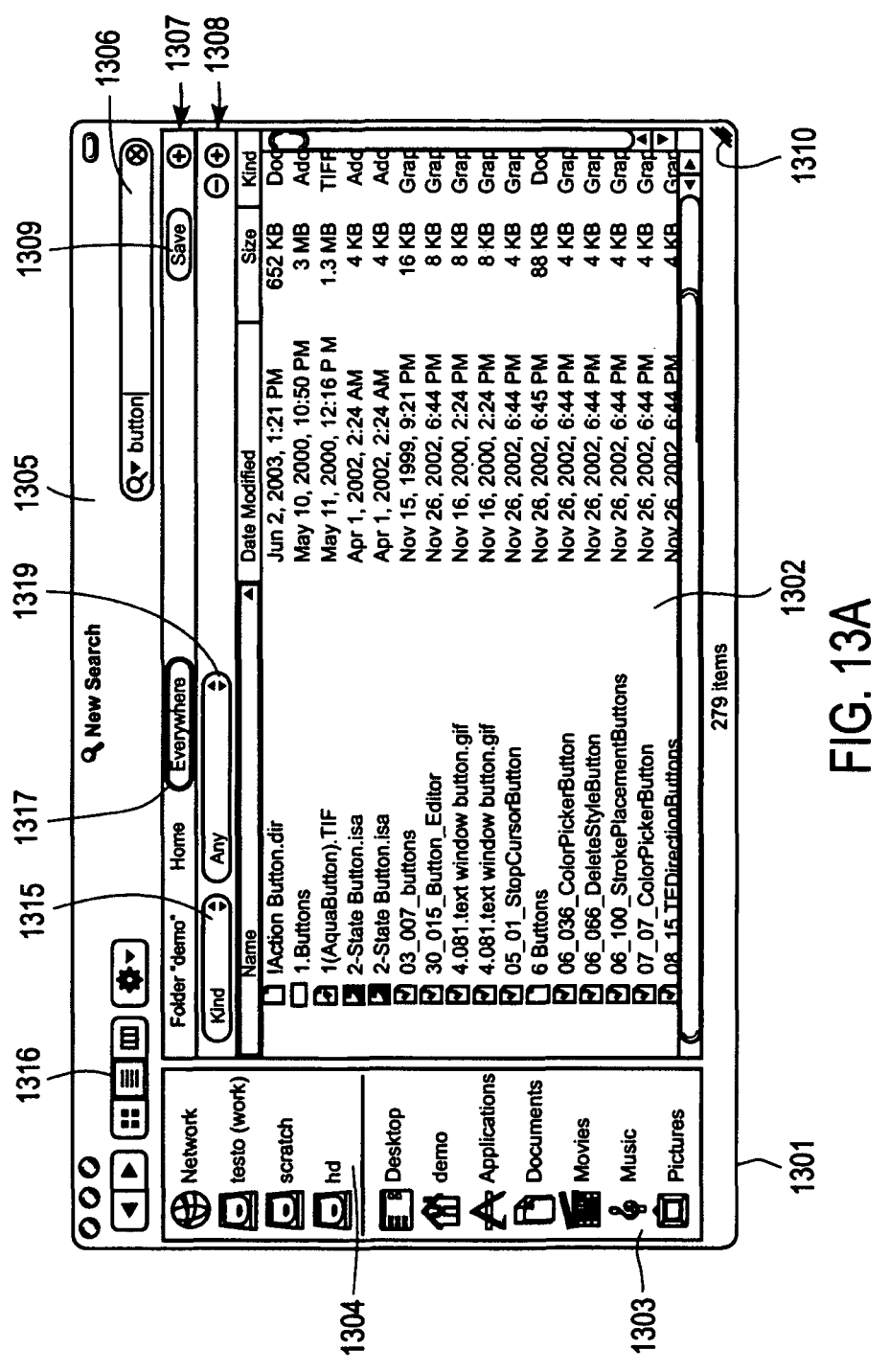
Figure 13B:
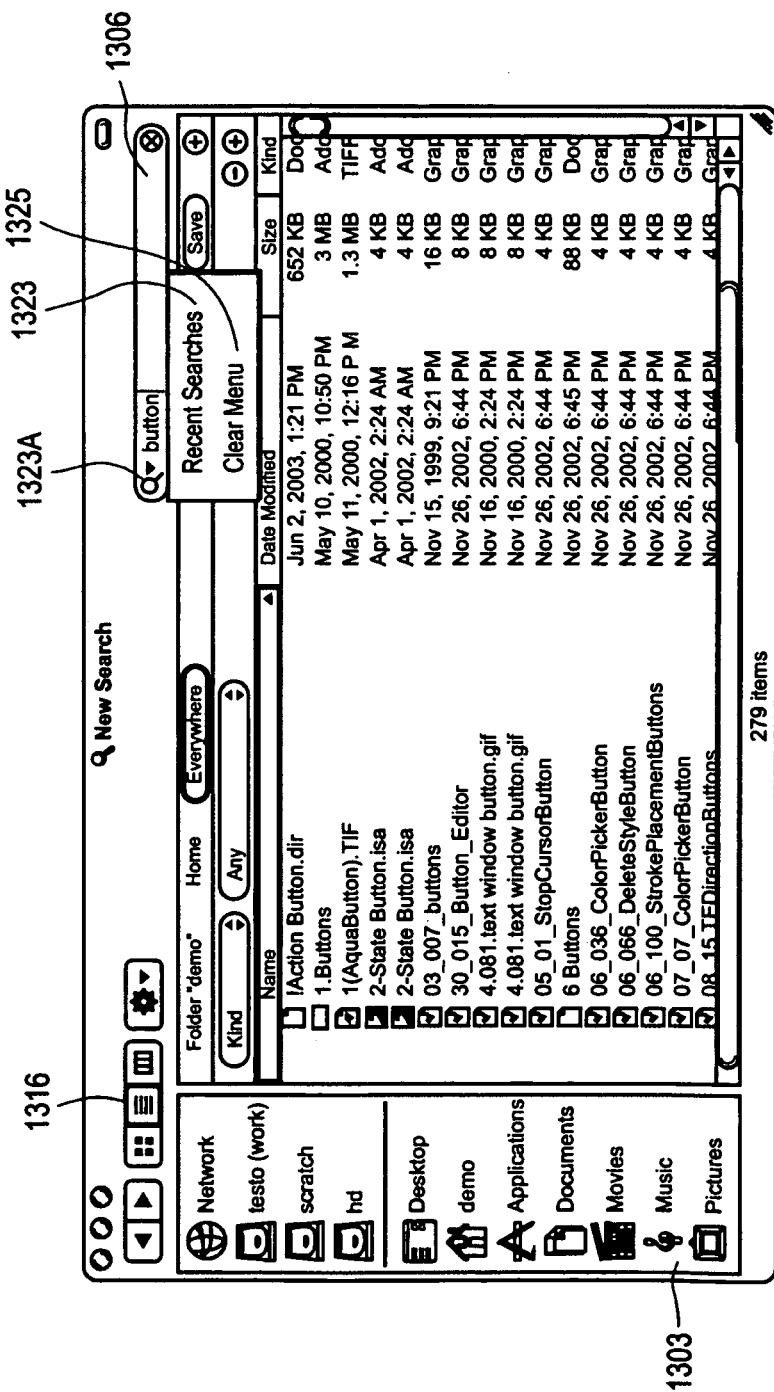

FIG. 13A shows another embodiment of a window 1301 which displays search results within a display region 1302. The window 1301 may be a closeable, minimizeable, resizeable, and moveable window having a resizing control 1310, a title bar 1305 which may be used to move the window, a text entry region 1306 and a user configurable portion 1303, and a system specified portion 1304. The window 1301 further includes buttons for selecting various views, including an icon view, a list view, and a column view. Currently, the list view button 1316 has been selected, causing the display of the search results in a list view manner within the display region 1302. It can be seen that the text ("button") has been entered into the text entry region 1306 and this has caused the system to respond with the search results shown in the display region 1302. The user has specified a search in every location by selecting "everywhere" button 1317. Further, the user has searched for any kind of document by selecting the "kind" option from the pull down menu 1315 and by selecting the "any" option in the pull down menu 1319. The where or location slice 1307 includes a "+" button which may be used to add further search parameters, and similarly, the slice 1308 includes a "+" and a "−" button for adding or deleting search parameters, respectively. The slice 1307 further includes a "save" button 1309 which causes the current search query to be saved in the form of a folder which is added to the user configurable portion 1303 for use later. This is described further below and may be referred to as a "smart folder." The search input user interface shown in FIGS. 13A and 13B is available within, in certain embodiments, each and every window controlled by a graphical user interface file management system, such as a Finder program which runs on the Macintosh or WINDOWS EXPLORER which runs on MICROSOFT WINDOWS. This interface includes the text entry region 1306 as well as the slices 1307 and 1308.

The window 1301 shown in FIG. 13B shows the activation of a menu by selecting the search button 1323A, causing a display of a menu having two entries 1323 and 1325. Entry 1323 displays recently performed searches so that a user may merely recall a prior search by selecting the prior search and cause the prior search to be run again. The menu selection 1325 allows the user to clear the list of recent searches in the menu.

Figure 14A:
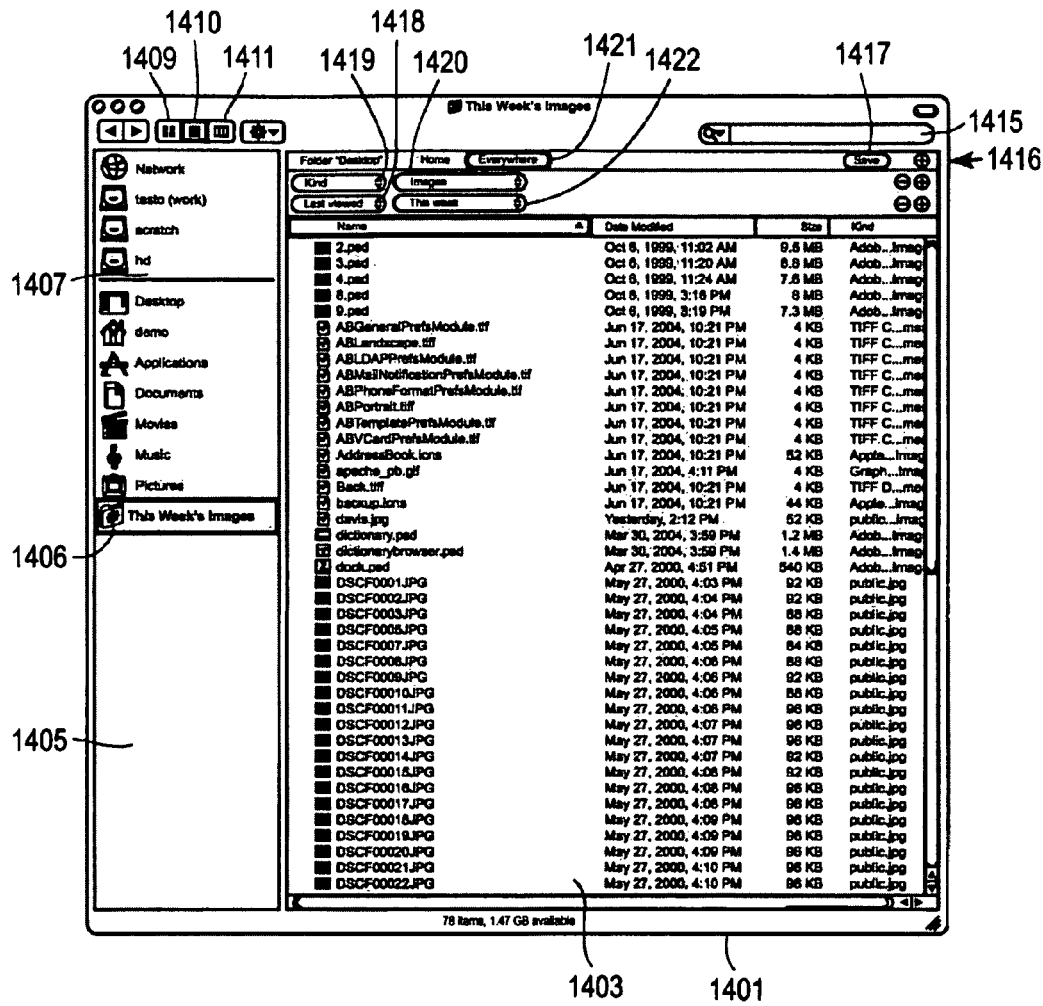
FIGS. 14A, 14B, 14C, and 14D show further alternative embodiments of user interfaces according to the present invention.
Figure 14B:
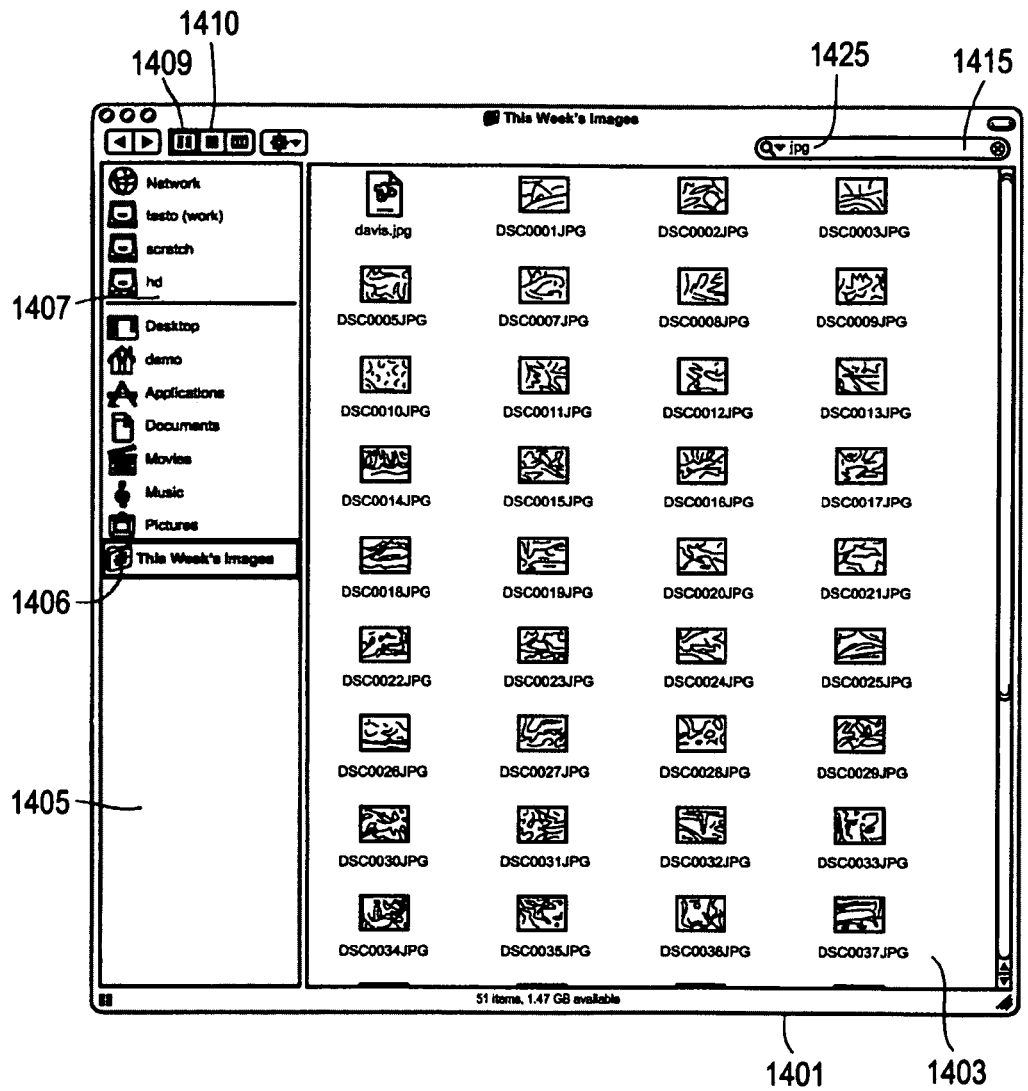
Figure 14C:
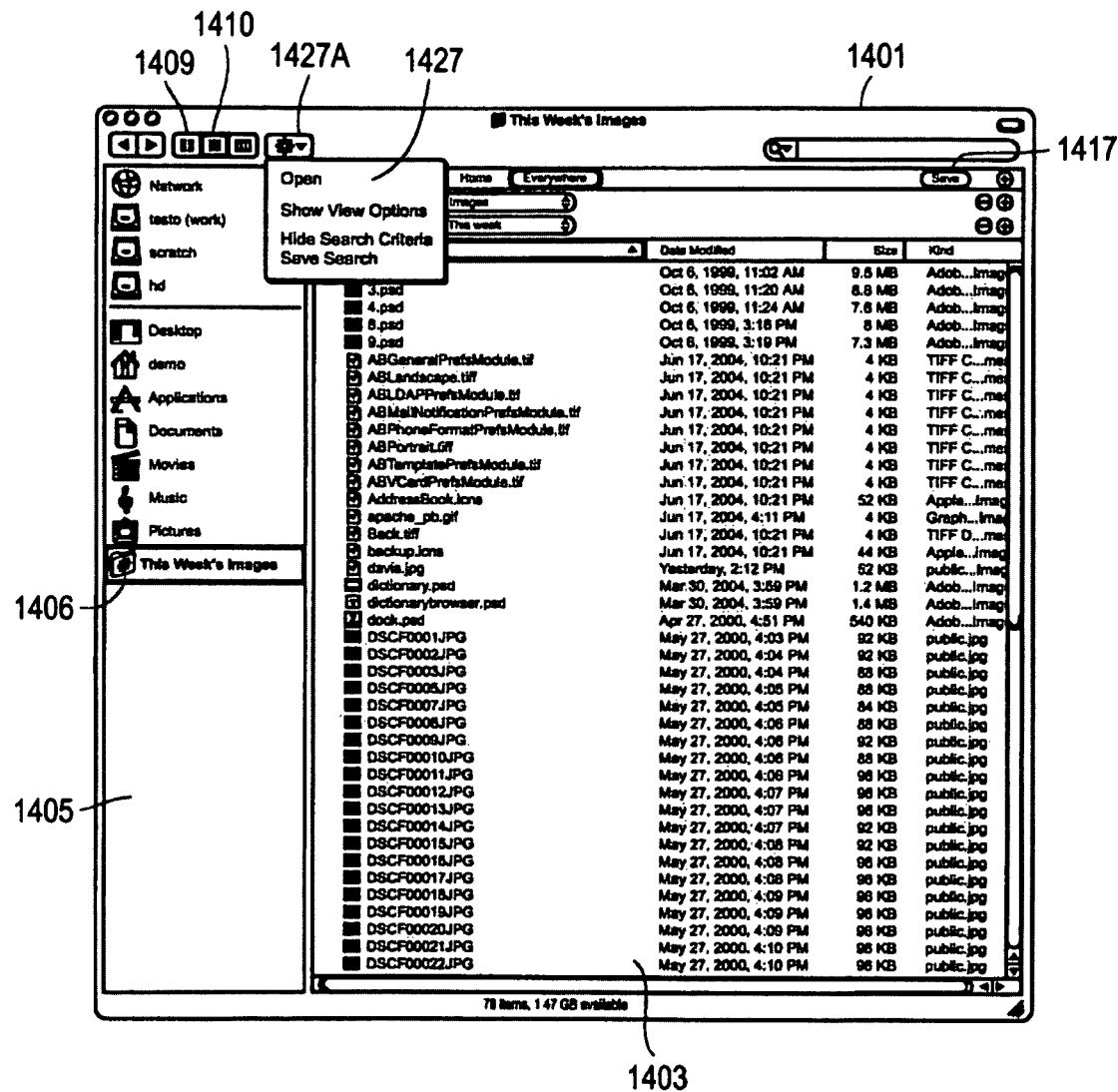

FIGS. 14A, 14B, and 14C show examples of another window in a graphical user interface file system, such as the FINDER which runs on the MACINTOSH operating system. These windows show the results of a particular search and also the ability to save and use a smart folder which saves a prior search. The window 1401 shown in FIG. 14A includes a display region 1403, a user configurable region 1405, a smart folder 1406, a system specified region 1407, an icon view button 1409, a list view button 1410, and a column view button 1411. The window 1401 also includes a text entry region 1415 and a location slice 1416 which may be used to specify the location for the search, which slice also includes a save button 1417. Additional slices below the slice 1416 allow the user to specify further details with respect to the search, in this case specifying types of documents which are images which were last viewed this week. The user has set the search parameters in this manner by selecting the "kind" option from the pull down menu 1419 and by selecting the "images" type from the pull down menu 1420 and by selecting the "last viewed" option from pull down menu 1418 and by selecting "this week" from the pull down menu 1422. The user has also selected "everywhere" by selecting the button 1421 so that the search will be performed on all disks and storage devices connected to this system. The results are shown within the display region 1403. The user can then save the search query by selecting the "save" button 1417 and may name the saved search query as "this week's images" to produce the smart folder 1406 as shown in the user configurable portion 1405. This allows the user to repeat this search at a later time by merely selecting the smart folder 1406 which causes the system to perform a new search again, and all data which matches the search criteria will be displayed within the display region 1403. Thus, after several weeks, a repeating of this search by selecting the smart folder 1406 will produce an entirely different list if none of the files displayed in the display region 1403 of FIG. 14A are viewed in the last week from the time in which the next search is performed by selecting the smart folder 1406.

FIG. 14B shows a way in which a user may sort or further search within the search results specified by a saved search, such as a smart folder. In the case of FIG. 14B, the user has selected the smart folder 1406 and has then entered text "jpg" 1425 in the text entry region 1415. This has caused the system to filter or further limit the search results obtained from the search query saved as the smart folder 1406. Thus, PhotoShop files and other files such as TIF files and GIF files are excluded from the search results displayed within the display region 1403 of FIG. 14B because the user has excluded those files by adding an additional search criteria specified by the text 1425 in the text entry region 1415. It can be seen that the "jpg" text entry is ANDed logically with the other search parameters to achieve the search results displayed in the display region 1403. It can also be seen that the user has selected the icon view by selecting the icon view button 1409. Thus, it is possible for a user to save a search query and use it later and to further limit the results of the search query by performing a search on the results of the search query to further limit the search results.

FIG. 14C shows the window 1401 and shows the search results displayed within the display region 1403, where the results are based upon the saved search specified by the smart folder 1406. The user has caused a pull down menu 1427 to appear by selecting the pull down region 1427A. The pull down region 1427 includes several options, which a user may select. These options include hiding the search criteria or saving the search (which is similar to selecting the button 1417) or showing view options or opening the selected file. This allows the user, for example, to hide the search criteria, thereby causing the slice 1416 and the other search parameters to be removed from the window 1401 which is a moveable, resizeable, minimizeable, and closeable window.

Figure 14D:
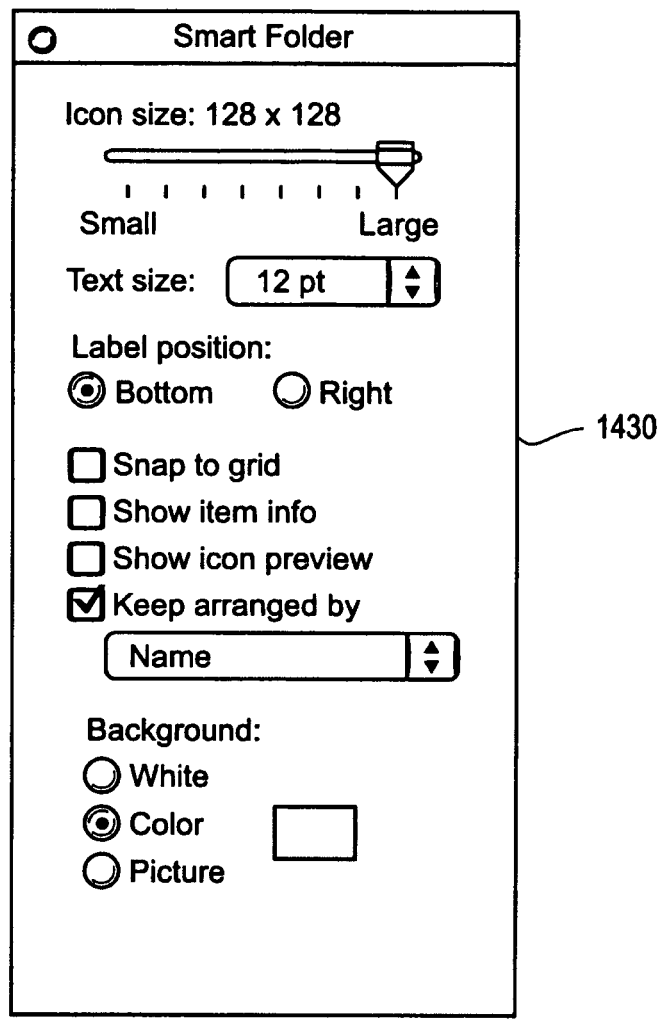

FIG. 14D shows an example of a user interface which allows the user to specify the appearance of a smart folder, such as the smart folder 1406.

Figure 15A:
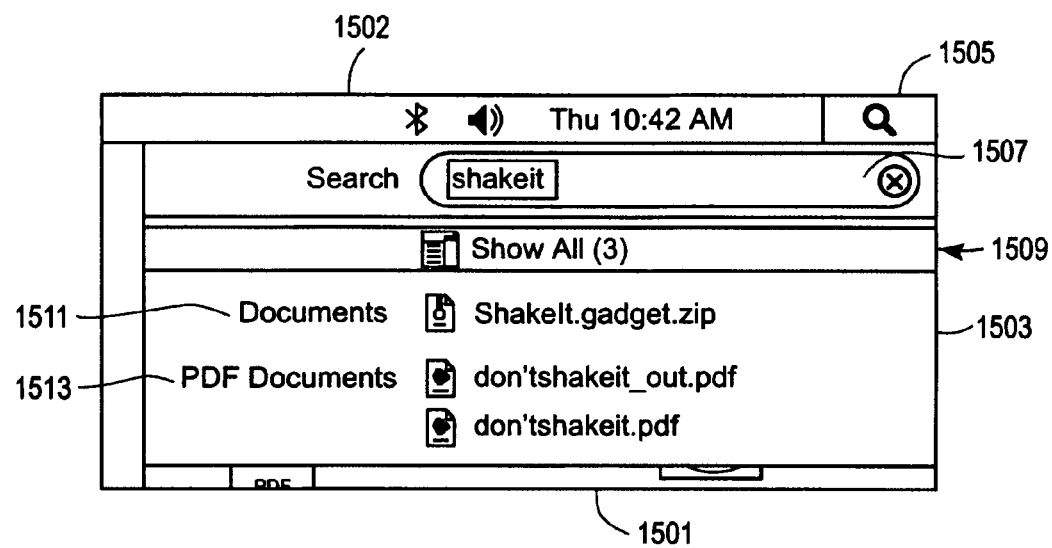
FIGS. 15A, 15B, 15C and 15D show another alternative embodiment of user interfaces according to the present invention.
Figure 15B:
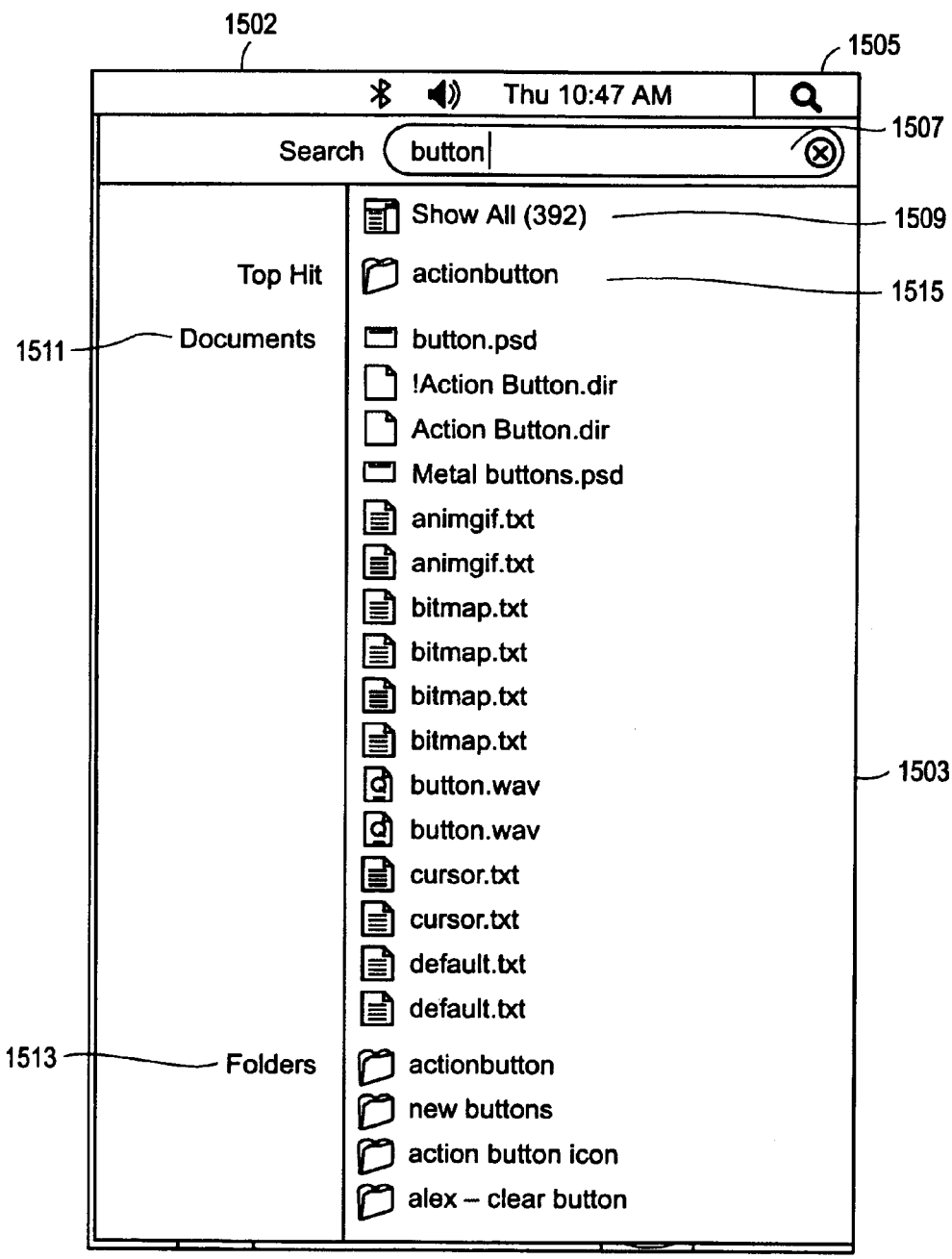
Figure 15C:
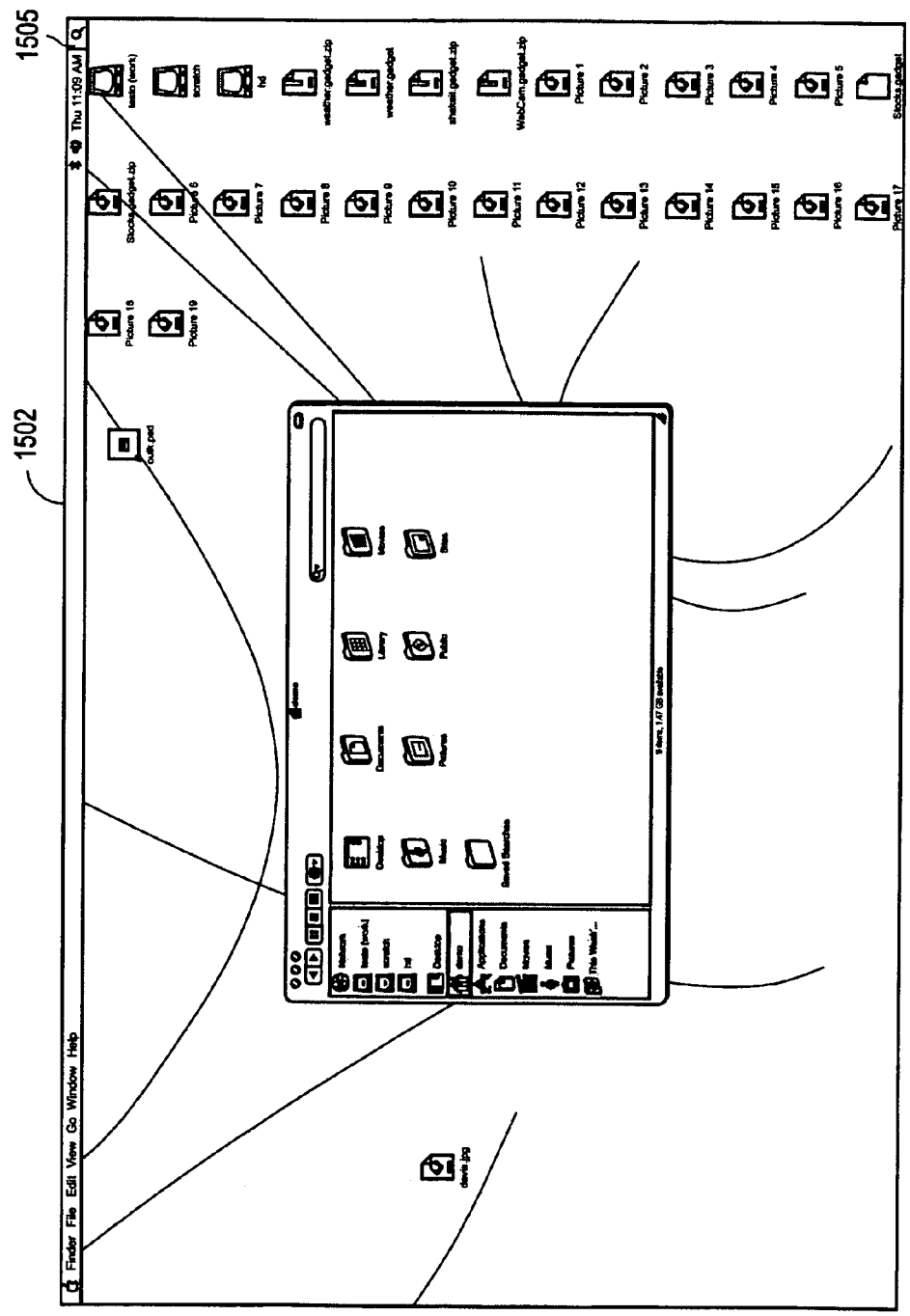
Figure 15D:
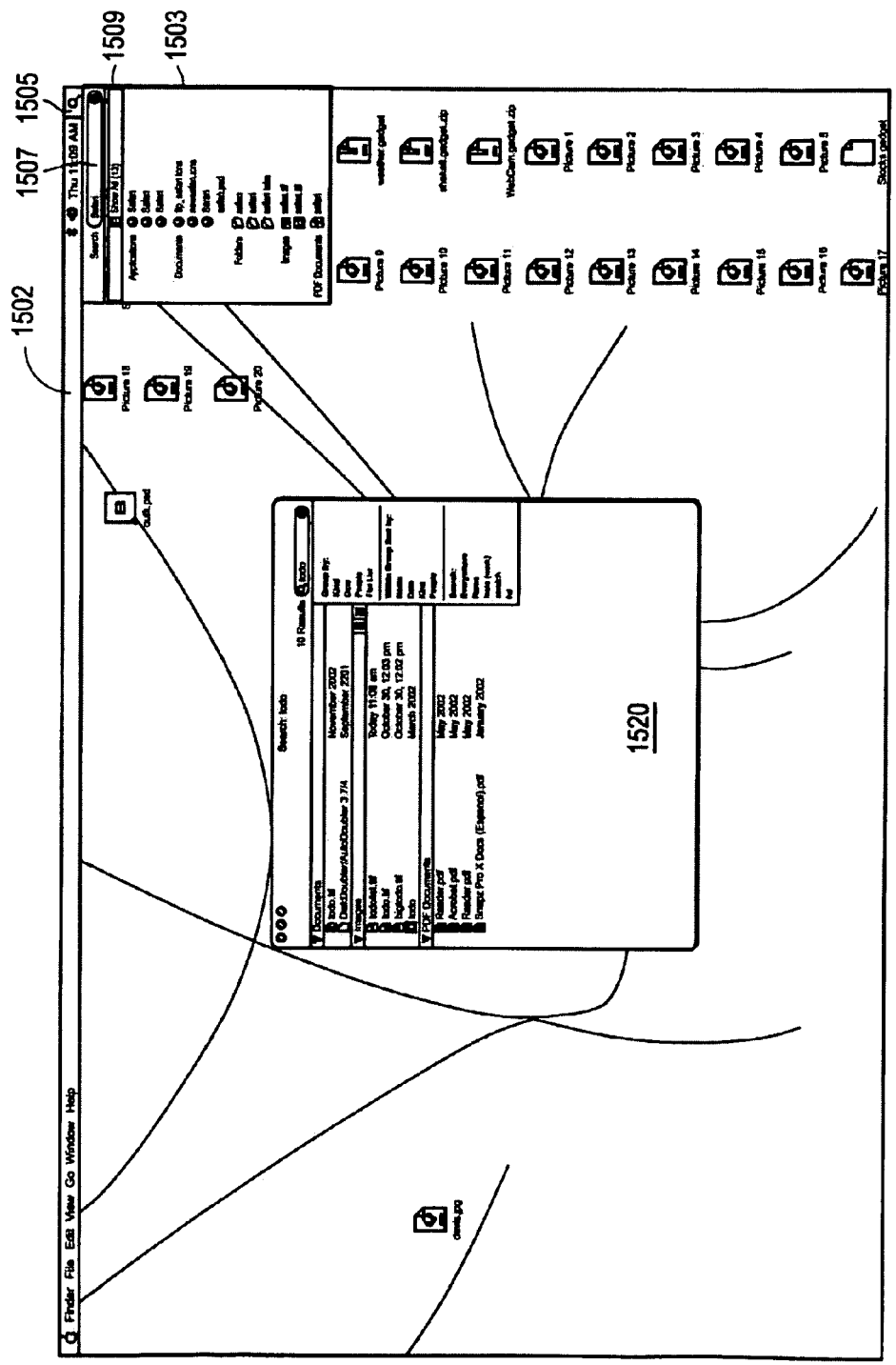

FIGS. 15A, 15B, 15C, and 15D show an example of a system wide search input user interface and search result user interface. In one particular exemplary embodiment, these user interfaces are available on the entire system for all applications which run on the system and all files and metadata, and even address book entries within an address book program, such as a personal information manager, and calendar entries within a calendar program, and emails within an email program, etc. In one exemplary embodiment, the system begins performing the search and begins displaying the results of the search as the user types text into a text entry field, such as the text entry field 1507. The search results are organized by categories and are displayed as a short list which is intentionally abbreviated in order to present only a selected number of the most relevant (scored) matches or hits to the search query. The user can ask for the display of all the hits by selecting a command, such as the "show all" command 1509. FIG. 15A shows a portion of a display controlled by a data processing system. This portion includes a menu bar 1502 which has at its far end a search menu command 1505. The user can select the search menu command by positioning a cursor, using a mouse, for example, over the search menu command 1505 and by pressing a button or by otherwise activating or selecting a command. This causes a display of a text entry region 1507 into which a user can enter text. In the example shown in FIG. 15A, which is a portion of the display, the user has entered the text "shakeit" causing the display of a search result region immediately below a "show all" command region 1509 which is itself immediately below the text entry region 1507. It can be seen that the hits or matches are grouped into categories ("documents" and "PDF documents") shown by categories 1511 and 1513 within the search result region 1503. FIG. 15B shows another example of a search. In this case, a large number of hits was obtained (392 hits), only a few of which are shown in the search result region 1503. Again, the hits are organized by categories 1511 and 1513. Each category may be restricted in terms of the number of items displayed within the search result region 1503 in order to permit the display of multiple categories at the same time within the search result region. For example, the number of hits in the documents category may greatly exceed the available display space within the search result region 1503, but the hits for this category are limited to a predetermined or dynamically determinable number of entries within the search result region 1503 for the category 1511. An additional category, "top hit" is selected based on a scoring or relevancy using techniques which are known in the art. The user may select the "show all" command 1509 causing the display of a window, such as window 1601 shown in FIG. 16A. FIG. 15C shows a display of a graphical user interface of one embodiment of the invention which includes the menu bar 1502 and the search menu command 1505 on the menu bar 1502. FIG. 15D shows another example of the search result region 1503 which appeared after a search of the term "safari" was entered into the text entry region 1507. It can be seen from the search result region 1503 of FIG. 15D that the search results are again grouped into categories. Another search result window 1520 is also shown in the user interface of FIG. 15D. It can be seen that application programs are retrieved as part of the search results, and a user may launch any one of these application programs by selecting it from the search result region, thereby causing the program to be launched.

Figure 16A:
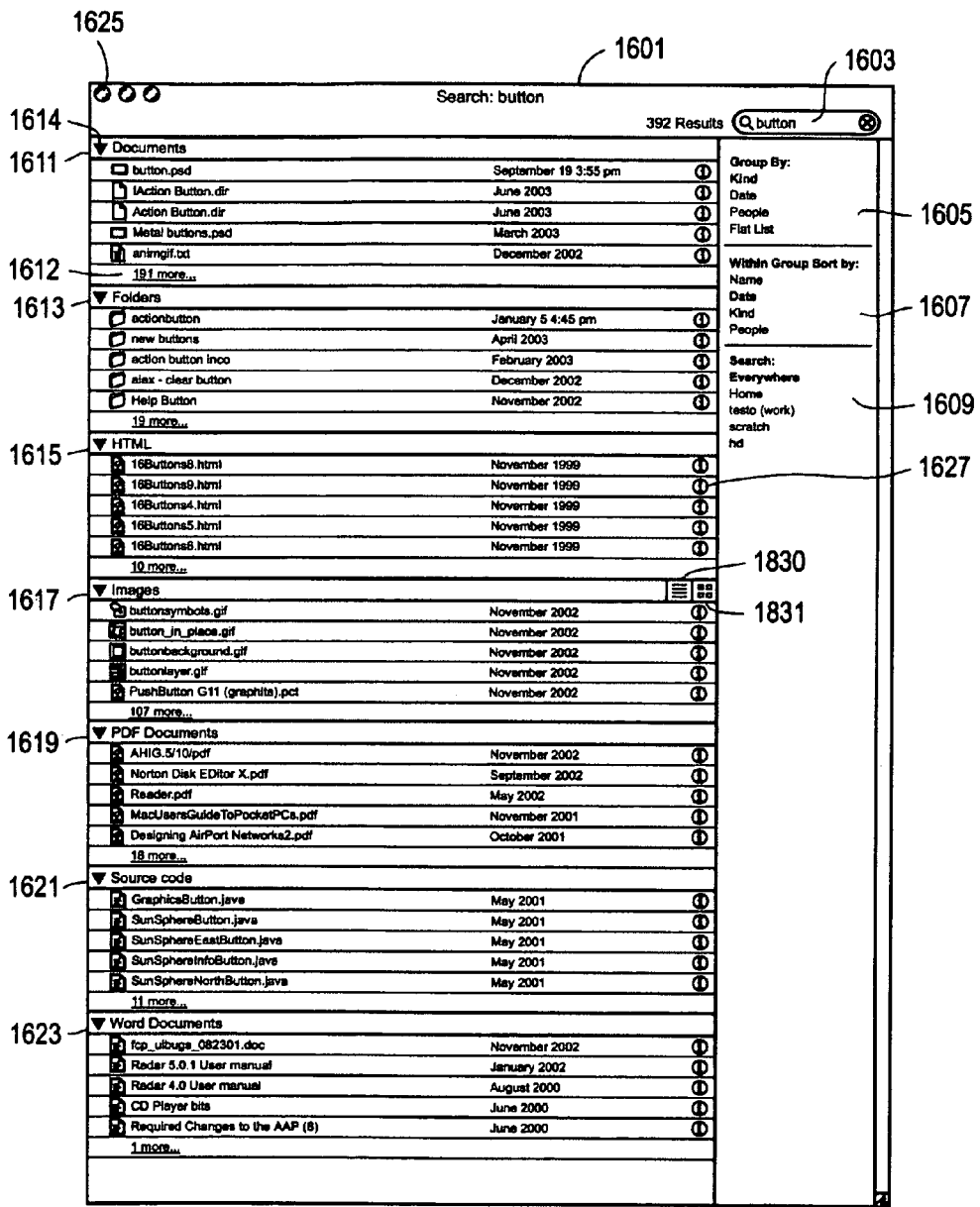
FIGS. 16A and 16B show certain aspects of embodiments of user interfaces according to the present invention.
Figure 16B:
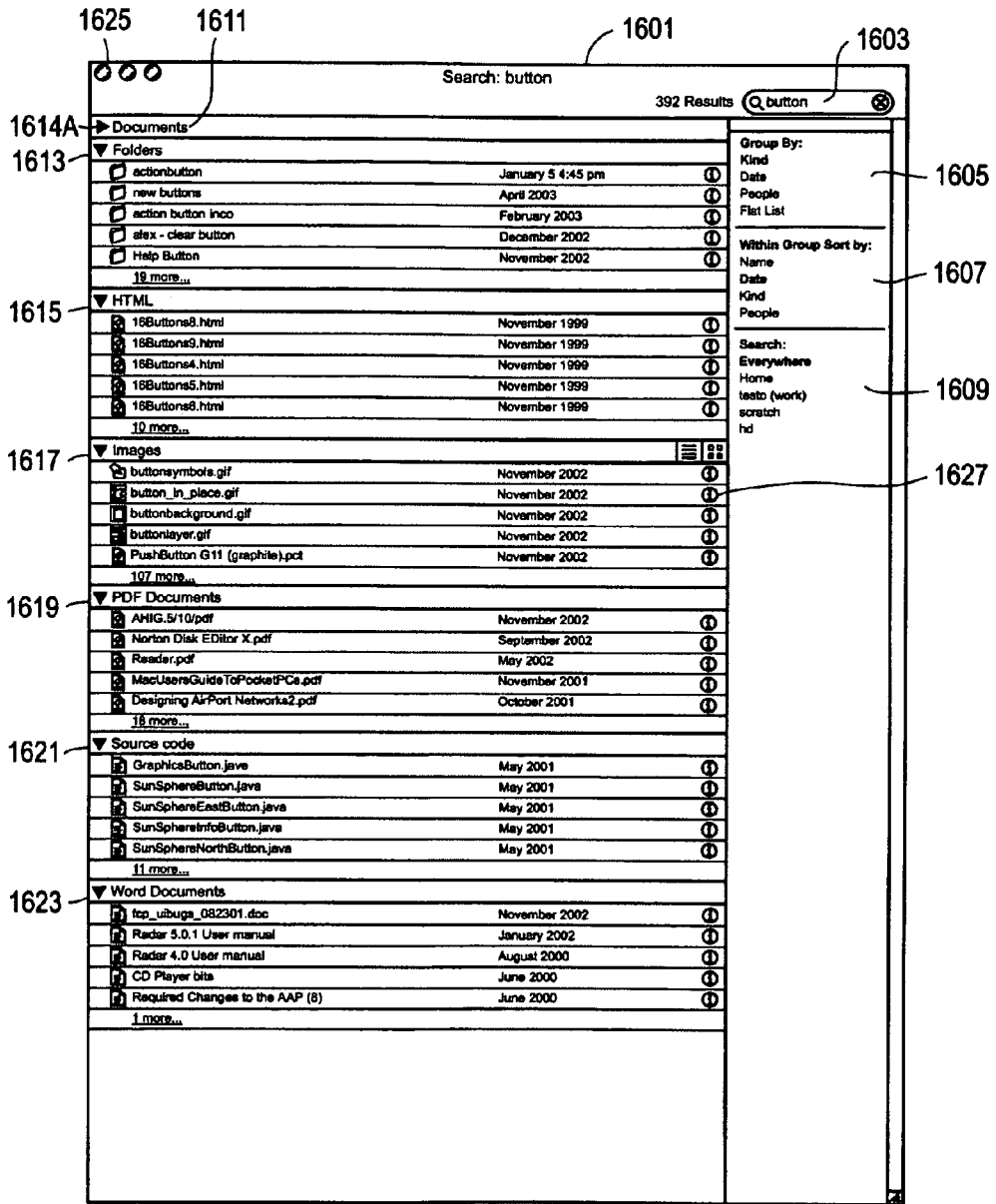
Figure 17:
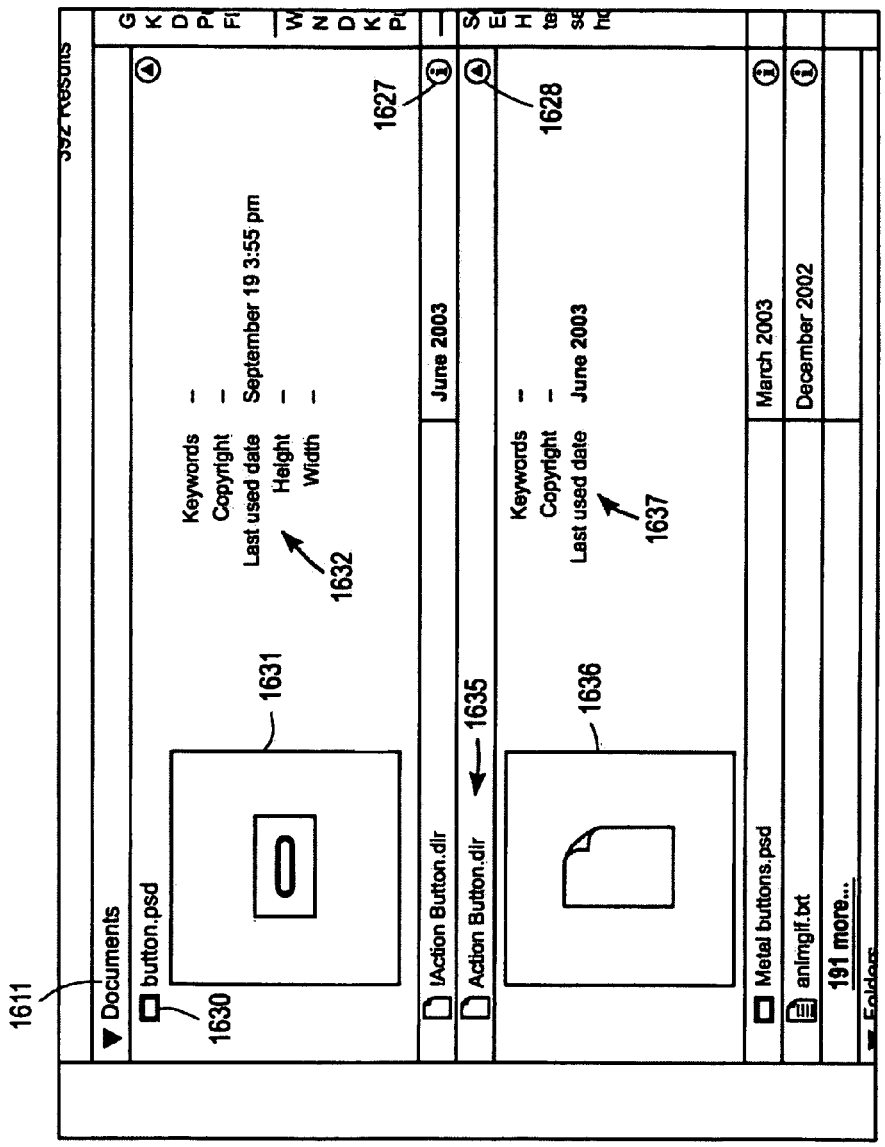
FIG. 17 shows an aspect of certain embodiments of user interfaces according to the present invention.

FIGS. 16A and 16B show examples of search result windows which may be caused to appear by selecting the "show all" command 1509 in FIG. 15A or 15B. Alternatively, these windows may appear as a result of the user having selected a "find" command or a some other command indicating that a search is desired. Moreover, the window 1601 shown in FIGS. 16A and 16B may appear in response to either of the selection of a show all command or the selection of a find command. The window 1601 includes a text entry region 1603, a group by menu selection region 1605, a sort by menu selection region 1607, and a where menu selection region 1609. The group by selection region 1605 allows a user to specify the manner in which the items in the search results are grouped according to. In the example shown in FIG. 16A, the user has selected the "kind" option from the group by menu selection region 1605, causing the search results to be grouped or sorted according to the kind or type of document or file. It can be seen that the type of file includes "html" files, image files, PDF files, source code files, and other types of files as shown in FIG. 16A. Each type or kind of document is separated from the other documents by being grouped within a section and separated by headers from the other sections. Thus, headers 1611, 1613, 1615, 1617, 1619, 1621, and 1623 designate each of the groups and separate one group from the other groups. This allows a user to focus on evaluating the search results according to certain types of documents. Within each group, such as the document groups or the folder groups, the user has specified that the items are to be sorted by date, because the user has selected the date option within the sort by menu region 1607. The user has also specified that all storage locations are to be searched by selecting "everywhere" from the where menu selection region 1609. Each item in the search result list includes an information button 1627 which may be selected to produce the display of additional information which may be available from the system. An example of such additional information is shown in FIG. 17 in which a user has selected the information button 1627 for item 1635, resulting in the display of an image 1636 corresponding to the item as well as additional information 1637. Similarly, the user has selected the information button for another item 1630 to produce the display of an image of the item 1631 as well as additional information 1632. The user may remove this additional information from the display by selecting the close button 1628 which causes the display of the information for item 1635 to revert to the appearance for that item shown in FIG. 16A. The user may collapse an entire group to hide the entries or search results from that group by selecting the collapse button 1614 shown in FIG. 16A, thereby causing the disappearance of the entries in this group as shown in FIG. 16B. The user may cause these items to reappear by selecting the expand button 1614A as shown in FIG. 16B to thereby revert to the display of the items as shown in FIG. 16A.

The search results user interface shown in FIGS. 16A and 16B presents only a limited number of matches or hits within each category. In the particular example of these figures, only the five top (most relevant or most highly sorted) hits are displayed. This can be seen by noticing the entry at the bottom of each list within a group which specifies how many more hits are within that group; these hits can be examined by selecting this indicator, such as indicator 1612, which causes the display of all of the items in the documents category or kind for the search for "button" which was entered into the text entry region 1603. Further examples of this behavior are described below and are shown in conjunction with FIGS. 18A and 18B. It will be appreciated that window 1601 is a closeable and resizable and moveable window and includes a close button and a resizing control 1625A.

Figure 18A:
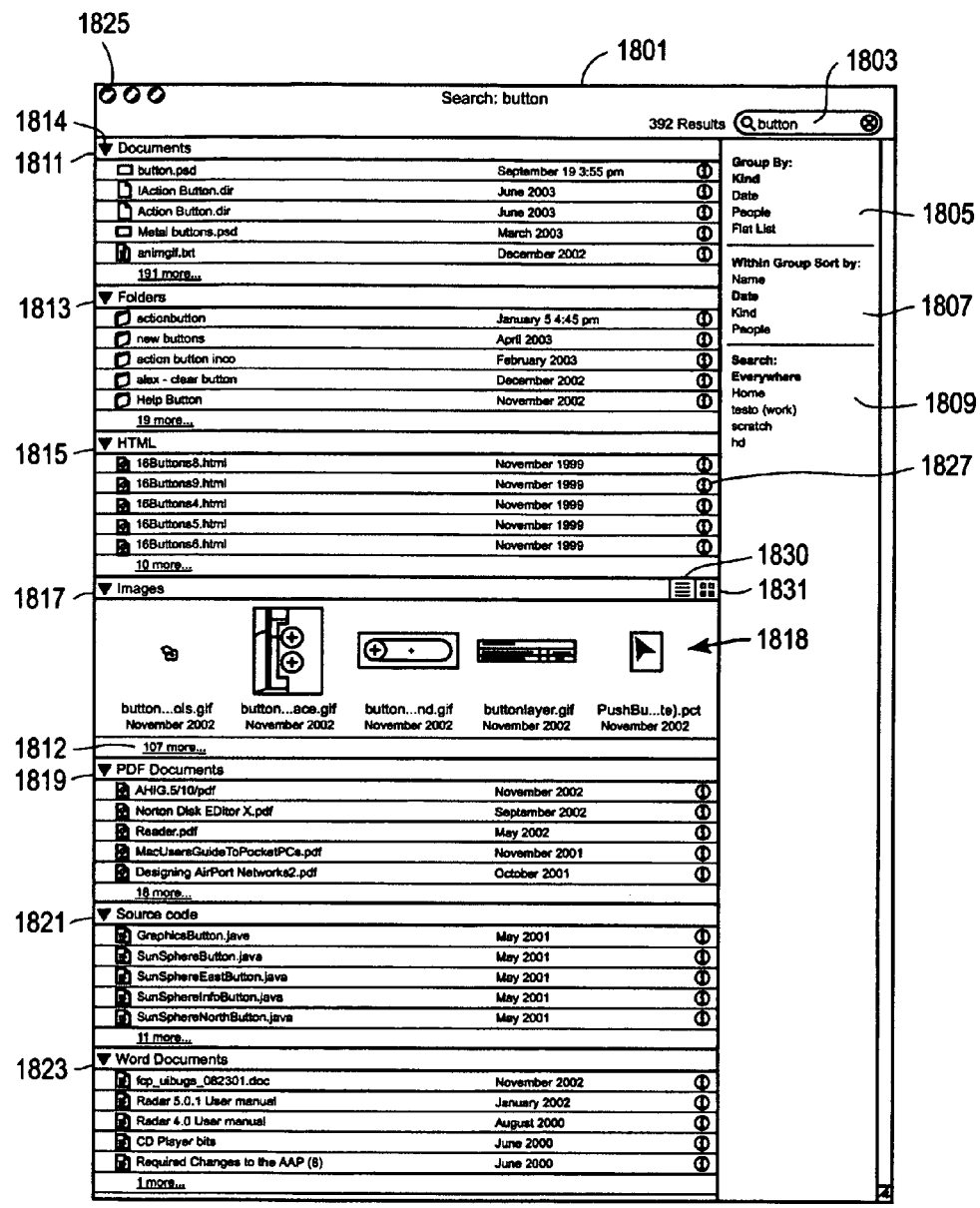
FIGS. 18A and 18B show further aspects of certain embodiments of user interfaces according to the present invention.
Figure 18B:
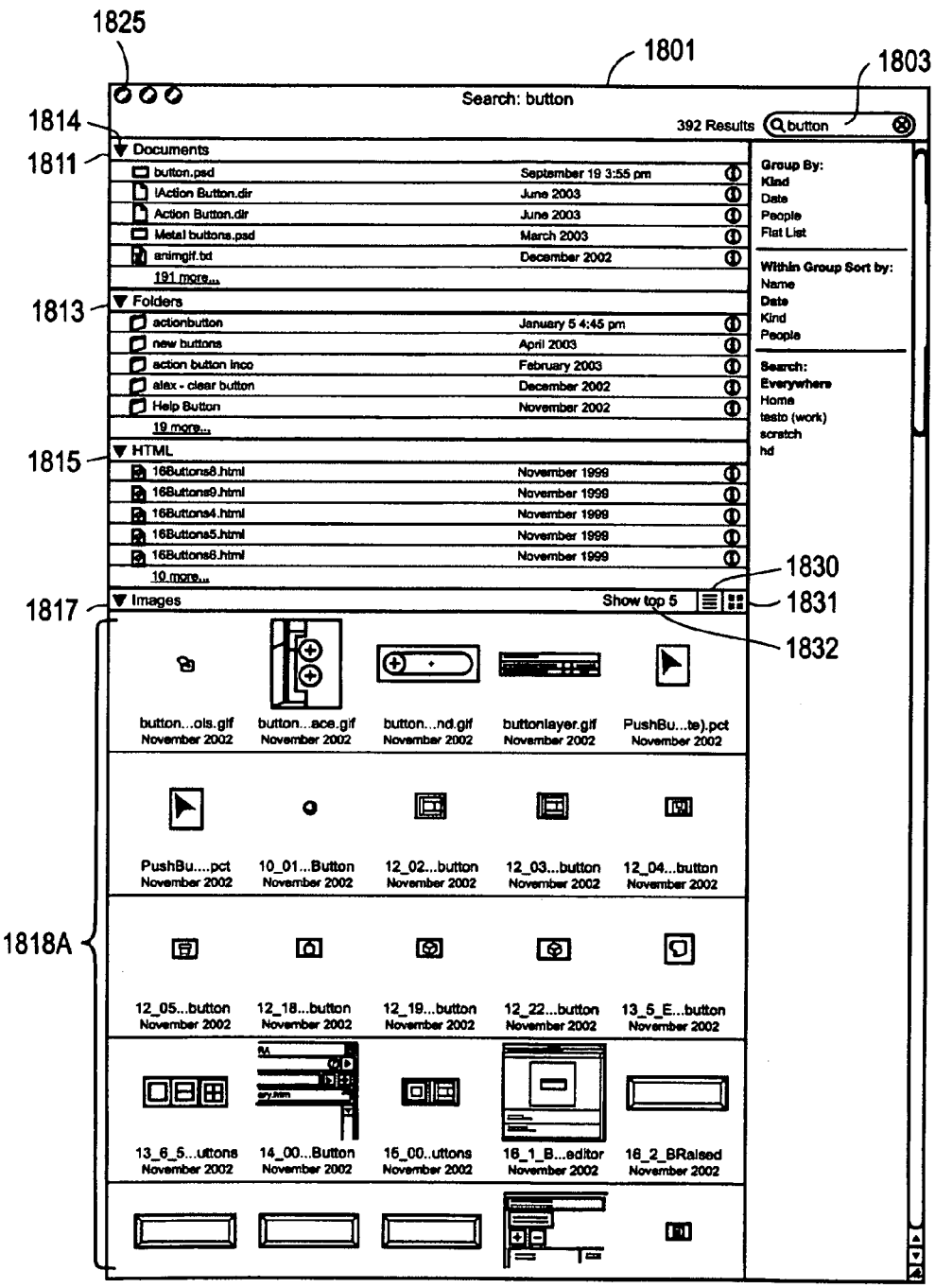

FIGS. 18A and 18B illustrate another window 1801 which is very similar to the window 1601. The window 1801 includes a text entry region 1803, a group by menu selection region 1805, a sort by menu selection region 1807, and a where menu selection region 1809, each of which function in a manner which is similar to the regions 1605, 1607, and 1609 respectively of FIG. 16A. Each item in a list view within the window 1801 includes an information button 1827, allowing a user to obtain additional information beyond that listed for each item shown in the window 1801. The window 1801 further includes headers 1811, 1813, 1815, 1817, 1819, 1821, and 1823 which separate each group of items, grouped by the type or kind of document, and sorted within each group by date, from the other groups. A collapse button 1814 is available for each of the headers. The embodiment shown in FIGS. 18A and 18B shows the ability to switch between several modes of viewing the information. For example, the user may display all of the hits within a particular group by selecting the indicator 1812 shown in FIG. 18A which results in the display of all of the images files within the window 1801 within the region 1818A. The window is scrollable, thereby allowing the user to scroll through all the images. The user can revert back to the listing of only five of the most relevant images by selecting the "show top 5" button 1832 shown in FIG. 18B. Further, the user can select between a list view or an icon view for the images portion shown in FIGS. 18A and 18B. The user may select the list view by selecting the list view button 1830 or may select the icon view by selecting the icon view button 1831. The list view for the images group is shown in FIG. 16A and the icon view for the images group is shown in FIGS. 18A and 18B. It can be seen that within a single, moveable, resizable, closeable search result window, that there are two different views (e.g. a list view and an icon view) which are concurrently shown within the window. For example, the PDF documents under the header 1819 are displayed in a list view while the images under the header 1817 are displayed in an icon view in FIGS. 18A and 18B. It can also be seen from FIGS. 18A and 18B that each image is shown with a preview which may be capable of live resizing as described in a patent application entitled "Live Content Resizing" by inventors Steve Jobs, Steve Lemay, Jessica Kahn, Sarah Wilkin, David Hyatt, Jens Alfke, Wayne Loofbourrow, and Bertrand Serlet, filed on Jun. 25, 2004, and being assigned to the assignee of the present inventions described herein, and which is hereby incorporated herein by reference.

Figure 19A:
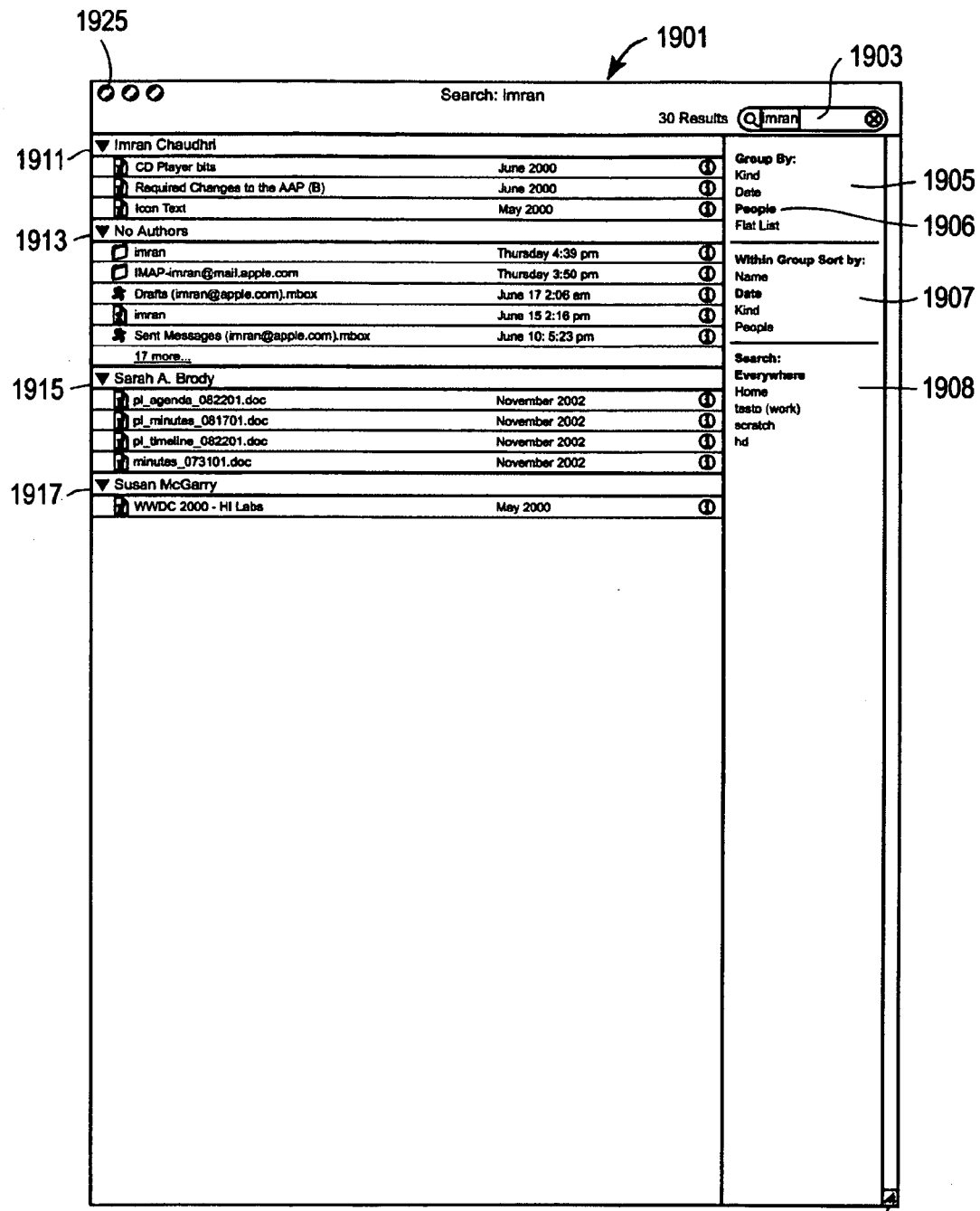
Figure 19B:
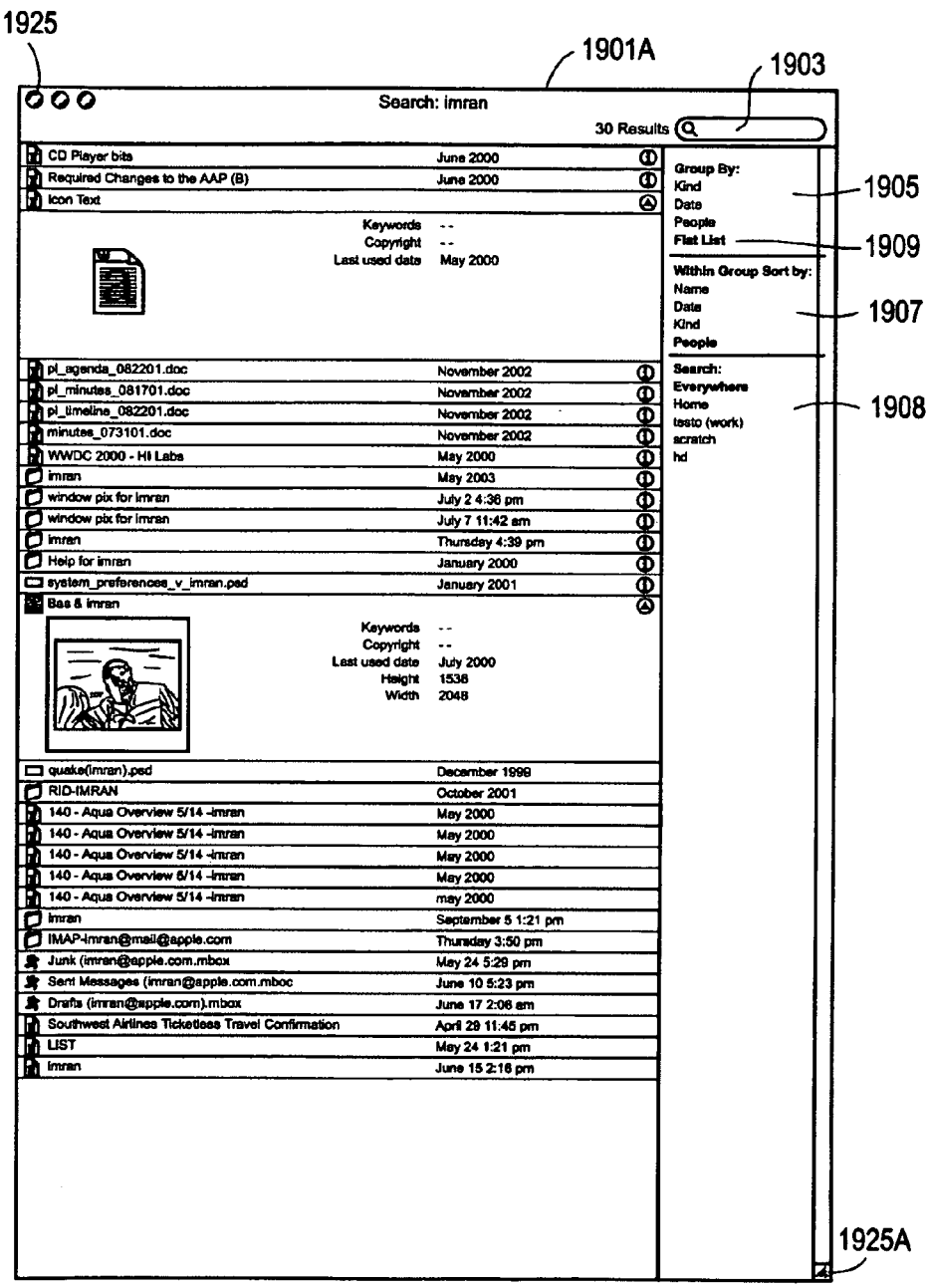

FIG. 19A shows another example of a search result window which is similar to the window 1601. The window 1901 shown in FIG. 19A includes a text entry region 1903 and a group by menu selection region 1905 and a sort by menu selection region 1907 and a where menu selection region 1908. Further, the window includes a close button 1925 and a resizing control 1925A. Text has been entered into the text entry region 1903 to produce the search results shown in the window 1901. The search results again are grouped by a category selected by a user which in this case is the people options 1906. This causes the headers 1911, 1913, 1915, and 1917 to show the separation of the groups according to names of people. Within each group, the user has selected to sort by the date of the particular file or document. The user interface shown in FIG. 19A allows a user to specify an individual's name and to group by people to look for communications between two people, for example. FIG. 19B shows another way in which a user can group a text search ("imran") in a manner which is different from that shown in FIG. 19A. In the case of FIG. 19B, the user has selected a flat list from the group by menu selection region 1905 and has selected "people" from the sort by menu region 1907. The resulting display in window 1901A is without headers and thus it appears as a flat list.

Figure 19C:
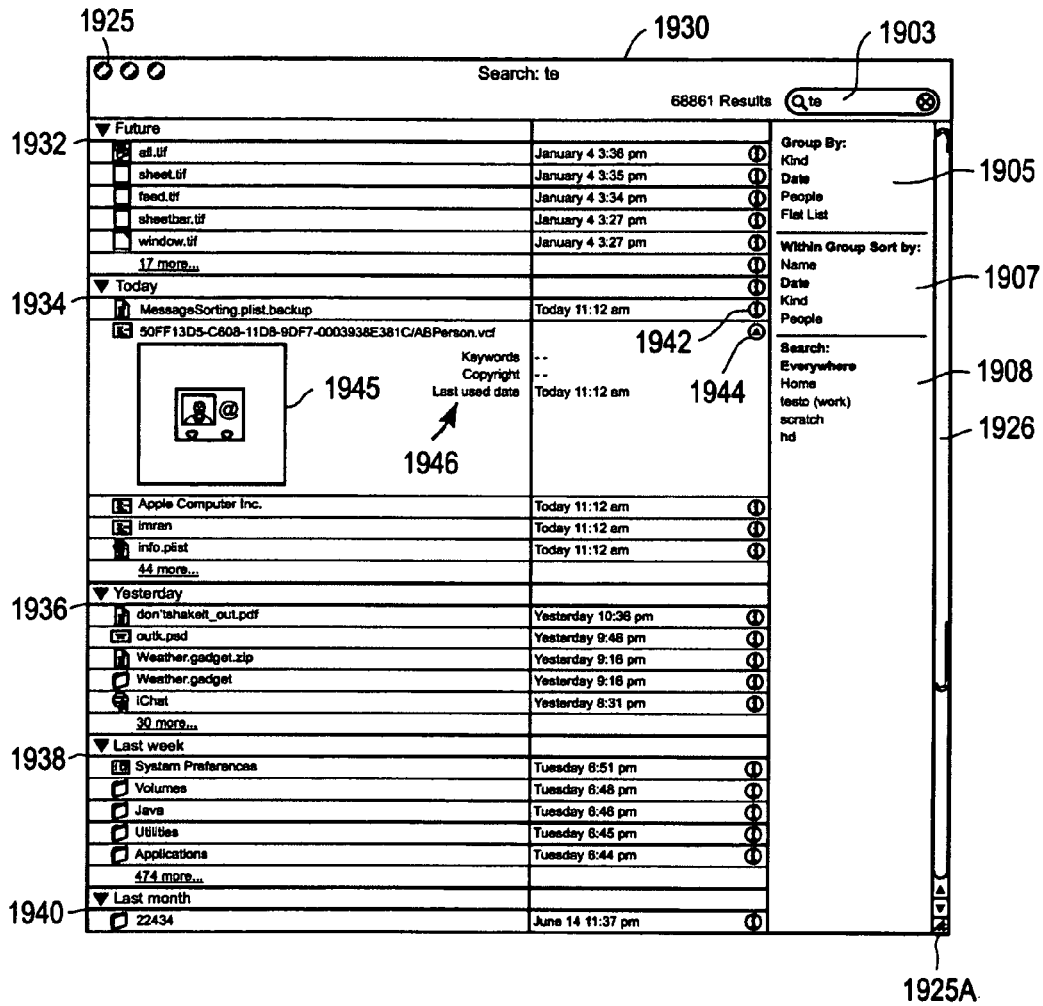

FIG. 19C shows the user interface of another search result window 1930 which includes a text entry region 1903 and the selection regions 1905, 1907, and 1908 along with a scrolling control 1926. The results shown in the window 1930 have been grouped by date and sorted within each group by date. Thus, the headers 1932, 1934, 1936, 1938, and 1940 specify time periods such as when the document was last modified (e.g. last modified today, or yesterday, or last week). Also shown within the search results window 1930 is the information button 1942 which may be selected to reveal further information, such as an icon 1945 and additional information 1946 as shown for one entry under the today group. This additional information may be removed by selecting the contraction button 1944.

Figure 19D:
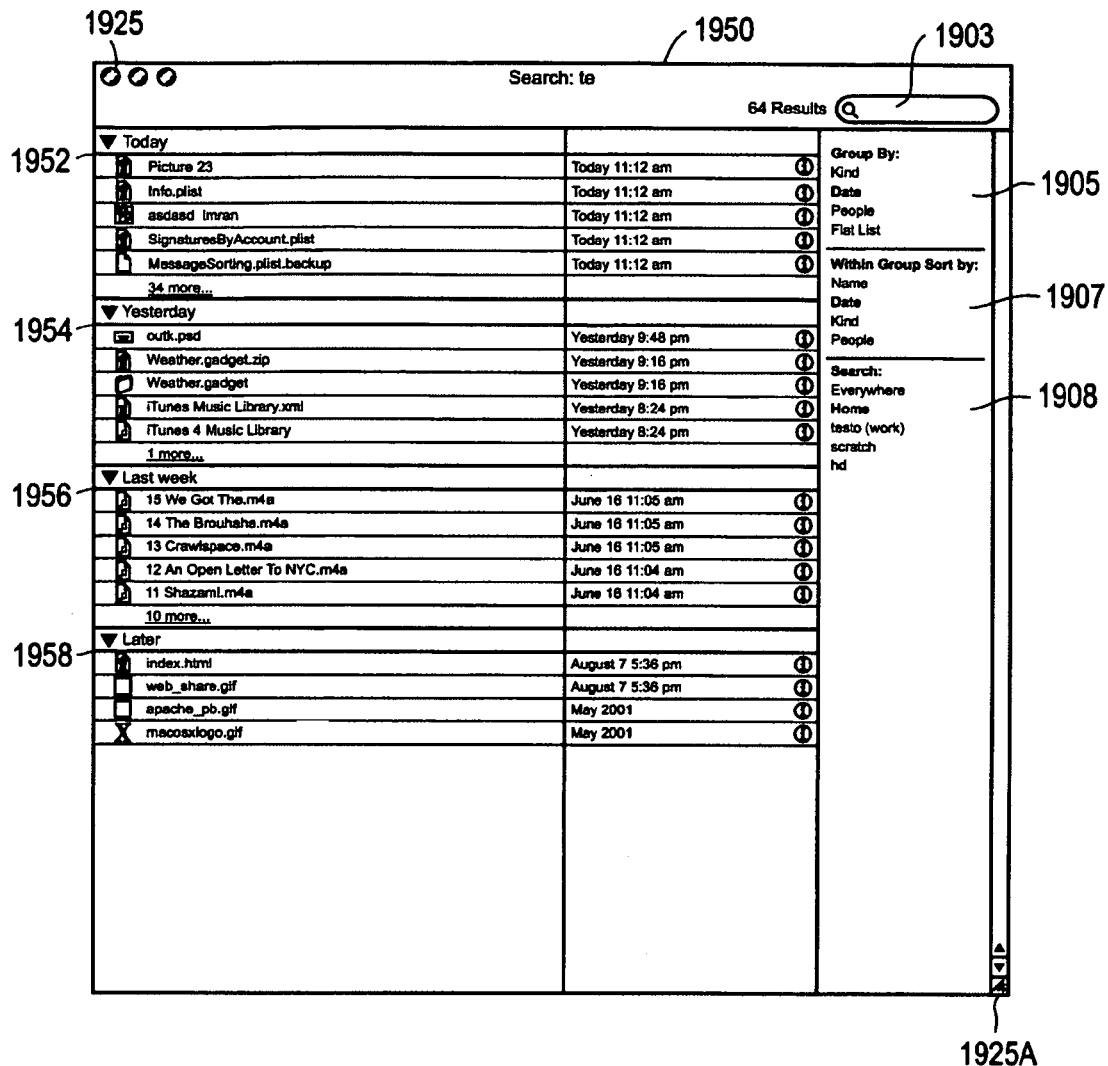

FIG. 19D shows a search result window 1950 in which a search for the text string "te" is grouped by date but the search was limited to a "home" folder as specified in the where menu selection region 1908. Time specific headers 1952, 1954, 1956, and 1958 separate items within one group from the other groups as shown in FIG. 19D.

FIG. 19E shows an alternative embodiment of a search result window. In this embodiment, the window 1970 includes elements which are similar to window 1901 such as the selection regions 1905, 1907, and a scrolling control 1926 as well as a close button 1925 and a resizing control 1925A. The search result window 1970 further includes a "when" menu selection region 1972 which allows the user to specify a search parameter based on time in addition to the text entered into the text entry region 1903. It can be seen from the example shown in FIG. 19E that the user has decided to group the search results by the category and to sort within each group by date. This results in the headers 1973, 1975, 1977, and 1979 as shown in FIG. 19E.

Figure 20:
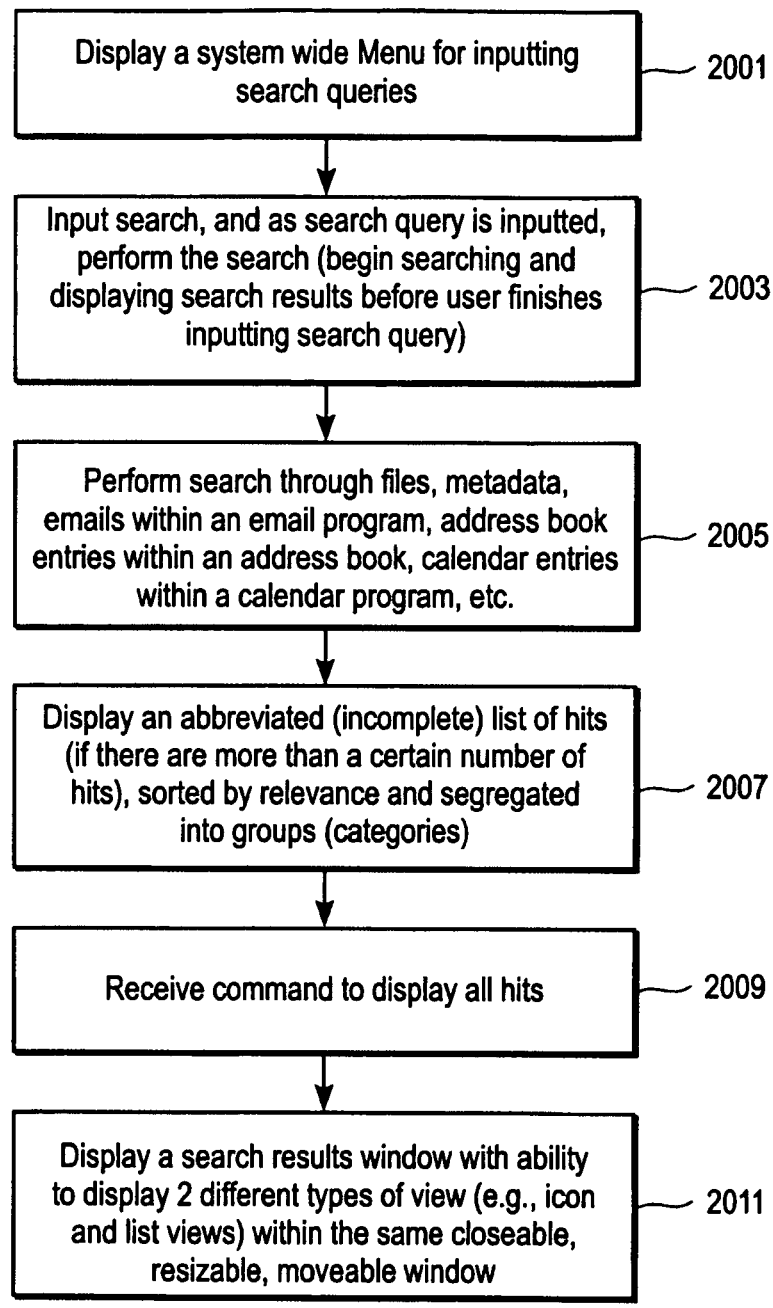
FIG. 20 is a flow chart which illustrates another exemplary method of the present invention.

FIG. 20 shows an exemplary method of operating a system wide menu for inputting search queries, such as the system wide menu available by selecting the search menu command 1505 shown in FIG. 15A or 15B, or 15C. In operation 2001, the system displays a system wide menu for inputting search queries. This may be the search menu command 1505. The user, in operation 2003, inputs a search, and as the search query is being inputted, the system begins performing and begins displaying the search results before the user finishes inputting the search query. This gives immediate feedback and input to the user as the user enters this information. The system is, in operation 2005, performing a search through files, metadata for the files, emails within an email program, address book entries within an address book program, calendar entries within a calendar program, etc. The system then, in operation 2007, displays an abbreviated (e.g. incomplete) list of hits if there are more than a certain number of hits. An example of this abbreviated listing is shown in FIG. 15B. The listing may be sorted by relevance and segregated into groups such as categories or types of documents. Then in operation 2009, the system receives a command from the user to display all the hits and in operation 2011 the system displays the search results window, such as the window 1601 shown in FIG. 16A. This window may have the ability to display two different types of views, such as an icon view and a list view within the same closeable, resizable, and moveable window. It will be appreciated that the searching, which is performed as the user is typing and the displaying of results as the user is typing may include the searching through the metadata files created from metadata extracted from files created by many different types of software programs.

Figure 21:
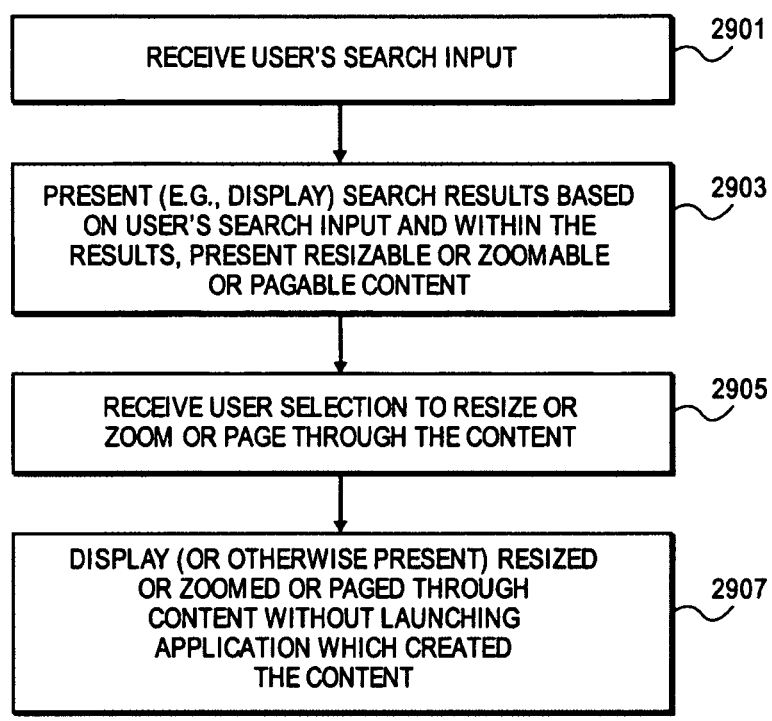
FIG. 21 shows a method, according to one exemplary embodiment, of another aspect of the present inventions.

Another aspect of the present inventions relates to previews, displayed within search results windows, icons, dynamic icons, etc., where some or all of which are at least one of being resizeable, zoomable, or pageable through. For example, a first representation (e.g., an icon, a dynamic icon, etc.) of a first file found by the search may contain a preview that is at least one of being resizeable or zoomable or scrollable or pageable through within a display region, such as a window, which contains the results of the search. FIG. 21 shows an exemplary method for performing at least some of the functionality of this aspect. In operation 2901, a user's search input is received by a data processing system which, in turn, in operation 2903, performs the search and then presents the search results based on the user's search input. In addition, the results are presented such that, for at least one file which was found by the search, the file is represented by an icon, a dynamic icon having a preview, or other representation of the file, where the preview or the representation is at least one of resizeable or zoomable or scrollable or pageable through or a combination of those capabilities. For example, if the file which is found is a picture file, then a thumbnail of the picture file may be the representation which is resizeable within the search results window, such that it can be enlarged in size or decreased in size on the display device within the search results window. Further, the picture, which is a thumbnail which represents the file, may be zoomable in that the content of the representation may be zoomed in (e.g. magnified) or out (e.g. demagnified) while maintaining the same area or size of the representation. In addition or alternatively, the content in the representation may be pageable in that multiple different pages of the content may be displayed either sequentially over time by paging through the multiple pages in sequence, as if one were flipping through pages in a book, or multiple pages may be spread out concurrently. One or more of these actions may be possible, depending upon the particular type of content. Images may typically be resizeable or zoomable or scrollable and may also be pageable, for example. In at least certain embodiments of the present invention, as shown in operation 2907, the representation within the search results window may be resized or scrolled or zoomed or paged through without having to launch the application which created the content.

A preview, at least in certain embodiments, can apply to files (e.g., documents, still images, video, etc.) or other objects (e.g. records, emails, messages, vCards, etc.). A single page preview can be used for a thumbnail or in any situation where a single image is needed to provide a preview of an item. Multiple items can be previewed at once and compared, or viewed in sequence. When multiple items are previewed at once, they can be of any file type including many different file types. The previews can be shown in the same window as the search results window or in a separate window or in a layer that is overlaid above the item, shown in a search result, which is being previewed in the layer above. Alternatively, the previews of contents of files may be presented within icons and/or dynamic icons representing the files, where the icons and/or dynamic icons may be displayed in a window, such as the search result window.

A preview may be presented using a variety of different implementations, such as a plug-in implementation which uses one or more plug-ins, such as a QuickTime plug-in, etc. Each of the previews may be formatted in one of several standard data/file types (such as PDF, text, HTML, JPEG, a movie format, or a sound/music format, etc.). The previews may be either generated by the application, which created the item or file represented by the preview, when the item or file is stored or may be generated dynamically when needed. A dynamically generated preview may be produced by invoking a generator plug-in that translates the native format of the item being previewed to one of the "standard" data/file types (e.g. PDF, text, HTML, JPEG, a standard movie format, or a standard sound/music format, etc.). A preview generator plug-in may be loaded in a separate process to protect against failures and/or security vulnerabilities. Alternatively, a trusted generator plug-in (e.g., QuickTime), or a set of such plug-ins may be loaded directly in the process of presenting the search results and such plug-ins may be used to present the previews. A preview generator may be capable of handling multiple preview requests concurrently and the preview generator and/or the search software controlling the search results window may manage a queue of preview requests, and the search software can cancel or reorder the preview requests in the queue.

Figure 22A:
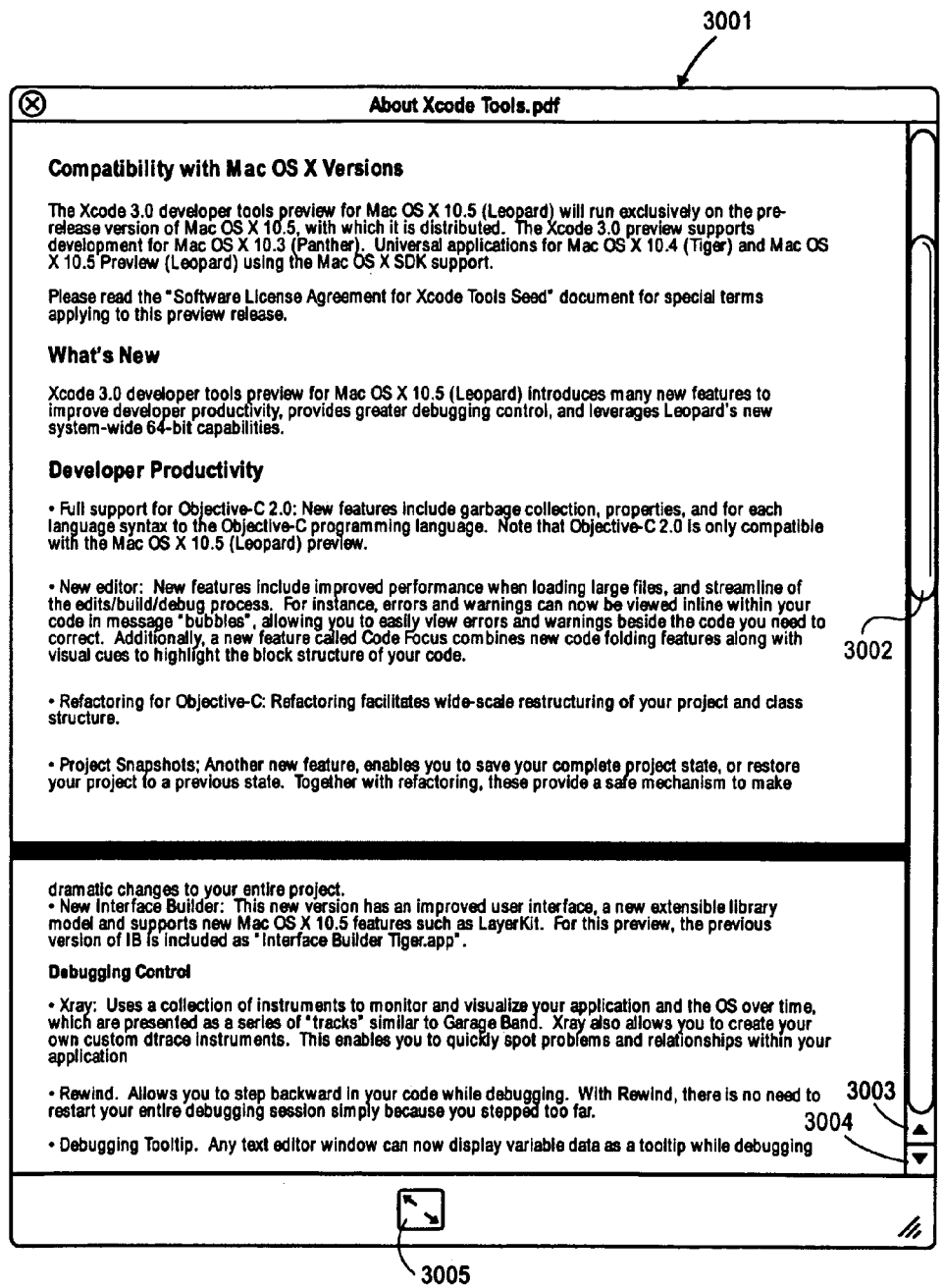
FIGS. 22A, 22B and 22C show examples of previews of items found from a search query, with the previews being capable of being presented within the window showing the search results.
Figure 22B:
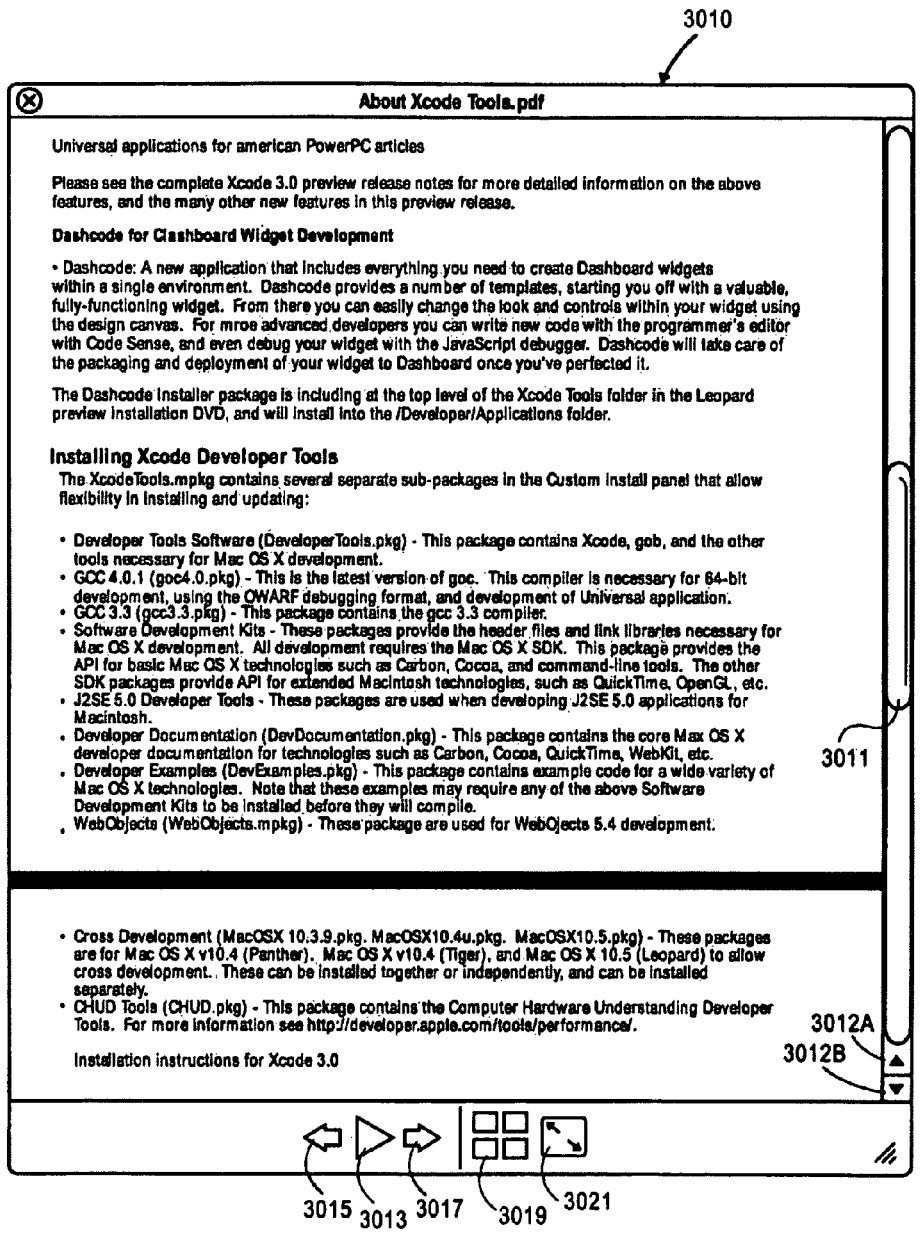
Figure 22C:
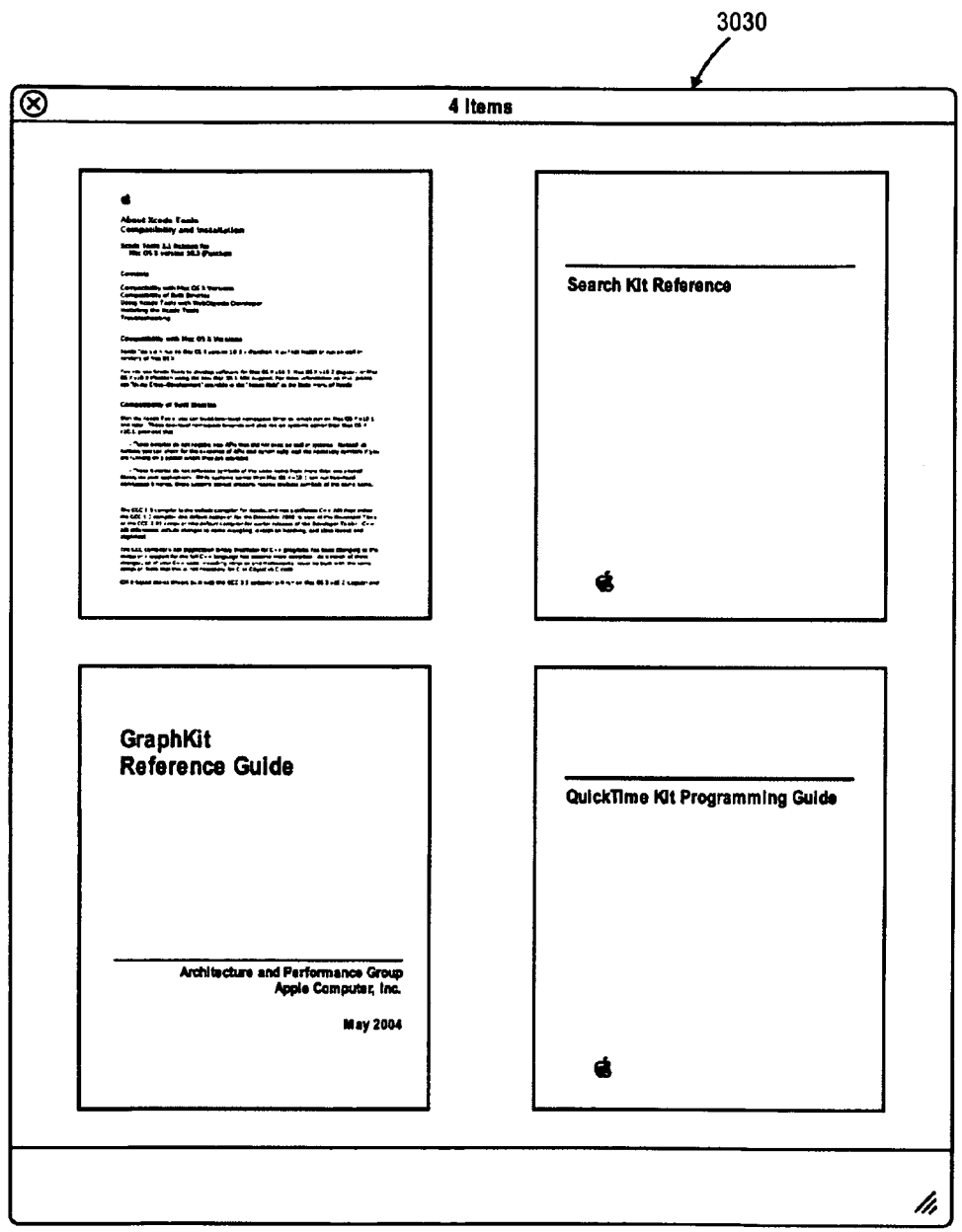

The following figures show examples of previews or other representations which are resizeable or zoomable or scrollable or pageable through. FIG. 22A shows an example of a preview 3001 displayed on a display device, either within a search result window or as an overlay on the window. The preview 3001 is scrollable and resizeable; it may be scrolled using any one of the scroll controls 3002, 3003 and/or 3004. It may be resized using the resize control 3005. FIG. 22B shows a preview 3010 which can display multiple documents or items in a scrollable format. The view shown in FIG. 22B of the preview 3010 shows only one document and another document can be selected for viewing using interface controls 3015, 3013, and 3017. The view of preview 3010 is scrollable using scroll controls 3011, 3012A and/or 3012B. The view of preview 3010 is also resizeable using resize control 3005. The user can also switch to display multiple documents or items at once in the view of preview 3010 by selecting the user interface control 3019 which will cause the preview shown in FIG. 22B to appear similar to the preview shown in FIG. 22C which shows multiple documents concurrently. The preview shown in FIG. 22C may also be scrollable.

Figure 23:
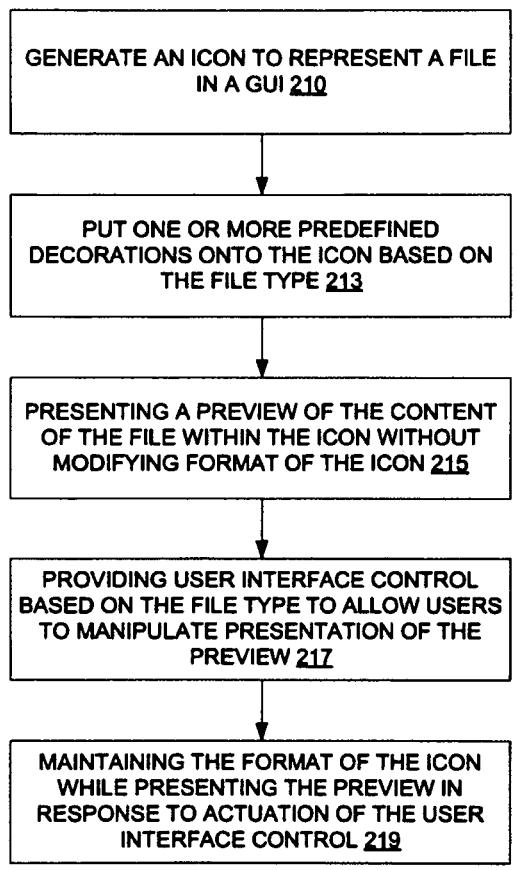
FIG. 23 provides an example of one method of generating dynamic icons having previews within the dynamic icons.

Previews or other representations which are resizeable or scrollable or zoomable or pageable through may also be provided in other user interfaces which may include alternative types of views, such as within a dynamic icon, which is further described below. FIG. 23 provides an example of one method of generating dynamic icons having previews within the dynamic icons. The method may begin in block 210 in which an icon of a file is generated to represent the file in a graphical user interface (GUI). In block 213, one or more predefined decorations are put onto the icon based on the file type of the file. For example, a foldover may be put at the top right corner of the icon for documents. In block 215, a preview of the content of the file is presented within the icon without modifying the format of the icon. For example, the shape and size of the icon, as well as decorations on the icon, remain the same as the preview of the content of the file is presented within the icon. Unlike some existing user interface, no new window is generated to present the preview. In some embodiments, an initial view of the preview may include an image of a predetermined portion of the file, such as the first page of a document, a thumbnail of an image, a pre-selected scene in a video, etc. The initial view of the preview may also be referred to as the initial preview.

In some embodiments, the preview within the icon is interactive such that presentation of the preview may change in response to user input. Various user interface control are provided based on the file type to allow users to manipulate presentation of the preview in block 217. In one example, where the file is a document, a left arrow button and a right arrow button may be provided to allow users to page through the document, as if one were flipping through pages in a book sequentially. In another example, where the file is a video, a play button may be provided to allow users to initiate playing of a preview of the video. Furthermore, a stop button may be provided to allow users to stop playing the preview of the video. In another example, where the file is an image, a zoom button may be provided to allow users to zoom in and/or zoom out of a thumbnail of the image presented in the icon. While presenting the preview in response to actuation of the user interface control, the format of the icon (e.g., size of icon, shape of icon, color of icon, etc.) is maintained at block 219. Furthermore, some or all of the decorations on the icon may be maintained during presentation of the preview. For example, a foldover at the top right corner of an icon of a document is maintained while users page through a preview of the document within the icon until reaching the last page of the document. When the last page of the document is presented, the foldover may be removed to indicate that the last page of the document is being presented. Alternatively, a status indicator is provided to inform users of the status of the presentation of the preview. For instance, a status bar or a status ring may be provided to indicate the portion of a preview of a video that has been played. Details of some examples of dynamic icons are shown in FIGS. 26A-26D and 27A-27E below.

In some embodiments, the dynamic icons created according to the method described above are displayed in GUIs associated with hierarchical file system (HFS) management application, such as the FINDER program from Apple, Inc., of Cupertino, Calif., which operates on the MACINTOSH operating system. In alternate embodiments, the HFS management application may be WINDOWS EXPLORER, which operates on MICROSOFT'S WINDOWS operating system. For example, a GUI associated with a HFS management application may include a window displaying dynamic icons to represent files inside a directory. Users of the GUI may readily preview the content of a file within a respective dynamic icon without opening another window or viewing panel. Alternatively, the dynamic icons are displayed in GUIs associated with a file searching application, such as the SPOTLIGHT program from Apple, Inc., of Cupertino, Calif. For example, files resulted from a search by the file searching application may be represented by dynamic icons displayed in a search result window. As such, users of the file searching application may readily preview the content of the files inside their respective dynamic icons without opening another window or viewing panel within the same window.

Figure 24:
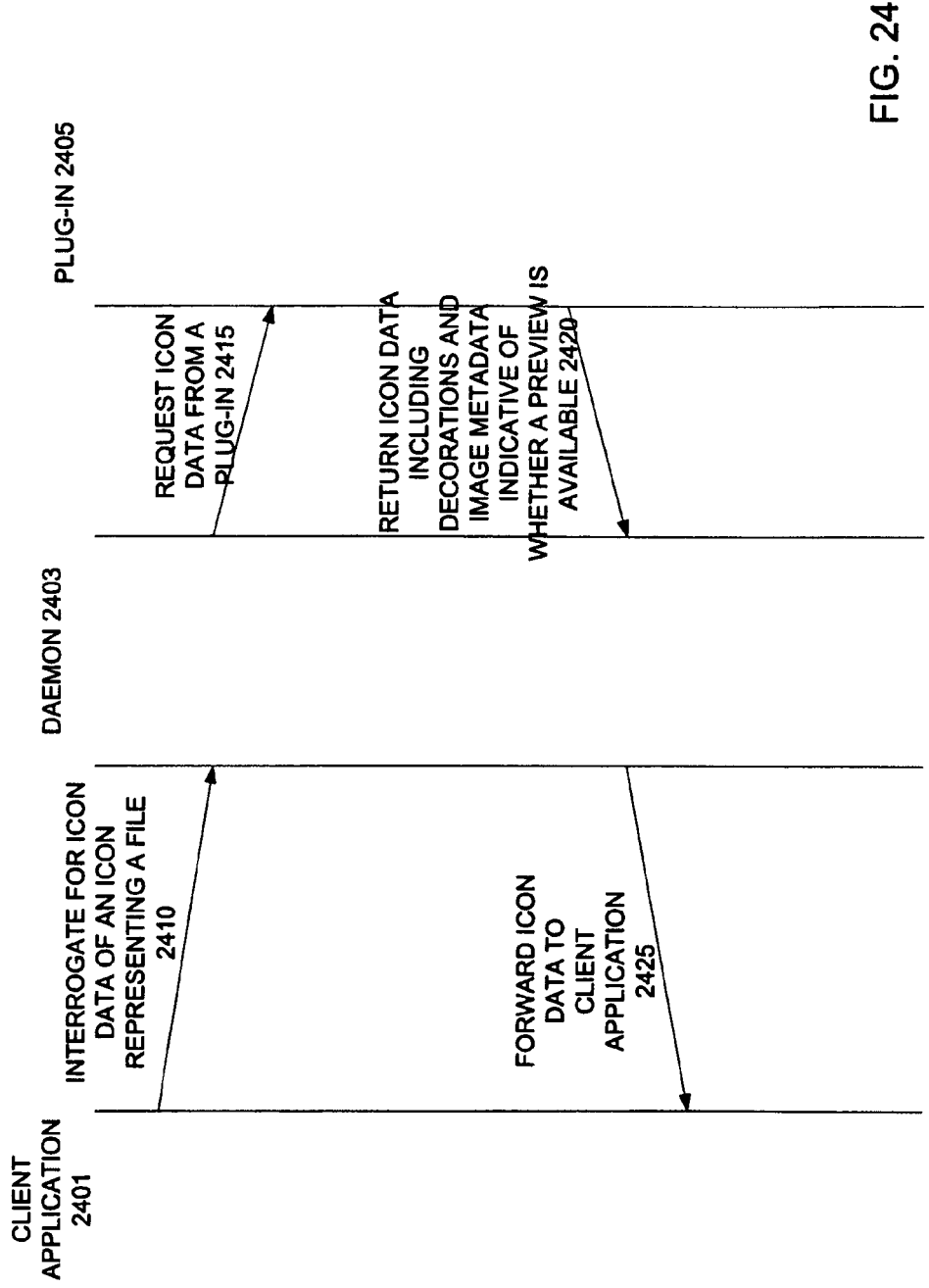
FIG. 24 illustrates one embodiment of a call diagram to change a thumbnail of a file to live preview of the file.

In some embodiments, the preview is provided in the metadata of the file. As mentioned above, the metadata of the file may include a field which includes an indicator of whether a preview of the content of the file is available. Furthermore, the field may include an indicator of whether the preview, if available, is interactive. If an interactive preview of the content of the file is available according to these indicators, a client application may turn a thumbnail into a live preview of the content. FIG. 24 illustrates one embodiment of a call diagram to change a thumbnail of a file to live preview. Specifically, FIG. 24 illustrates the interaction between a client application 2401 (on the left of FIG. 24), a daemon 2403 (in the middle of FIG. 24), and a plug-in 2405 (on the right of FIG. 24). Some examples of the client application 2401 include a HFS management application and a file searching application. The daemon 2403 may include a GUI creating daemon, such as Quick Look daemon, which operates on the Macintosh operating system. The plug-in 2405 is associated with an application that has created the file (hereinafter referred to as "the creator application"). Note that there may be multiple plug-ins available in the operating system, each plug-in associated with a distinct application usable to create files (e.g., word processing application, video editing application, etc.).

Initially, the client application 2401 interrogates the daemon 2403, which is a process running in the background, for icon data of an icon representing a file 2410. In response to the interrogation 2410, the daemon 2403 sends a request for the icon data to the plug-in 2405. In response to the request 2415, the plug-in 2405 returns the icon data 2420 to the daemon 2403. The icon data includes decorations to be put onto the icon and image metadata indicative of whether a preview of the content of the file is available. The daemon 2403 then forwards the icon data 2425 to the client application 2401. Using the icon data, the client application 2401 may generate the decorations to put onto the icon and determine if a preview of the content of the file is available. If the preview is available, the client application 2401 may present the preview in the icon and provide appropriate user interface control to allow users to manipulate the preview. As such, the thumbnail of the file may be turned into a dynamic icon if the metadata of the file indicates that the preview is available. Details of some embodiments of generating dynamic icons have been described above with reference to FIG. 23.

Figure 25:
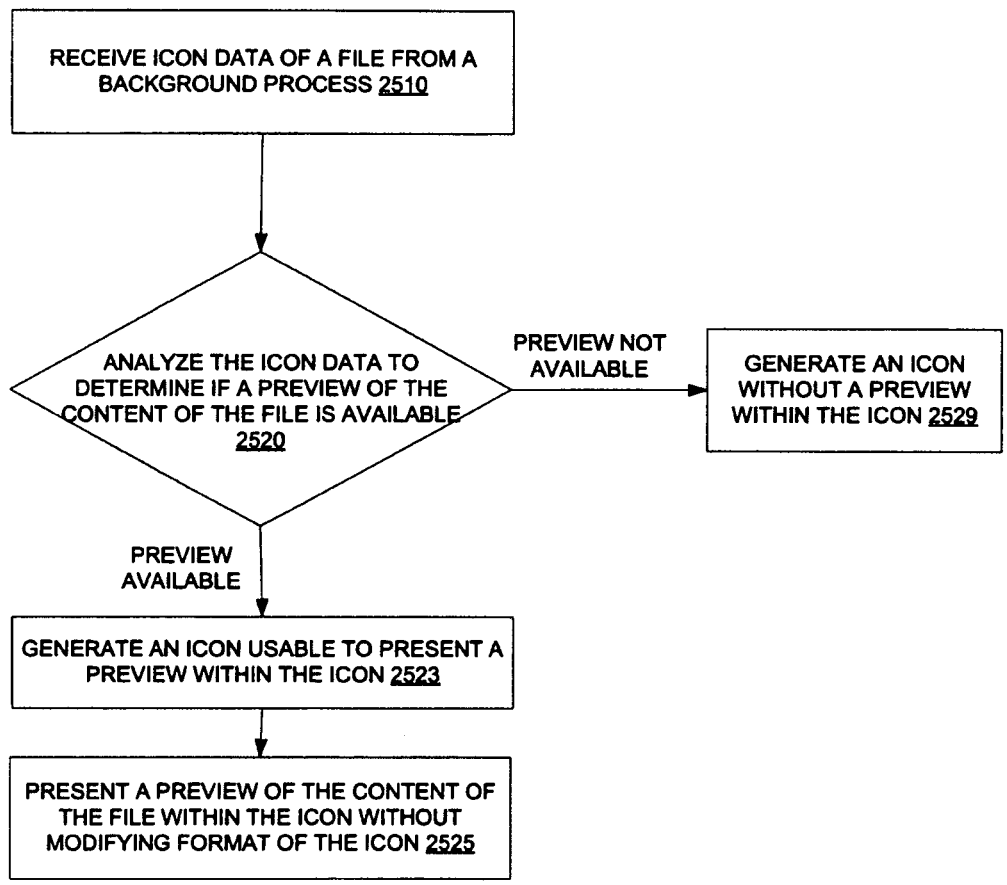
FIG. 25 is a flowchart showing one embodiment of a method of changing a thumbnail to live preview.

FIG. 25 is a flowchart showing one embodiment of a method of changing thumbnail to live preview. The method may begin in block 2510 in which icon data of a file is received from a background process, such as the daemon 2403 in FIG. 24. The icon data includes metadata of the file. In block 2520, the icon data is analyzed to determine if a preview of the content of the file is available. For example, the metadata may include a preview flag, which may be set to indicate that a preview of the content of the file is available. If a preview is not available according to the metadata, then an icon without a preview is generated in block 2529. The icon generated may still include decorations as specified by the icon data. Otherwise, if a preview is available according to the metadata, then an icon usable to present the preview within the icon is generated in block 2523. The icon generated may further include decorations as specified by the icon data. In block 2525, a preview of the content of the file is presented within the icon while maintaining the decorations on the icon. Furthermore, the format of the icon may not be modified.

In some embodiments, the preview presented within the icon includes an interactive preview. Various user interface control may be provided to allow users to manipulate presentation of the preview. The icon generated is displayed on a GUI associated with a client application (such as the client application 2401 in FIG. 24). The user interface control may be displayed within the icon and/or outside of the icon on the GUI. In one example, where the file is a document, a left arrow and a right arrow may be provided to allow users to page through the document. Alternatively, a scroll bar may be provided to allow users to scroll up and down the document. In another example, where the file is a video, a play button may be provided to allow users to initiate playing a preview of the video (which may include all or part of the video) within the icon. Furthermore, a stop button may be provided to allow users to stop playing the video. In another example, where the file is an image, a preview of the image may include a thumbnail of the image, and a zoom button may be provided to allow users to zoom in and zoom out of the thumbnail of the image.

User Interface Aspects of Dynamic Icons

Various different examples of dynamic icons discussed above are provided herein. It will be understood that some features from certain embodiments may be mixed with other embodiments such that hybrid embodiments may result from these combinations. It will be appreciated that certain features may be removed from each of these embodiments and still provide adequate functionality in many instances.

Figure 26A:
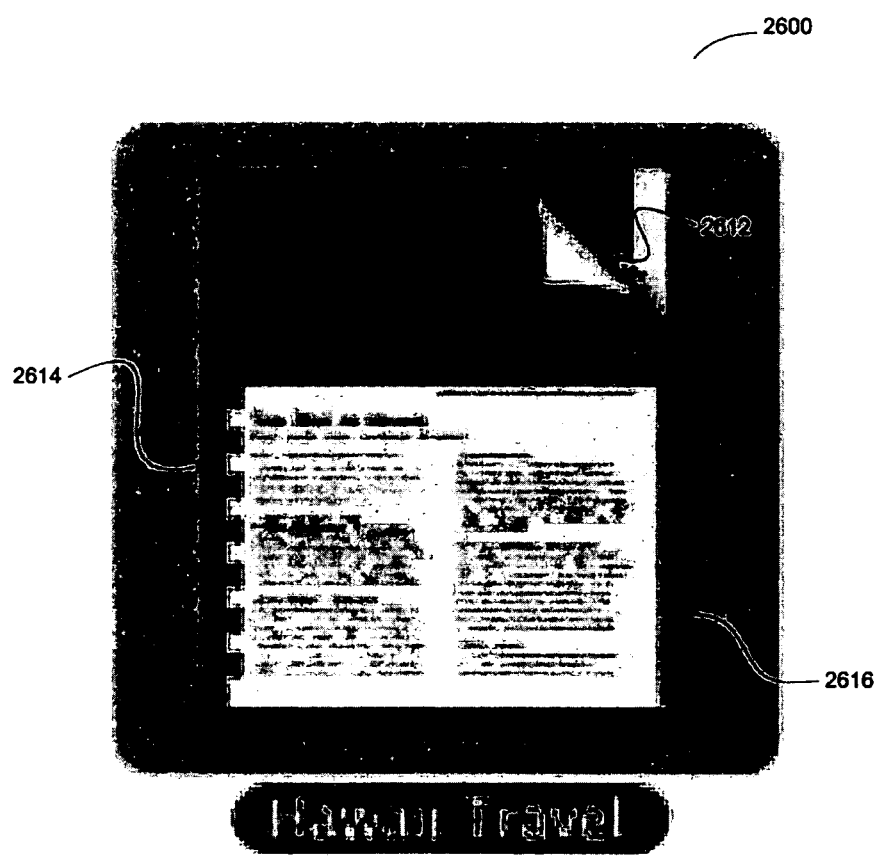
FIGS. 26A-26D show one embodiment of a dynamic icon.

FIGS. 26A-26D show one embodiment of a dynamic icon, which may be displayed on a GUI associated with a client application (e.g., a file management application, a file searching application, etc.) being executed in a data processing system (e.g., a computer system, etc.). The dynamic icon 2600 in FIGS. 26A-26D represents a document entitled "Hawaii Travel." Decorations on the icon 2600 include a foldover 2612 at the top right corner of the dynamic icon 2600 and a spiral book spine 2614 at the left side of the dynamic icon 2600. Referring to FIG. 26A, the dynamic icon 2600 initially displays a first page 2616 of the document. Thus, this preview of the first page 2616 of the document may also be referred to as the initial preview of the document.

Figure 26B:
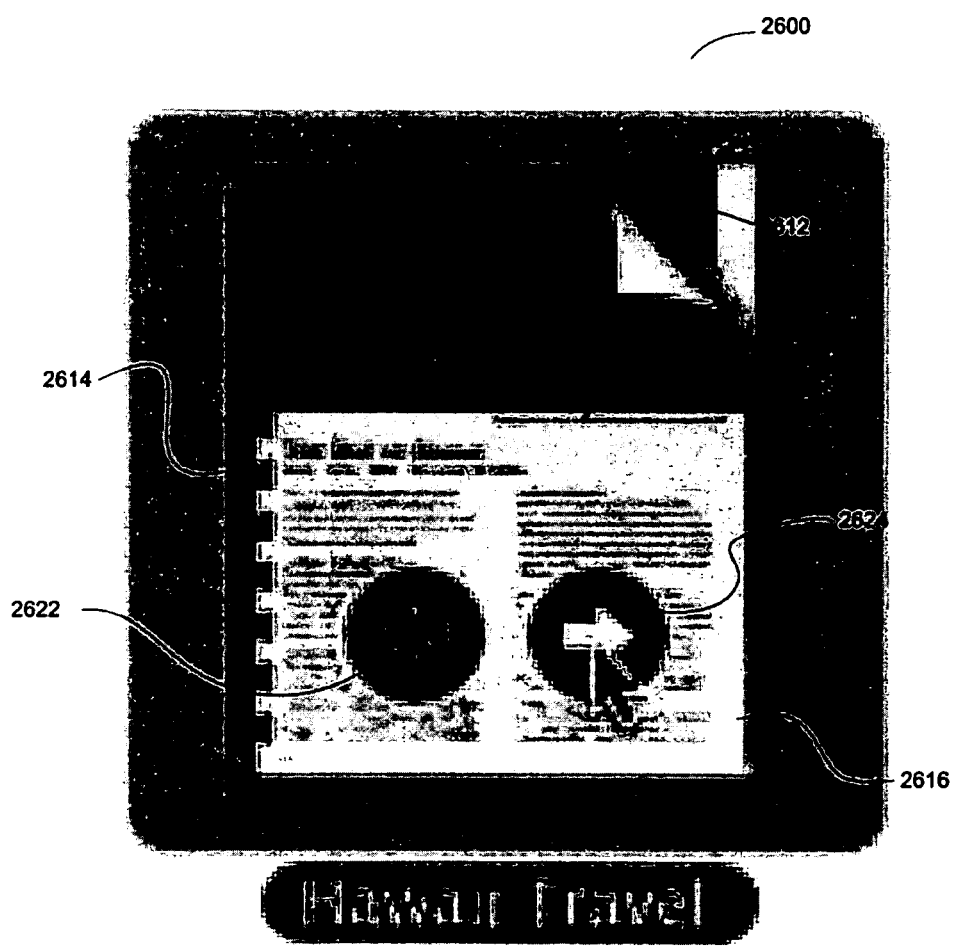
Figure 26C:
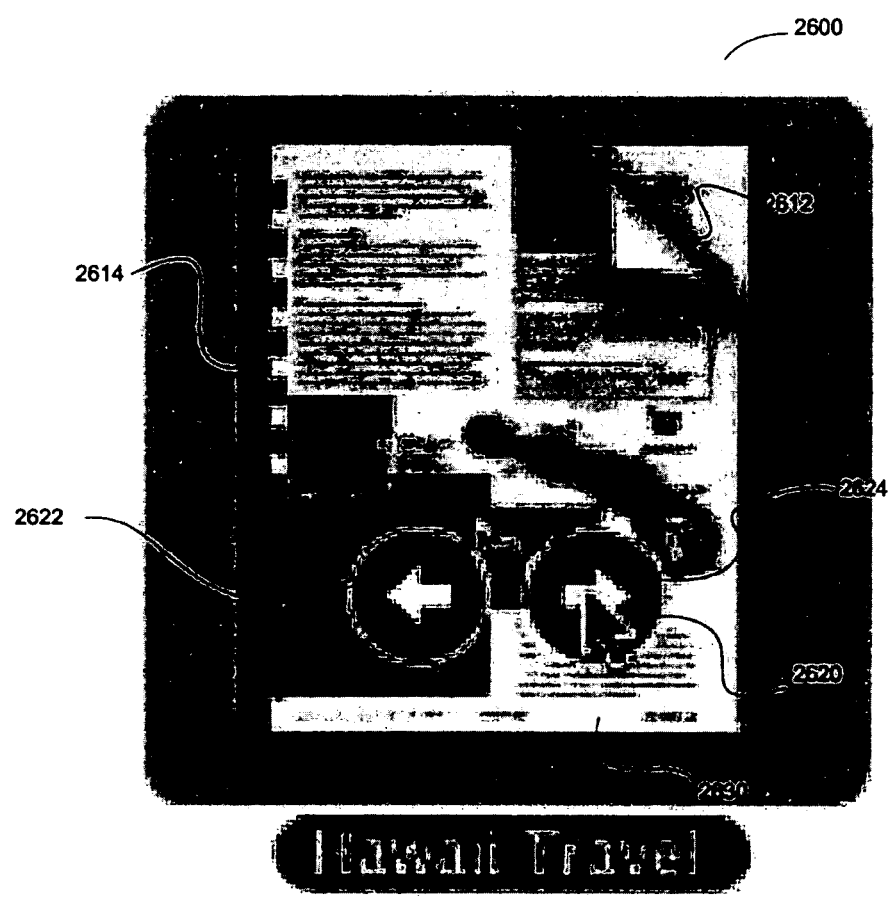

Upon detection of a cursor 2620 moving across the dynamic icon 2600, a left arrow 2622 and a right arrow 2624 are generated and displayed on the dynamic icon 2600 as shown in FIG. 26B. The cursor 2620 may be moved across the dynamic icon 2600 in response to actuation of a user input device, such as a mouse, a joystick, arrow buttons in a keyboard, etc. Because the icon 2600 is currently displaying the first page 2616 of the document, the right arrow 2624 is activated, but not the left arrow 2622. In response to the cursor 2620 actuating the right button 2624, the dynamic icon 2600 displays the second page 2630 of the document instead of the first page 2616 as shown in FIG. 26C. Furthermore, the left arrow 2622 is activated to allow the user to turn back to the first page 2616 of the document if desired.

Figure 26D:
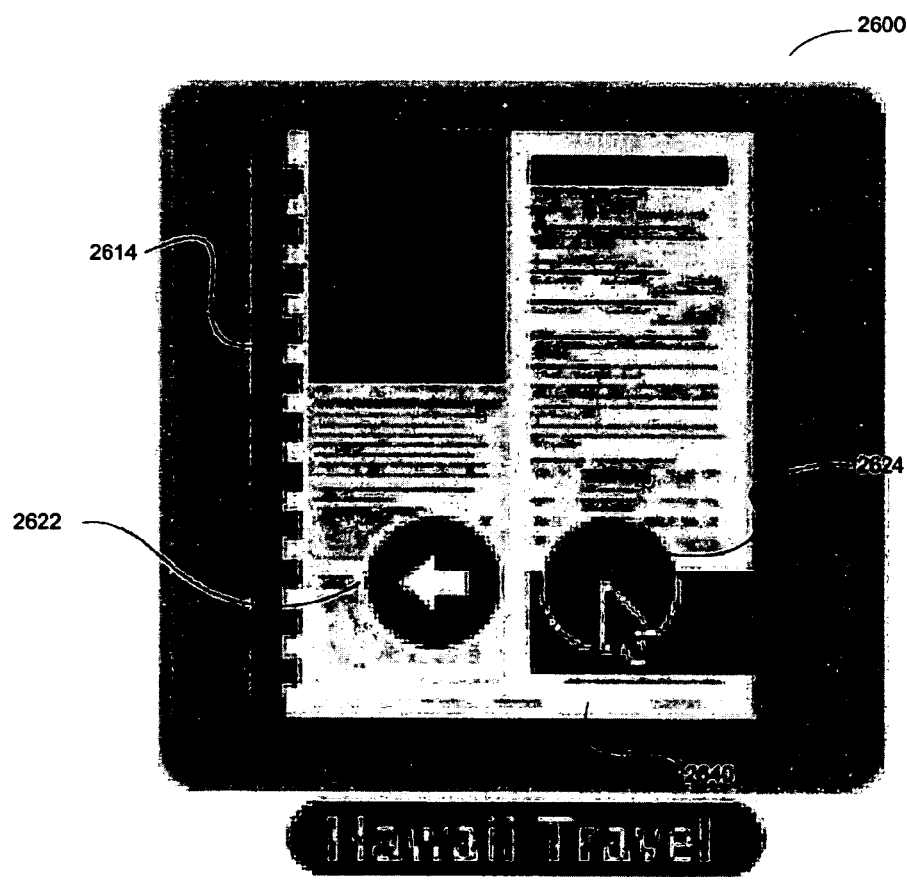

As shown in FIG. 26D, the user may turn to the next page, i.e., the third page 2640, of the document by actuating the right arrow 2624 again. Because the third page 2640 is the last page of the document, the right arrow 2624 is deactivated, while the left arrow 2622 remains activated. Thus, the user may turn back to the previous page (i.e., the second page 2630) by actuating the left arrow 2622. Furthermore, the foldover 2612 is removed from the dynamic icon 2600 to indicate that the dynamic icon 2600 is displaying the last page 2640 of the document. However, the spiral book spine 2614 is maintained on the dynamic icon 2600.

As shown in FIGS. 26A-26D, the user may readily page through the document within the dynamic icon 2600 without opening the document. Furthermore, the format of the dynamic icon 2600 remains unchanged throughout the preview, and the decorations (such as the foldover 2612 and the spiral book spine 2614) on the dynamic icon 2600 may be maintained or removed to enhance the presentation of the preview in response to user input.

Figure 27A:
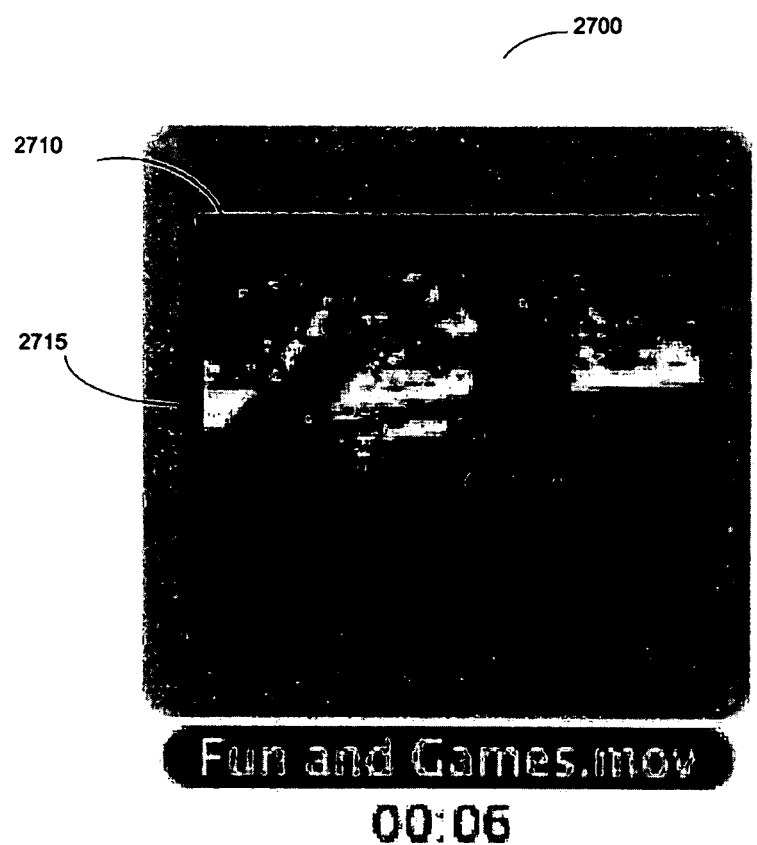
FIGS. 27A-27E show another embodiment of a dynamic icon.

FIGS. 27A-27E show another embodiment of a dynamic icon, which may be used with certain embodiments of the present invention. The dynamic icon 2700 represents a video entitled "Fun and Games.mov." Thus, the dynamic icon 2700 has the shape of a filmstrip and is decorated with a filmstrip frame 2710. Initially, the dynamic icon 2700 displays a pre-selected scene 2715 of the video as shown in FIG. 27A. The scene 2715 may be specified by the metadata of the video. This preview of the pre-selected scene 2715 may also be referred to as the initial preview of the video.

Figure 27B:
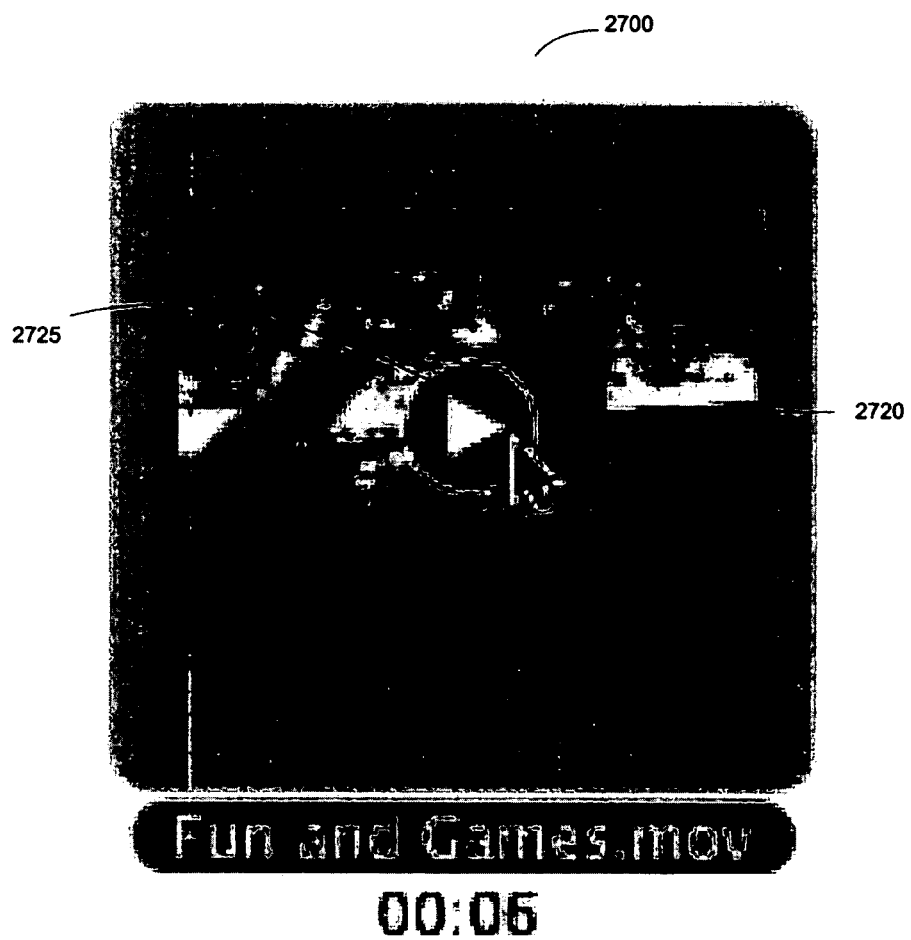
Figure 27C:
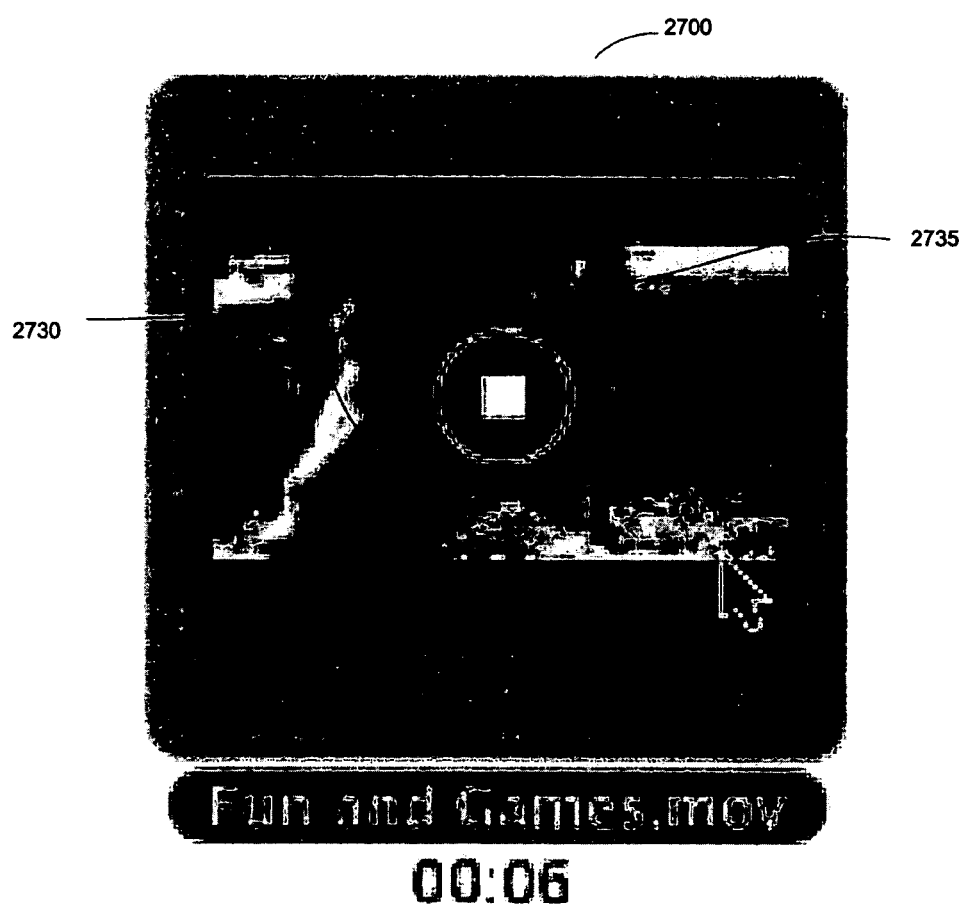

Upon detection of a cursor 2720 moving across the dynamic icon 2700, a play button 2725 is generated and displayed within the dynamic icon 2700 as shown in FIG. 27B. A user may actuate the play button 2725 to initiate playing of a preview of the video within the dynamic icon 2700. The preview of the video may include all or part of the video. While the video is playing, a stop button 2730 may be generated and displayed within the dynamic icon 2700 as shown in FIG. 27C. The user may actuate the stop button 2730 to stop playing the preview within the dynamic icon 2700. Thus, the user may manipulate or control the presentation of the preview of the video using the play button 2725 and the stop button 2730.

Figure 27D:
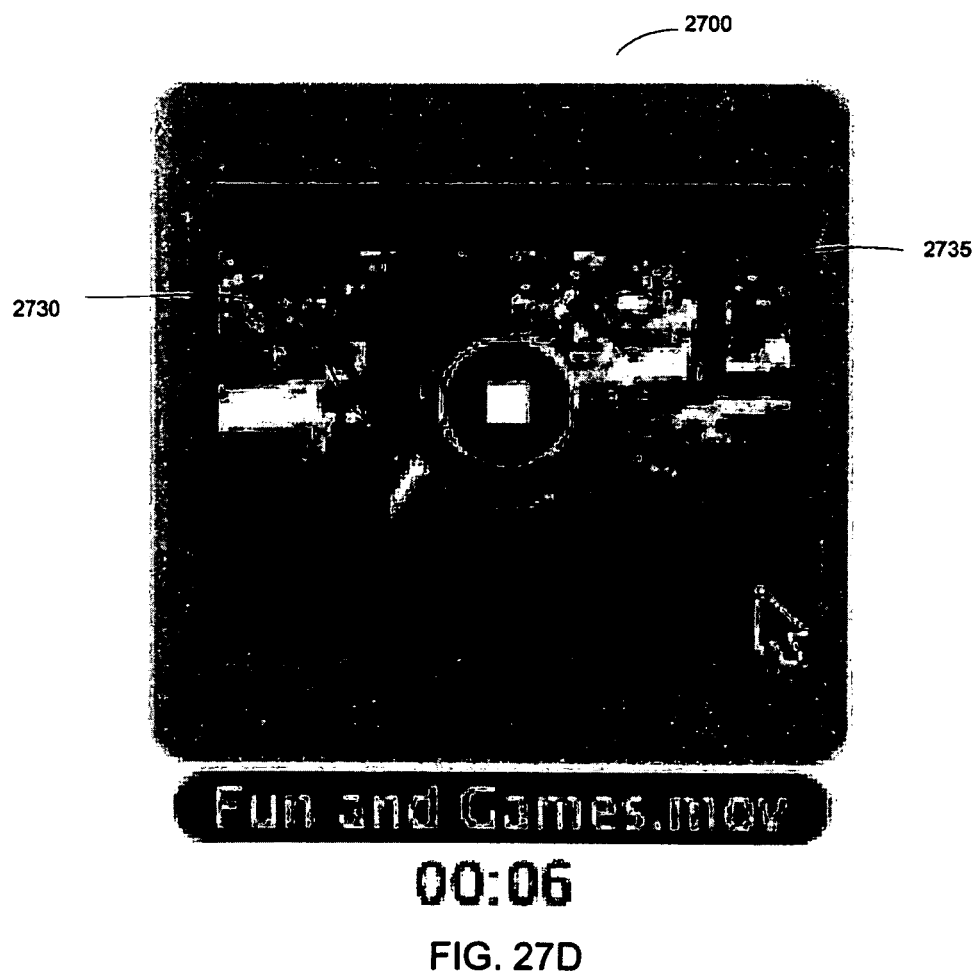
Figure 27E:
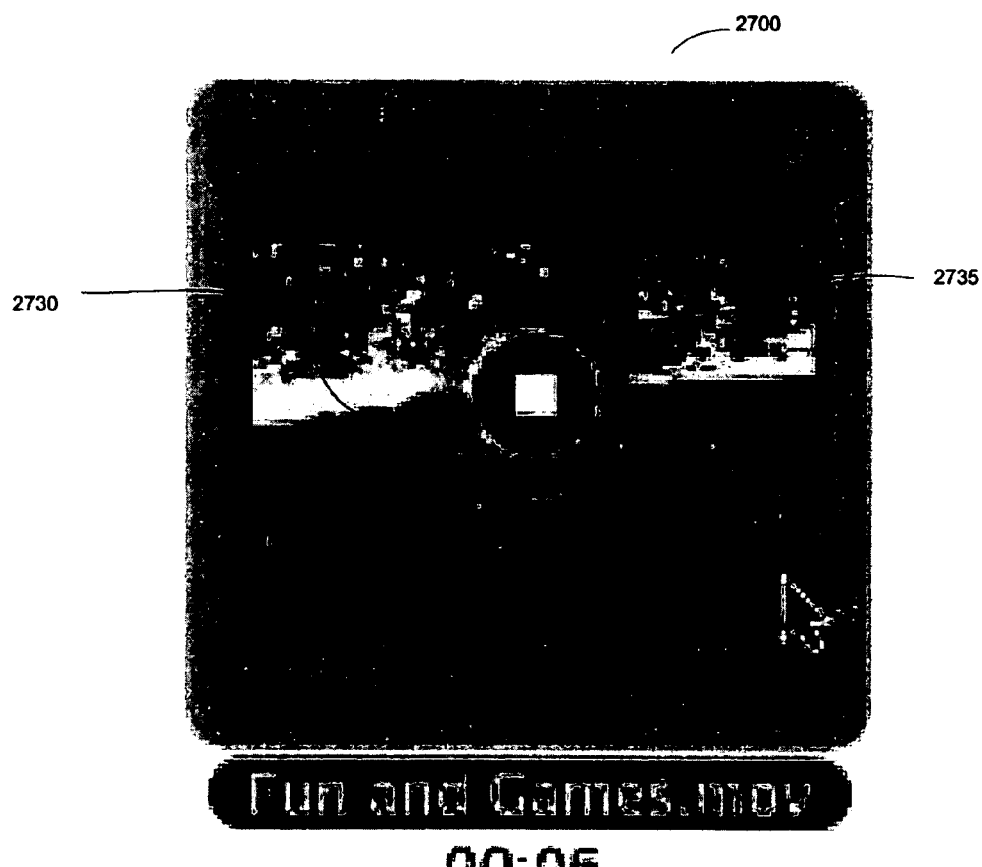

In some embodiments, the dynamic icon 2700 may further provide a status indicator 2735 as shown in FIGS. 27C-27E. In the current example, the status indicator 2735 is a ring enclosing the stop button 2730 to indicate the portion of the video that has been played in the preview. Specifically, the portion of the video played is represented by the shaded potion of the ring 2735. As the preview of the video is being played, the portion of the shading in the ring 2735 extends in clockwise direction as shown in FIGS. 27C-27E. When the entire preview has been played, the entire ring 2735 may be shaded.

Icon Badging

Figure 28:
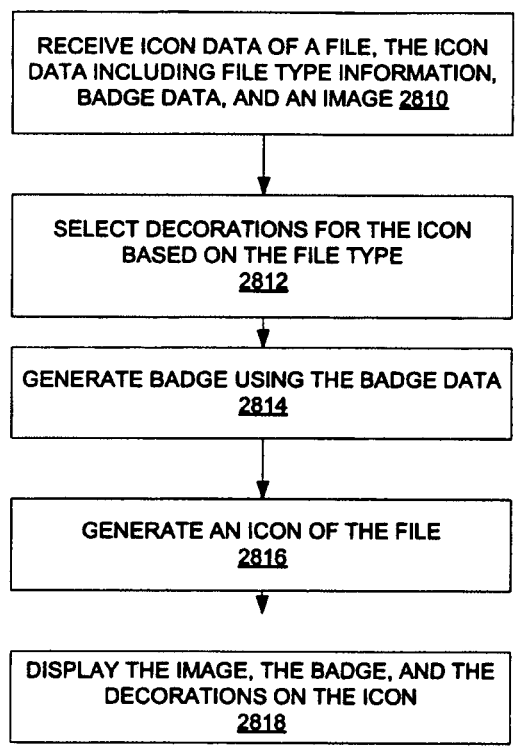
FIG. 28 shows one embodiment of a method to badge icons.

Another aspect of the present inventions relates to icon badging. Badges associated with icons allow third parties that provide creator applications of files to provide more information, in addition to file types, to icon generating software. For example, third parties may indicate in badge data which version of creator applications are used to create the files, and hence, the icon generating software may generate and display an appropriate badge on icons representing the files. FIG. 28 shows one embodiment of a method to badge icons. In block 2810, an application receives icon data of a file from a plug-in associated with a creator application of the file. The application may include a user interface generator (e.g., QUICK LOOK application from Apple, Inc., of Cupertino, Calif.) to generate a user interface for displaying icons of files for another application, such as FINDER application from Apple, Inc. of Cupertino, Calif., SPOTLIGHT Spotlight-application from Apple, Inc., WINDOWS EXPLORER program from Microsoft Corp. of Redmond, Wash., etc. The icon data includes file type information, badge data of the file, and an image associated with the file (e.g., a thumbnail, a pre-selected scene of a video, a pre-selected page of a document, etc.). The icon data may be provided as part of the metadata of the file.

In block 2812, decorations for the icon are selected based on the file type. This may also be referred to as type conformance. For example, if a file is recognized as a presentation (e.g., POWERPOINT files from Microsoft Corp. of Redmond, Wash., KEYNOTE files from Apple, Inc. of Cupertino, Calif., etc.) according to the file type information, then a slide decoration is provided to the icon of the file. In another example, if a file is recognized as a document (e.g., MSWORD files from Microsoft Corp. of Redmond, Wash., PAGES files from Apple, Inc. of Cupertino, Calif., etc.) according to the file type information, then a binder decoration is provided to the icon of the file.

In addition to the file type, the badge data in the icon data provides more information on the file, the creator application, and/or a third party vendor providing the creator application. Via badge data, the third party vendor may provide more hints on the file in addition to the file type. For example, the badge data may indicate the identity of the third party vendor, a version of the creator application, etc. Using the badge data, a badge is generated in block 2814. The badge may include graphics, text, or a combination of both, to represent the third party, the creator application, and/or other hints provided in the badge data. A badge that includes only graphics is referred to as an image badge. A badge that includes only text is referred to as a text badge.

In block 2816, an icon of the file is generated. Then the image, the badge, and the decorations selected above are displayed on the icon. Via the image, the icon may provide users with an initial preview of the file. Via the decorations, the icon may indicate the file type to users. Via the badge, the icon may convey additional hints about the file to users. Note that all of the above information on the file may be conveyed to users by a display of the icon without user intervention. Users do not have to request the above information and there is no need to open another window or viewing panel to display the above information.

Using badges, the third party vendor may ensure icons of files created by its applications are badged in similar way. Thus, badges allow the third party vendor to provide a substantially uniform look and feel for icons of files created by the third party's applications.

Figure 29:
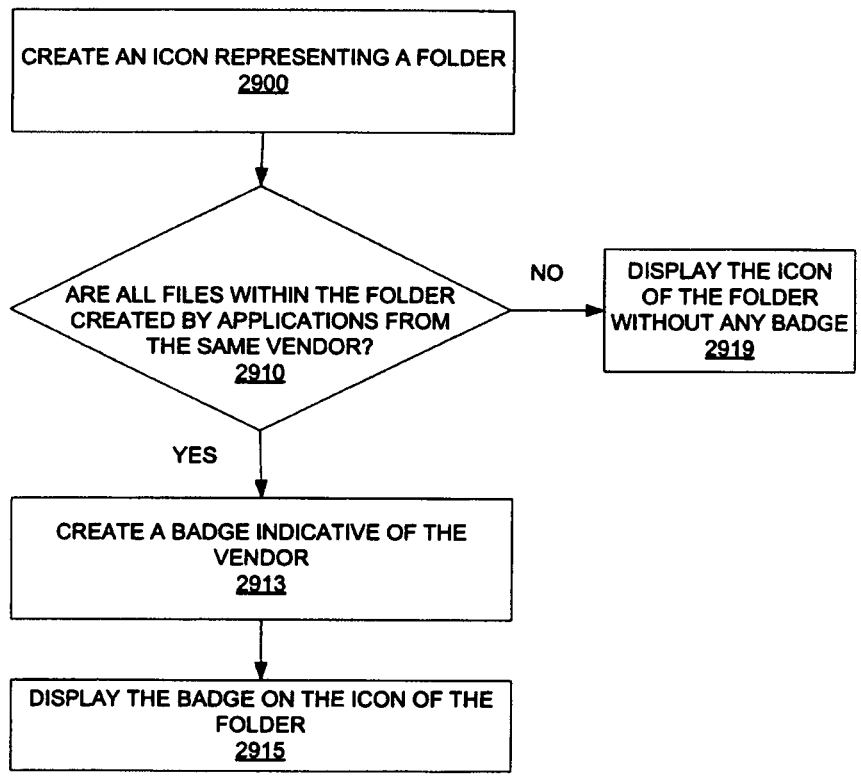
FIG. 29 shows one embodiment of a method to badge a folder.

According to another aspect of the present invention, a folder containing only files created by applications from a single third party may be badged as well. As such, users may easily determine the content of the folder without opening the folder. FIG. 29 shows one embodiment of a method to badge a folder. The method may begin in block 2900 in which an icon representing a folder is created. In block 2910, it is determined if all files within the folder are created by applications from the same third party vendor, such as Apple, Inc. of Cupertino, Calif., Microsoft Corp. of Redmond, Wash., etc. If not all files within the folder are created by applications from the same vendor, then the icon of the folder is not badged. The icon of the folder is displayed without any badges in block 2919.

If all files within the folder are created by the same application or applications from the same third party vendor, then the icon of the folder is badged accordingly. In block 2913, a badge indicative of the vendor is created. The badge may include graphics, text, or a combination of both. For example, if all files within the folder are created by applications from Apple, Inc. of Cupertino, Calif., then a badge including the graphic logo representing Apple, Inc. may be created. In block 2915, the badge created is displayed on the icon of the folder. Decorations of the folder may also be displayed on the icon of the folder with the badge. Some exemplary embodiments of badged icons are illustrated in FIGS. 30A and 30B.

Figure 30A:
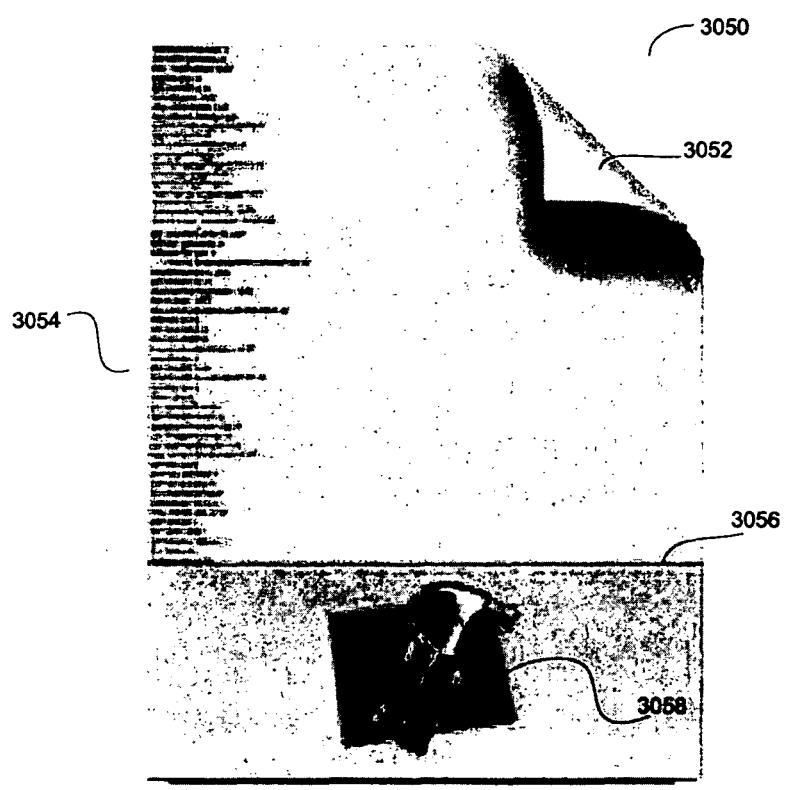
FIGS. 30A-30C show some exemplary embodiments of badged icons.

Referring to FIG. 30A, one embodiment of an image badge on an exemplary icon is shown. The icon 3050 represents a file created by Xcode from Apple, Inc. of Cupertino, Calif. An image badge 3056 having a graphic image displaying the logo of Xcode 3058 is displayed on the icon 3050 to indicate to users that the creator application of the file represented by the icon 3050 is Xcode. The icon 3050 further includes an image 3054 of a portion of the content of the file to provide a preview of the content to users. Alternatively, the icon 3050 may include an interactive preview to allow users to page or scroll through the content of the file. Details of some embodiments of interactive preview in icons have been discussed above. Furthermore, a foldover 3052 is chosen as a decoration for the icon 3050 based on the file type. As shown in FIG. 30A, the foldover 3052 is displayed at the top right corner of the icon 3050. Other decorations may be chosen based on the file type in alternate embodiments.

Figure 30B:
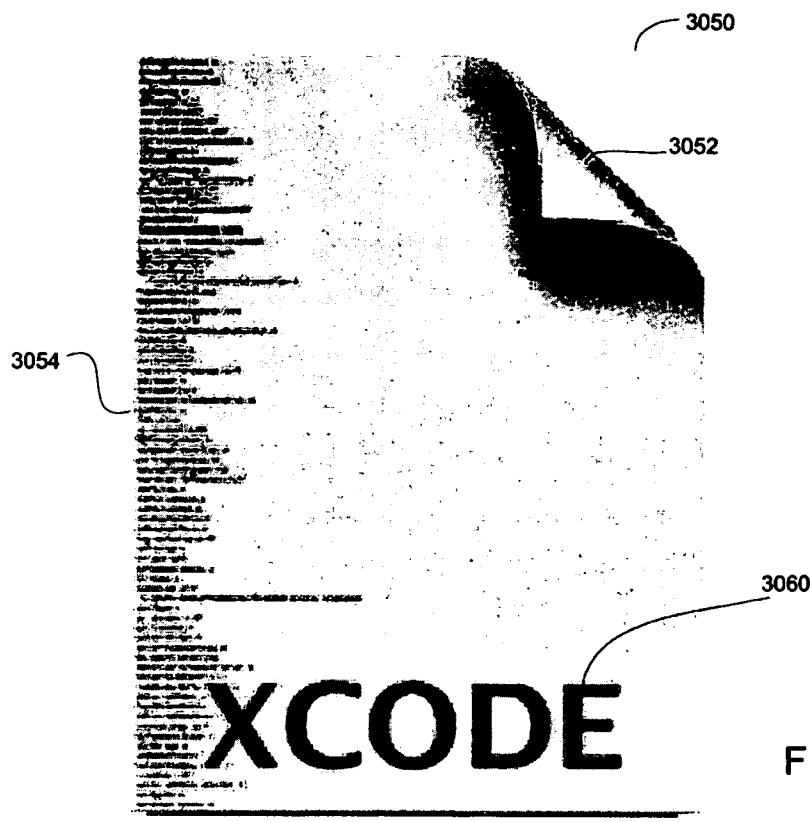

FIG. 30B illustrates another embodiment of a text badge on the exemplary icon. As mentioned above, the icon 3050 represents a file created by Xcode from Apple, Inc. of Cupertino, Calif. A text badge 3060 including the text "XCODE" is displayed at the bottom of the icon 3050. Thus, users may readily determine that the file represented by the icon is created by Xcode. The icon 3050 further includes an image 3054 of a portion of the content of the file to provide a preview of the content to users. Alternatively, the icon 3050 may include an interactive preview to allow users to page or scroll through the content of the file. Details of some embodiments of interactive preview in icons have been discussed above. Furthermore, decorations, such as the foldover 3052 at the top right corner of the icon 3050, are displayed on the icon 3050 based on the file type.

Figure 30C:
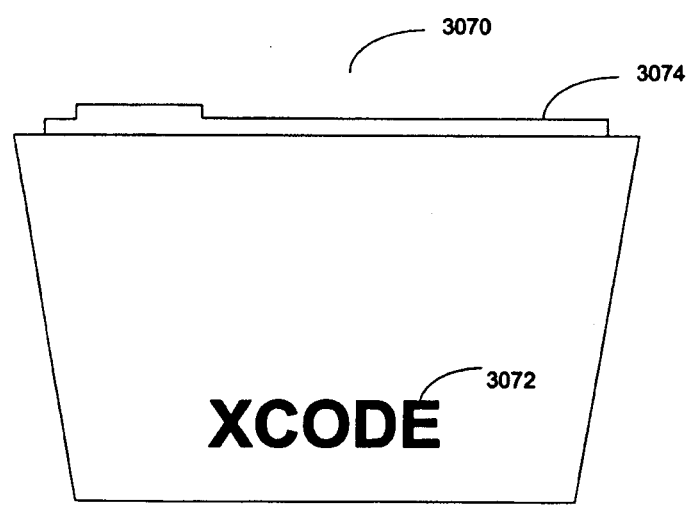

FIG. 30C illustrates another embodiment of a text badge on an exemplary folder icon. The folder icon 3070 includes a decoration of a binder outline 3074 and a text badge of Xcode. In the current example, all files in the folder are created by Xcode, therefore, the text badge of Xcode 3072 is displayed on the folder icon 3070 to indicate so.

System Architecture

As described above, these previews or thumbnails may be shown by a set of software routines such as a set of plug-ins, which are separate from a file management software program, such as FINDER or WINDOWS EXPLORER. This separation between the plug-ins which renders the content and Finder or other file management software provides security and stability because, for example, if the plug-in crashes, Finder may not. These plug-ins may be a standard set of plug-ins that translate the native format of an item being previewed into one of a standard data/file type, such as PDF, text, HTML, JPG, a standard movie format or a standard sound/music format or into fully rendered content (e.g., a bitmap). The set of plug-ins may be an extensible set of plug-ins and may interact with the file management software, such as FINDER or WINDOWS EXPLORER, through a set of APIs in which the file management software makes a call to a plug-in management daemon which receives the call or API from the file management software (or other software program) and which, in turn, asks for the file type (e.g., UTI) from a file system kernel and matches one of the plug-ins in the standard set of plug-ins, which may be extensible, with the file type and which then calls the matched plug-in to cause the plug-in to load and return the content of the file (either in an immediately displayable form or in a standard format) as a preview to the file management software which, in turn, causes the preview to be displayed in, for example, an icon representing the file and/or the cover flow view. This may occur in response to merely browsing the files through the use of the file management software, such as FINDER, or through the use of a search software program, such as SPOTLIGHT, to find files and then display previews or thumbnails of files retrieved by the search. As noted above, the preview or thumbnail may be generated dynamically upon request rather than when the item or file is stored or created by the application. This dynamic generation may be through an API. It will be understood that a dynamic generation of a preview or thumbnail may be provided without invoking or launching the application which created the file or document. Examples of software architectures to dynamically generate previews are discussed in conjunction with FIG. 31 below.

In addition to a file management software program or a search software program, such as SPOTLIGHT, other software application programs may provide or use application programming interfaces (API) to request the preview generator or preview daemon to provide a preview or thumbnail of the content of a file within their windows. For example, an email program or a calendar program or a video conferencing application or an instant messaging application program or other application programs may also make a call to the preview generator or preview generator daemon to provide the content of a particular file in the manner described herein. In response to the call through an API from the email program or the calendar program or other program, the preview generator or preview generator daemon asks the file system for the file type and matches the file type with a plug-in having an ability to process that file type and causes that plug-in to be loaded (for example, by calling the plug-in through another optional API). The plug-in, in turn, processes the content of the file to generate the preview or thumbnail and provides that content to the original application which requested the content, such as the email program or a calendar program or, as noted above, a file management software. A preview, such as an interactive preview in a dynamic icon (e.g., the dynamic icons shown in FIGS. 26A-26D and FIGS. 27A-27E) or thumbnail may be provided in an inline preview manner in a particular view of a HFS management program, such as the cover flow view, a list view, such as the list view shown in FIG. 17 (which includes a preview or thumbnail view) or in a "get information" or "properties" panel or window or in other uses.

In some embodiments, an interactive preview may be presented through the following set of software routines while also showing an initial set of previews. For example, thumbnails of files may be the initial set of previews shown in a particular view (e.g. list view, cover flow view, icon view), and the set of software routines provide an interactive preview, within the same view, for at least one of these initial previews. The initial previews may also be provided by this set of software routines, but these initial previews may not be interactive with the view; for example, they are not interactive within the view, in response to user commands so they will not, in response to user commands, allow a user to page through or scroll through or browse through the content or to zoom or resize the content or playback the content, such as playback the movie. On the other hand, the interactive preview is interactive in response to user commands in that it can respond to a user command to page through or scroll through or browse or resize or zoom the document represented by the interactive preview or playback the content, either within the particular view (e.g. a list view or cover flow view or icon view (see, e.g. FIGS. 26A-26D and 27A-27E)) or zoom out from the particular view or be layered over the particular view. Such user interface for showing both initial previews and interactive previews may be used in a list view or icon view, such as a list view or icon view of files or folders from a search result or a list view or icon view of files and folders from within a file management software window (e.g. a Finder window).

Figure 31:
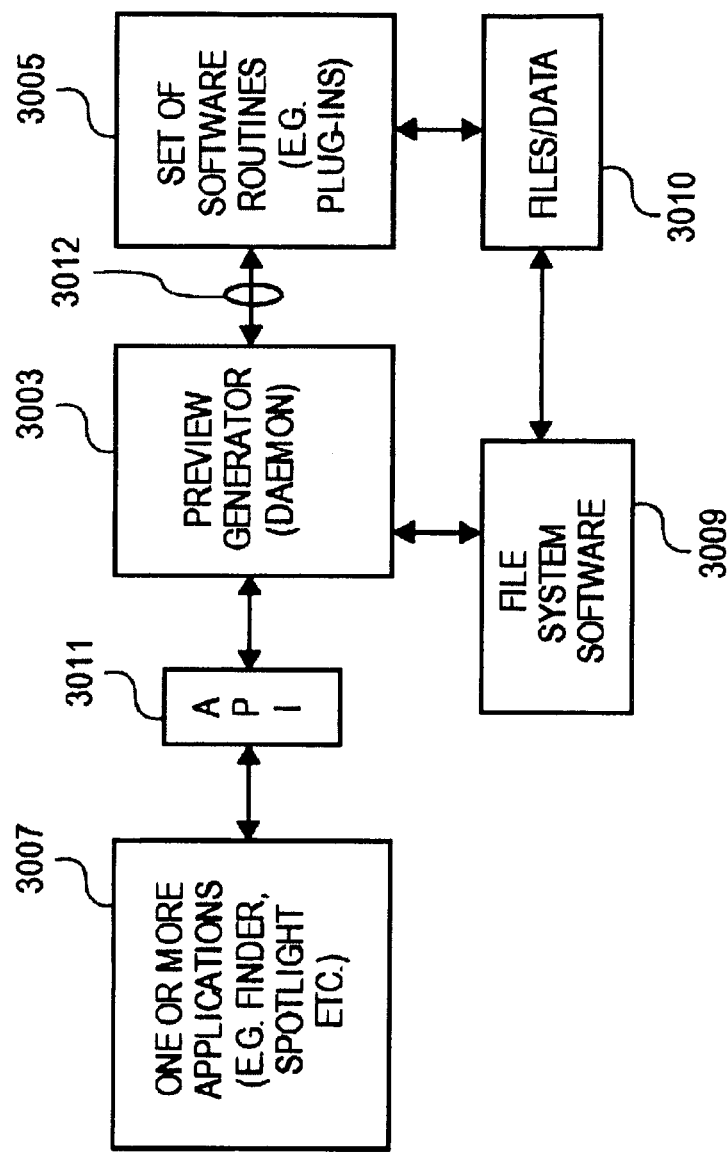
FIG. 31 shows an example of an architecture, which includes at least one application program interface (API), that allows an application, such as a user level application, to obtain a preview of files and other data without having to launch another application which created that file or other data.

FIG. 31 shows an example of software architecture 3001 which may be used to dynamically generate previews, such as one or both of initial previews and interactive previews. This architecture may include one or more APIs, such as API 3011 and optional API 3012 to act as an interface between separate software programs. For example, API 3011 interfaces between a preview generator 3003, which may be a preview generator daemon provided by an operating system software, and one or more application programs 3007 (such as a file management software program or a search software program, etc.). The one or more application programs 3007 make calls, through the API 3011, in order to have a preview generated for a file or other item in a particular view. The preview generator 3003 is configured to receive those calls to generate a preview of the content of the file. The preview of the content can be generated by requesting a software routine (such as a first plug-in), in a set of software routines 3005, to generate either displayable content or data in a standard format which can be converted by the application which made the call (or a helper application/plug-in or system resource) into displayable content. The first plug-in may be loaded and then process the file (from the storage 3010 of files and data) to generate the preview; the preview generator may determine the file type of the file by making a call, to determine the file type, to the file system software 3009 which returns an identifier of the file type of the file, and then the preview generator 3003 may match the file type with the most appropriate routine in the set of routines before causing the most appropriate routine to be loaded to generate the preview. Each software routine may include data identifying the file types it can process, and the preview generator matches the file type for the file, which was in the call through API 3011, with the software routine, which can process that file type, based on the data identifying the file types it can process.

Figure 32:
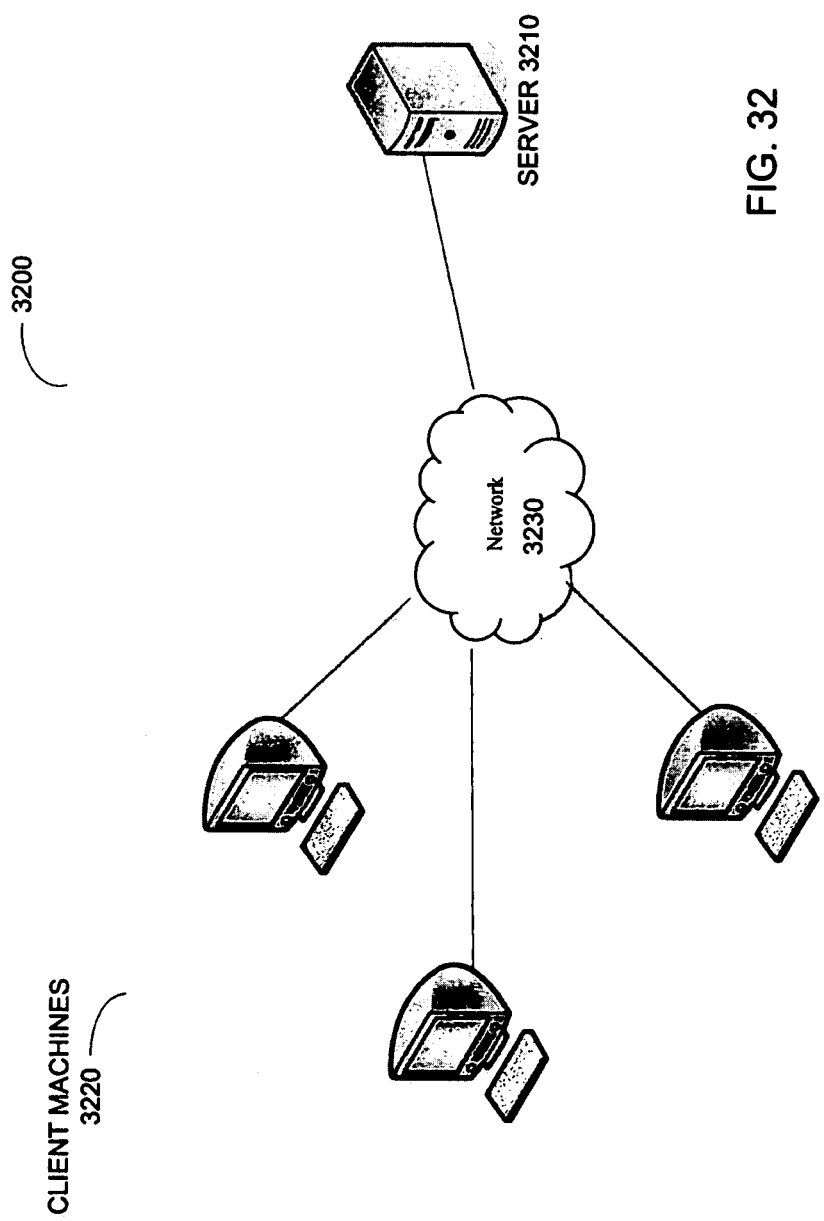
FIG. 32 illustrates one embodiment of a system in which embodiments of the present invention may be implemented.

In some embodiments, all modules in the above software architecture 3001 are implemented and executed on a single individual computing machine, such as a personal computer. Alternatively, the above software architecture 3001 may be implemented in a distributed manner, such as in a client-server system. FIG. 32 illustrates one embodiment of a system in which embodiments of the present invention may be implemented. The system 3200 includes a server 3210 and a number of client machines 3220. The client machines 3220 are communicably coupled to the server 3210 via a network 3230. A preview generator (such as the preview generator 3003 in FIG. 31) is provided on the server 3210 for access by the client machines 3220. In some embodiments, multiple distinct instances of the preview generator are provided for multiple distinct client machines. In response to requests from the client machines 3220, each instance of the preview generator may send a preview of the requested files from the server 3210 to the respective client machines 3220. In some embodiments, icons representing the files are cached on the server 3210 for use by the various instances of the preview generator. By providing the preview generator on the server 3210, it is not necessary for the client machines 3220 to have the relevant applications in order to present the preview.

Figure 33:
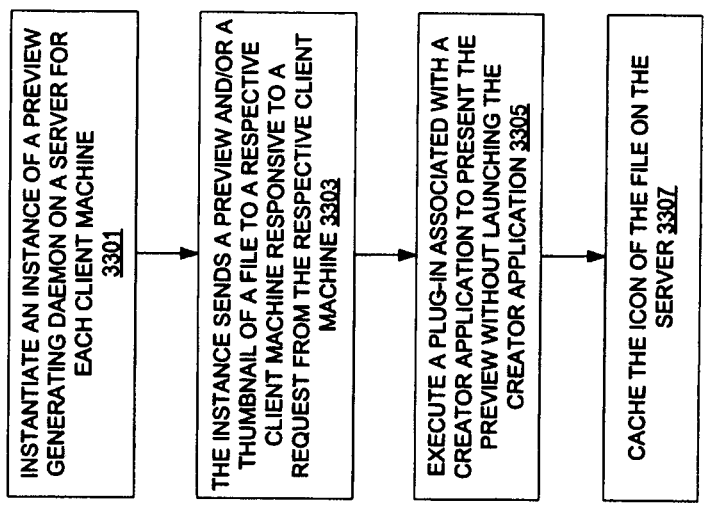
FIG. 33 illustrates one embodiment of a method for providing a preview generator on a server.

FIG. 33 illustrates one embodiment of a method for providing a preview generator on a server. One example of the preview generator is Quick Look application from Apple, Inc. of Cupertino, Calif. The method may begin in block 3301 in which an instance of a preview generator is instantiated on a server (such as the server 3210 in FIG. 32) for each of a number of client machines (such as the client machines 3220 in FIG. 32). In block 3303, the instance sends a preview of a file to a respective client machine responsive to a request from the respective client machine. Depending on the file type, the preview may include a thumbnail of an image, a portion of a document, a portion of a video, etc. In block 3305, a plug-in associated with a creator application of the file is executed to present the preview without launching the creator application. In some embodiments, the preview is presented within the icon while maintaining the format and decorations of the icon. Alternatively, a new window is opened and the preview is presented in the new window. In block 3307, the icon of the file is cached on the server so that the icon cached can be accessed by other instances of the preview generator.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method comprising:
a server initiating a plurality of distinct instances of a preview generator for each of a plurality of respective client machines;
at least one or more of the plurality of distinct instances sending at least one of a preview and a thumbnail of a file to a respective client machine responsive to a request for the file from the respective client machine to allow the respective client machine to present the preview, wherein the preview is presented within an icon of the file displayed on the respective client machine, wherein the icon of the file includes icon data comprising:
a decoration to be put onto the icon, and
image metadata indicative of whether the preview is available;
caching the icon of the file on the server for use by each of the plurality of distinct instances of the preview generator; and
allowing users of the plurality of respective client machines to view results from a file searching application via Graphical User Interfaces (GUIs) based on previews generated by at least a portion of the plurality of distinct instances of the preview generator.

2. The method of claim 1, further comprising executing a plug-in associated with an application, which is used to create the file, to present the preview without launching the application.

3. The method of claim 2, wherein the preview is presented within the thumbnail displayed on the respective client machine.

4. The method of claim 1, further comprising allowing users of the plurality of client machines to manage a hierarchical file system (HFS) via the GUIs based on previews generated by at least a portion of the plurality of distinct instances of the preview generator.

5. A non-transitory computer readable medium storing executable program instructions which when executed by a data processing system cause the data processing system to perform a method comprising:
a server initiating a plurality of distinct instances of a preview generator for each of a plurality of respective client machines;
at least one or more of the plurality of distinct instances sending at least one of a preview and a thumbnail of a file to a respective client machine responsive to a request for the file from the respective client machine to allow the respective client machine to present the preview, wherein the preview is presented within an icon of the file displayed on the respective client machine, wherein the icon of the file includes icon data comprising:
a decoration to be put onto the icon, and
image metadata indicative of whether the preview is available;
caching the icon of the file on the server for use by each of the plurality of distinct instances of the preview generator; and
allowing users of the plurality of respective client machines to view results from a file searching application via Graphical User Interfaces (GUIs) based on previews generated by at least a portion of the plurality of distinct instances of the preview generator.

6. The non-transitory computer readable medium of claim 5, wherein the method further comprises executing a plug-in associated with an application, which is used to create the file, to present the preview without launching the application.

7. The non-transitory computer readable medium of claim 6, wherein the preview is presented within the thumbnail displayed on the respective client machine.

8. The non-transitory computer readable medium of claim 5, wherein the method further comprises allowing users of the plurality of client machines to manage a hierarchical file system (HFS) via the GUIs based on previews generated by at least a portion of the plurality of instances of the preview generator.

9. An apparatus comprising:
a network interface to couple to a plurality of client machines via a network;
a processor to initiate a plurality of distinct instances of a preview generator for each of the plurality of respective client machines, wherein at least one or more of the plurality of distinct instances send at least one of a preview and a thumbnail of a file via the network interface to a respective client machine responsive to a request for the file from the respective client machine to allow the respective client machine to present the preview, wherein the preview is presented within 2 an icon of the file displayed on the respective client machine, wherein the icon of the file includes icon data comprising:
a decoration to be put onto the icon, and
image metadata indicative of whether the preview is available; and
a cache to cache the icon of the file for use by each of the plurality of distinct instances of the preview generator;
wherein the processor allows users of the plurality of respective client machines to view results from a file searching application via Graphical User Interfaces (GUIs) based on previews generated by at least a portion of the plurality of distinct instances of the preview generator.

10. The apparatus of claim 9, further comprising a plug-in associated with an application, which is used to create the file, the plug-in being executable by the processor to present the preview without launching the application.

11. The apparatus of claim 10, wherein the preview is presented within the thumbnail displayed on the respective client machine.

12. The apparatus of claim 9, wherein the processor allows users of the plurality of client machines to manage a hierarchical file system (HFS) via the GUIs based on previews generated by at least a portion of the plurality of instances of the preview generator.

13. A system comprising:
a plurality of client machines; and
a server coupled to the plurality of client machines, the server comprising
a network interface to couple to the plurality of client machines via a network;
a processor to initiate a plurality of distinct instances of a preview generator for each of the plurality of respective client machines, wherein at least one or more of the plurality of distinct instances send at least one of a preview and a thumbnail of a file via the network interface to a respective client machine responsive to a request for the file from the respective client machine to allow the respective client machine to present the preview, wherein the preview is presented within an icon of the file displayed on the respective client machine, wherein the icon of the file includes icon data comprising:
a decoration to be put onto the icon, and
image metadata indicative of whether the preview is available; and
a cache to cache the icon of the file, wherein the icon cached is used by the plurality of distinct instances of the preview generator;
wherein the processor allows users of the plurality of respective client machines to view results from a file searching application via Graphical User Interfaces (GUIs) based on previews generated by at least a portion of the plurality of distinct instances of the preview generator.

14. The system of claim 13, wherein the server further comprises a plug-in associated with an application, which is used to create the file, the plug-in being executable by the processor to present the preview without launching the application.

15. The system of claim 14, wherein the preview is presented within the thumbnail displayed on the respective client machine.

16. The system of claim 13, wherein the processor allows users of the plurality of client machines to manage a hierarchical file system (HFS) via the GUIs based on previews generated by at least a portion of the plurality of instances of the preview generator.

* * * * *

UNITED STATES PATENT AND TRADEMARK OFFICE
CERTIFICATE OF CORRECTION

PATENT NO. : 8,516,038 B2
APPLICATION NO. : 12/189673
DATED : August 20, 2013
INVENTOR(S) : Jalon et al.

It is certified that error appears in the above-identified patent and that said Letters Patent is hereby corrected as shown below:

In the Claims:

In column 45, line 15, Claim 9, after "within", delete "2", therefor

In column 46, line 4, Claim 13, after "comprising", insert --:--, therefor

Signed and Sealed this
Thirteenth Day of May, 2014

Michelle K. Lee
*Deputy Director of the United States Patent and Trademark Office*